United States Patent
Yamane et al.

(10) Patent No.: US 7,214,476 B2
(45) Date of Patent: *May 8, 2007

(54) IMAGE FORMING METHOD USING PHOTOTHERMOGRAPHIC MATERIAL

(75) Inventors: Katsutoshi Yamane, Kanagawa (JP); Katsuhiro Kohda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/949,420

(22) Filed: Sep. 27, 2004

(65) Prior Publication Data
US 2005/0074707 A1    Apr. 7, 2005

(30) Foreign Application Priority Data
Sep. 29, 2003  (JP) ............................. 2003-337047

(51) Int. Cl.
  *G03C 5/16*  (2006.01)
  *G03C 1/00*  (2006.01)
(52) U.S. Cl. ............... 430/348; 430/617; 430/966; 430/967
(58) Field of Classification Search ........... 430/348, 430/617, 966, 967
  See application file for complete search history.

(56) References Cited

U.S. PATENT DOCUMENTS

| | | | |
|---|---|---|---|
| 6,440,649 B1 | 8/2002 | Simpson et al. | |
| 6,573,033 B1 | 6/2003 | Simpson et al. | |
| 2005/0026093 A1* | 2/2005 | Ohzeki | 430/617 |
| 2005/0064348 A1* | 3/2005 | Ohta | 430/348 |
| 2005/0069827 A1 | 3/2005 | Nariyuki et al. | |
| 2005/0118542 A1* | 6/2005 | Mori et al. | 430/619 |
| 2005/0214699 A1* | 9/2005 | Ohzeki et al. | 430/619 |
| 2005/0214702 A1* | 9/2005 | Ohzeki | 430/619 |
| 2005/0266361 A1* | 12/2005 | Funakubo et al. | 430/619 |

FOREIGN PATENT DOCUMENTS

| | | |
|---|---|---|
| EP | 0 423 891 A1 | 4/1991 |
| EP | 1 276 006 A1 | 1/2003 |
| JP | 62-215942 A | 9/1987 |
| JP | 3229344 | 9/2001 |

* cited by examiner

*Primary Examiner*—Geraldina Visconti
(74) *Attorney, Agent, or Firm*—Margaret A. Burke; Sheldon J. Moss

(57) ABSTRACT

An image forming method applying X-ray exposure to a photothermographic material having, on at least one surface of a support, an image forming layer containing at least a photosensitive silver halide, a non-photosensitive organic silver salt, a reducing agent for silver ions, and a binder, wherein the photothermographic material is brought into close contact with a fluorescence intensifying screen containing a fluorescent material that emits light, 50% or more of which has a wavelength in a range of 350 nm or more and 420 nm or less.

21 Claims, 3 Drawing Sheets

IMAGE FORMING METHOD USING PHOTOTHERMOGRAPHIC MATERIAL

CROSS-REFERENCE TO RELATED APPLICATION

This application claims priority under 35 USC 119 from Japanese Patent Application Ser. No. 2003-337047, the disclosure of which is incorporated by reference herein.

BACKGROUND OF THE INVENTION

1. Field of the Invention

The present invention relates to an image forming method by using a photothermographic material and, more particularly, it relates to an image forming method exhibiting high sensitivity and having excellent image storability, due to the combination of a photothermographic material having a specific sensitivity in a wavelength region of 350 nm or more and 420 nm or less, and a fluorescence intensifying screen having a high light-emitting property within the region described above.

2. Description of the Related Art

In recent years, there has been a strong demand to adopt a dry process for photographic development in the medical and printing and plate-making fields. This trend has come about due to various factors, such as environmental preservation and the need to use space more efficiently. In the fields described above, digitalization has rapidly progressed. Systems are now in place in which image data is loaded into computers, stored and optionally processed. The data or information is then outputted via transmission to thee required locations and printed onto photosensitive materials with laser image setters or laser imagers. Due to these systems, in situ image development and preparation have become quite common.

It is necessary that the photosensitive materials used in these systems are able to record images by high-illuminance laser exposure and that they can form clear black images having high resolution and sharpness. For such digital image recording materials, various types of hard-copy systems that utilize pigments and dyes, such as ink jet printers and electrophotographic systems, have been marketed as conventional image-forming systems. Nonetheless, these are not satisfactory in view of the image quality (i.e., sharpness, granularity, gradation and color tone) necessary for determining the diagnostic ability used in cases such as images for medical use. Further, the recording speed (i.e., sensitivity) has not yet reached a level capable of substituting existing silver salt films for wet development in medical use.

Thermal image-forming systems utilizing organic silver salts are well-known. In these systems, an image-forming layer in which a reducible silver salt (for example, organic silver salt), a photosensitive silver halide and, when necessary, a color-tone-adjusting agent for controlling the tone of silver are dispersed in a binder matrix.

After image exposure, the photothermographic material is heated to a high temperature (for example, 80° C. or higher) and black silver images are formed by an oxidation/reduction reaction between a silver halide or reducible silver salt (functioning as an oxidizer) and a reducing agent. The oxidation/reduction reaction is promoted by the catalytic effect of latent images of the silver halide that are generated by exposure. As a result, black silver images are formed in the exposed areas. These photothermographic materials have been disclosed in many publications and the Fuji Medical Dry Imager FM-DPL has been sold as a medical image-forming system for actual use.

Image-forming systems utilizing organic silver salts essentially encounter two serious problems, since these have no fixing step and the silver halide remains on the film even after heat development.

One of the problems involves image storability after development processing, particularly, the deterioration of the printout when exposed to light. A method of utilizing silver iodide has been known as a countermeasure for improving the printout quality. Silver iodide has a characteristic of causing considerably less deterioration of the printout compared with silver bromide or silver bromoiodide, since it has an iodide content of 5 mol % or less, and thus has great potential to aid in overcoming the problem. However, silver iodide particles known to date have extremely low sensitivity, making them far from suitable for use in actual systems. Further, there is a problem in that the excellent printout quality achieved with silver iodide is lost when a countermeasure for increasing sensitivity by preventing re-combination of photoelectrons and holes is applied.

As means for increasing the sensitivity of the silver iodide photographic emulsion, it has been well documented in professional literature that sensitivity is enhanced by dipping the photothermographic material in an aqueous solution of a halogen receptor such as sodium nitrite, pyrogallol and hydroquinone or silver nitrate, or by sulfur sensitization at pAg of 7.5. However, the inventors found that the halogen receptors exhibited very little sensitizing effect when used with the photothermographic material of the present invention, making them extremely insufficient.

Another problem is that, due to light scattering caused by residual silver halide, the film tends to become turbid and semi-transparent or opaque, thus lowering the image quality. In order to overcome this problem, a method of granulating the photosensitive silver halide to fine particles (the range in actual use being 0.15 µm to 0.08 µm) and reducing the addition amount as much as possible, thereby decreasing the turbidity caused by the silver halide, has been adopted. However, this compromise further lowered sensitivity, and could not completely solve the problem of turbidity, leaving clouding that made the film hazy.

In wet developing systems, residual silver halide is removed by treating the material with a fixing solution containing a solvent for the silver halide after development. As the solvent for the silver halide, various organic and inorganic compounds capable of forming complexes with silver ions have been known. Incorporation of similar fixing means was also attempted in the past for dry heat development. For example, it was proposed to incorporate a compound capable of forming a complex with silver ions in a film layer and solubilize the silver halide by heat development (usually referred to as "fixing"). However, this method requires the use of silver bromide or silver bromochloride, and also requires subsequent heating for fixing at high temperatures of 155° C. to 160° C. Further, a method of providing a separate sheet that contains a compound capable of forming a complex with silver ions (i.e., a fixing sheet), has also been proposed. In this method, images are formed by heat development of a photothermographic material, after which the fixing sheet is laid over the photothermographic meterial, thereby dissolving and removing the residual silver halide. However, since this system uses two sheets, it complicates the processing steps, and makes it difficult to ensure operation stability. Further, the fixing sheet has to be discarded after processing, resulting in waste materials. In light of these problems, it has been difficult to put this method into actual use.

In addition to the method described above, a fixing method in heat development has been proposed that incorporates a fixing agent for a silver halide in microcapsules and involves releasing and actuating the fixing agent during heat development, however, it is typically difficult to effectively release the fixing agent. While a method of fixing using a fixing solution after heat development has also been proposed, this is not suitable for a completely dry process since it requires wet processing.

As described above, all of the methods for improving clouding of the film known so far have significant drawbacks and have caused difficulties when put to actual use.

Meanwhile, it has been proposed to apply the aforementioned photothermographic material to photosensitive materials used in photography. The photosensitive materials used in pohtography referred to herein are not adapted to record image information by scanning exposure with a laser or the like, but rather a material on which images are recorded by planar exposure. This is generally used in the field of photosensitive materials for wet development and it has been known, for example, as direct or indirect X-ray films and mammographic films for medical use. These are also used for various kinds of photomechanical process films for printing use, recording films for industrial use, or photographic films for ordinary cameras. For example, X-ray photothermographic materials coated on both sides with a blue fluorescence-intensifying sheet; photothermographic materials using plate-shaped particles of silver bromoiodide; or photosensitive materials for medical use in which plate particles with high silver chloride content having (100) main face are coated on both surfaces of a support have also been disclosed in patent literature. However, none of these obtain the high sensitivity necessary for application to actual photosensitive materials for photography. Further, photothermographic materials that are coated on both sides are also disclosed in other patent literature (see, for example, JP-A No. 2002-90941). Japanese Patent No. 3229344 discloses a photothermographic material for X-ray photography using a UV-ray emitting fluorescent screen that emits light at 200 nm to 350 nm.

Each of the known examples uses fine silver halide particles of 0.1 μm or less, and although these do not exhibit worsened haze, they do show low sensitivity, making them unsuitable for actual use in photography.

While photosensitive materials using plate-shaped particles of silver iodide for the silver halide particles have been known in the field of wet development (see, for example, JP-A Nos. 59-119344 and 59-119350), there have been no examples of actual application thereof to photothermographic materials. This is because they tend to show less sensitivity, have no effective sensitizing means, and moreover, they encounter further higher technical problems, such as increases in haze due to enlargement of the particle size in the heat development.

JP-A Nos. 2003-215754 and 2003-91053 disclose exposing photothermographic materials, which use silver iodide as the silver halide, to high-illuminance light having an emission peak of 350 nm to 450 nm or to a laser. However, such high-illuminance light is not available in the X-ray exposure for photographic use to which the present invention is concerned. In addition, the inventions described in the patent literature set forth above are not suitable for actual photographic use since the silver halide particles are small and show less sensitivity, despite the fact that haze does not worsen.

SUMMARY OF THE INVENTION

The present invention has been made in view of the above-described circumstances and provides a method of forming images of high sensitivity and having excellent image storability by the combination of a photothermographic material having a specific sensitivity in a wavelength region of 350 nm or more and 420 nm or less, and a fluorescence intensifying screen having a high light-emitting property in the wavelength region described above. It further provides a method of forming images of high sensitivity and having excellent image storability by using a photothermographic material having a photosensitive silver halide of high iodine content.

An aspect of the present invention is to provide a method of forming images. The method comprises applying X-ray exposure to a photothermographic material having, on at least one surface of a support, an image-forming layer comprising at least a photosensitive silver halide, a non-photosensitive organic silver salt, a reducing agent for silver ions, and a binder. The photothermographic material is brought into close contact with a fluorescence intensifying screen comprising a fluorescent material that emits light, 50% or more of which has a wavelength in a range of 350 nm or more and 420 nm or less.

DETAILED DESCRIPTION OF THE INVENTION

Figure 1:
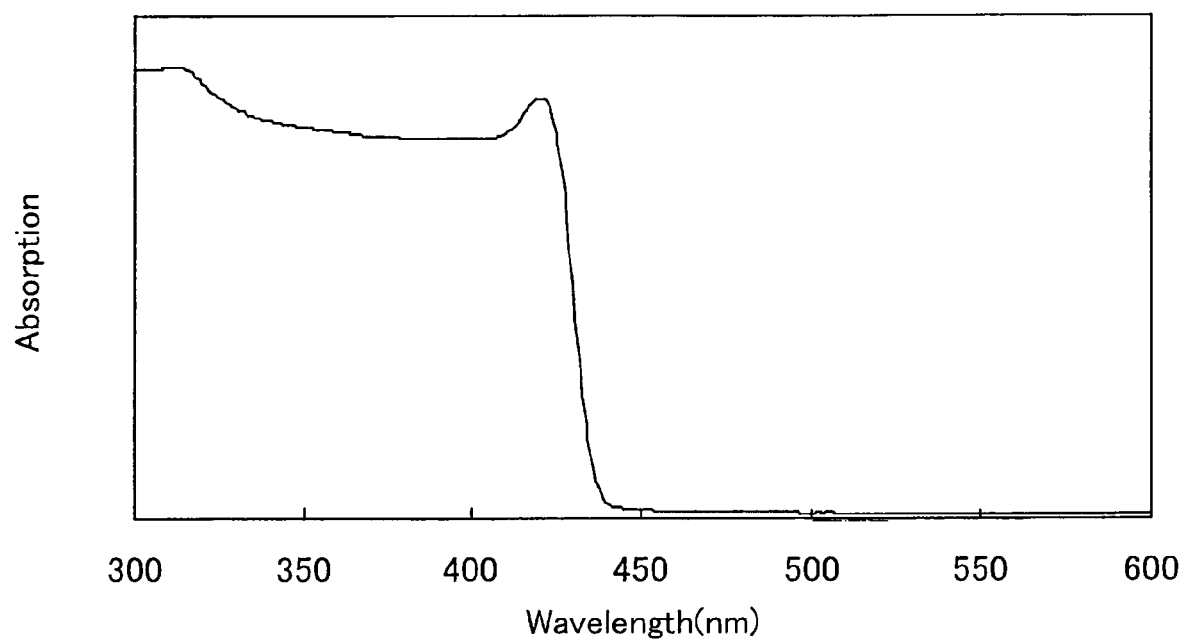
FIG. 1 shows a spectral absorption spectrum of a photothermographic material according to the invention.

The present invention is to be described in detail.

1. Combination of Fluorescence Intensifying Screen and Photothermographic Material The invention provides an X-ray image forming method at high sensitivity by the combination of a fluorescence intensifying screen that absorbs X-rays and emits light and a photothermographic material sensitive to the fluorescence intensifying screen.

Fluorescence Intensifying Screen

The X-ray image forming method utilizing the fluorescence intensifying screen has been known so far in the wet developing system, and it requires to incorporate a dye that absorbs light at a wavelength for exposure in a film in order to prevent the irradiation of light or improve the blurring of light inherent to the both-sided photosensitive material referred to as "crossover". Since light absorption due to the dye hinders image observation (medical diagnosis) in the final images, discoloration was conducted in the course of development in existing wet developing systems.

Also in the photothermographic material, it is desirable that there is no color residue due to the dye or the like in the final images.

While a great deal of efforts have been made for the development of various techniques regarding dyes for discoloration by heat development, a major technical bar exists in attaining the compatibility between the photographic performance of the image-forming layer and the discoloration of the dye, particularly, in the both-sided photothermographic material.

On the other hand, it has been proposed a method of forming images by using a fluorescence intensifying screen that emits light in a UV-region which does not require discoloration for the dye or does not require such dye per se since the light absorbability of the support itself can be utilized.

However, different from conventional silver halide photosensitive materials developed by a developer using water, the photothermographic material contains a great amount of additive compounds such as a reducing agent, an antifoggant and the like in the photosensitive material. The present inventors have found that the additive compounds have light absorbability in the UV region and the sensitivity is lowered since the emission of the fluorescence intensifying screen is interrupted by the absorption. In order to avoid the loss caused by absorption, it is effective to utilize the emission of the fluorescence intensifying screen in a region from 350 nm to 420 nm. Light in a region of 350 nm or shorter causes loss by the absorption of the photothermographic material and, on the other hand, light in the region of 420 nm or more can not be utilized effectively since the light absorbability of the silver halide photosensitive material is lowered. The invention employs a fluorescence intensifying screen, 50% or more of the entire emission light of which is included in a wavelength range of 350 nm to 420 nm. A fluorescent screen preferably has 70% or more of the entire emission light, and more preferably has 85% or more of the entire emission light in the above-mentioned wavelength region.

The wavelength range is, more preferably, from 360 nm to 420 nm and even more preferably from 370 nm to 420 nm.

The ratio of the emission light is calculated by the following method. The emission spectrum is measured while taking the emission wavelength at an equal distance as the antilog number on the abscissa and taking the number of emitted photons on the ordinate. The value obtained by dividing the area for the emission spectrum from 350 nm or more and 420 nm or less by the area for the entire emission spectrum on the chart is defined as the emitting ratio at a wavelength of 350 nm or more and 420 nm or less. When the emission light is present in such wavelength region, high sensitivity is attained in combination with the photothermographic material of the invention.

In order that most of emission light of the fluorescent material exist in the wavelength region described above, the half-value width of the emission light is preferably narrower. A preferred half-value width is 1 nm or more and 70 nm or less, more preferably, 5 nm or more and 50 nm or less and, and further preferably, 10 nm or more and 40 nm or less.

There is no particular restriction on the fluorescent material to be used so long as the light emission described above is obtained. For the purpose of improvement in sensitivity, the fluorescent material is preferably an Eu-activated fluorescent material having bivalent Eu as an emission center.

Specific examples of the fluorescent material are described below but the invention is not limited thereto.

BaFCl:Eu, BaFBr:Eu, BaFI:Eu and halogen compositions modified therefrom, $BaSO_4$:Eu, SrFBr:Eu, SrFCl:Eu, SrFI:Eu, (Sr, Ba)$Al_2Si_2O_8$:Eu, $SrB_4O_7F$:Eu, $SrMgP_2O_7$:Eu, $Sr_3(PO_4)_2$:Eu, and $Sr_2P_2O_7$:Eu.

A more preferred fluorescent material is a bivalent Eu activated barium halide series fluorescent material represented by the formula: $MX_1X_2$:Eu. M comprises Ba as a main ingredient, but may comprise a small amount of other compounds such as Mg, Ca and Sr. $X_1$ and $X_2$ each represent a halogen atom which can be selected arbitrarily from F, Cl, Br and I. $X_1$ is preferably fluorine. $X_2$ can be selected from Cl, Br and I and a composition comprising several of the halogen compounds in mixture can also be used preferably. $X_2$ is more preferably Br. Eu is europium. Eu as the emission center is contained at a ratio to Ba preferably of $10^{-7}$ or more and 0.1 or less, more preferably, $10^{-4}$ or more and 0.05 or less. A small amount of other compound may also be mixed preferably. Most preferred fluorescent materials can include BaFCl:Eu, BaFBr:Eu, and $BaFBr_{1-x}I_x$:Eu.

Figure 2:
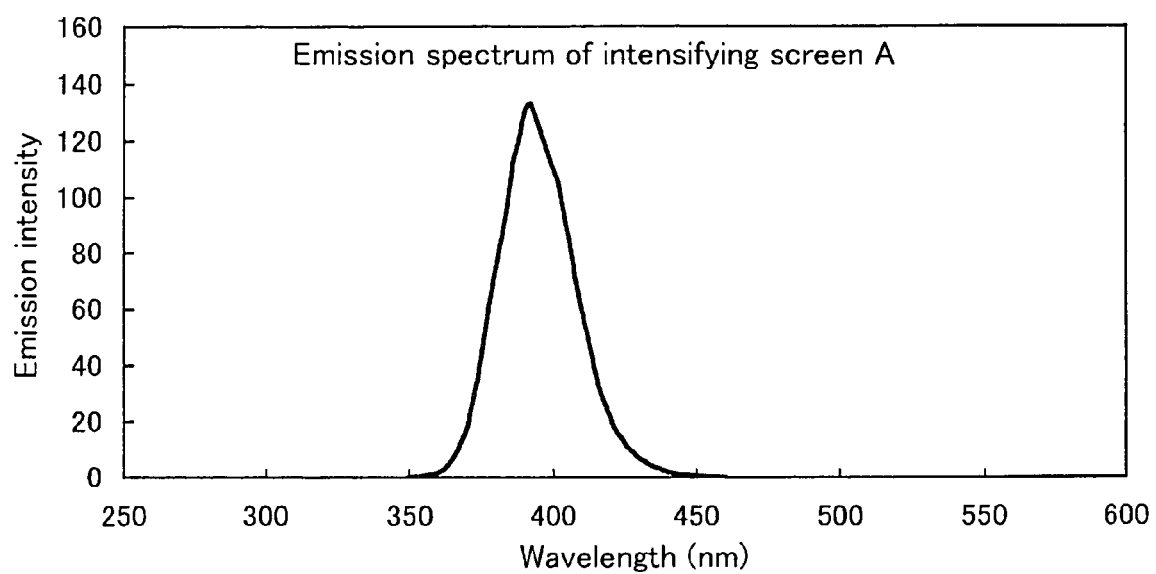
FIG. 2 shows an emission spectrum of a fluorescence intensifying screen A according to the invention.
Figure 3:
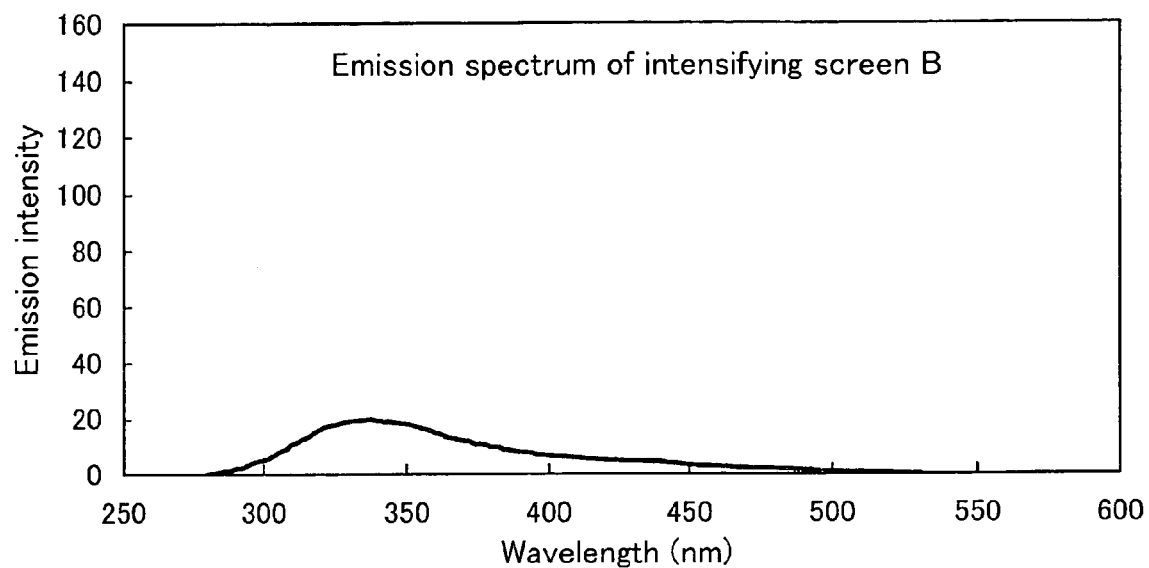
FIG. 3 shows an emission spectrum of a comparative fluorescence intensifying screen B.
Figure 4:
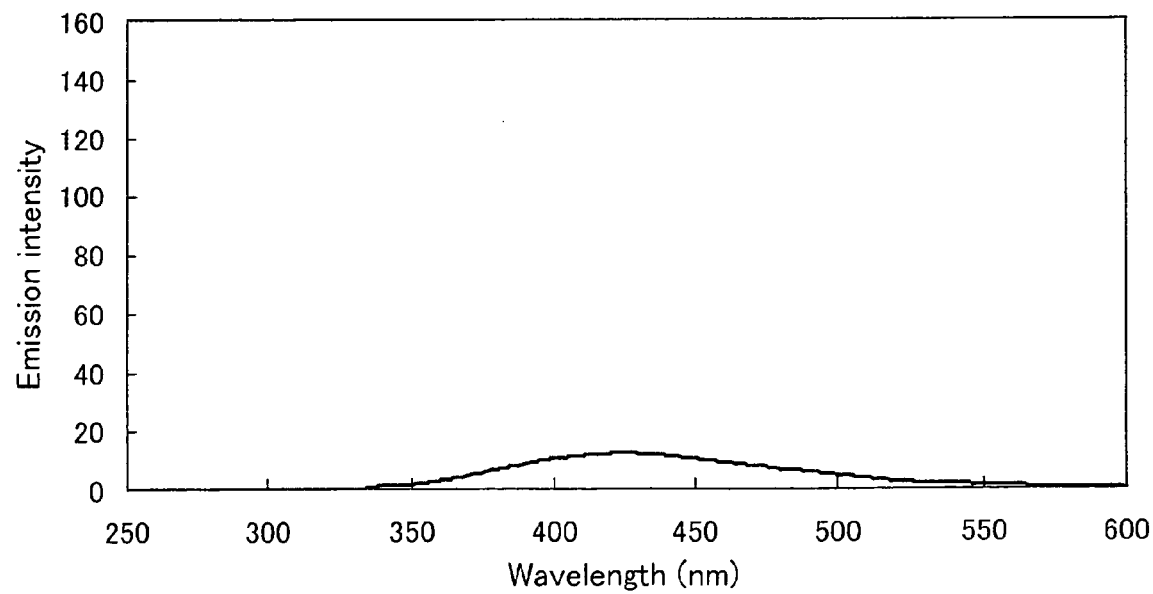
FIG. 4 shows an emission spectrum of X-ray regular screen HI-SCREEN B2 manufactured by Fuji Photo Film Co., Ltd.

FIG. 2 shows an X-ray excited emission spectrum of an intensifying screen A using BaFBr:Eu according to the invention. As comparative examples, FIG. 3 shows an emission spectrum of an intensifying screen B using $YTaO_4$ having an emission peak wavelength at 340 nm, and FIG. 4 shows a fluorescent spectrum of a screen using $CaWO_4$ having an emission peak wavelength at 425 nm.

Photothermographic Material

While the halogen composition of the photosensitive material according to the invention is optional, it is preferably selected from silver bromide, silver iodide and a mixture thereof. It is more preferably a high silver iodide. The high silver iodide used preferably in the invention has an intense direct transition absorption derived from the crystal structure thereof at a wavelength of preferably 420 nm or shorter. FIG. 1 shows the direct transition absorption derived from the high silver iodide.

The emission of the fluorescence intensifying screen having 50% or more of emission light in a range from 350 nm to 420 nm used in the invention can be utilized effectively by using such intense absorption, which is preferred for attaining the higher sensitivity. In the existing silver halides mainly comprising silver bromide used for the photosensitive material for photography, since the absorption for 350 nm to 420 nm is due to the indirect transition absorption, the light absorption coefficient is low and, accordingly, use of the fluorescent material having emission in a range from 350 nm to 420 nm was not always advantageous. However, use of the silver halide having an intense absorption inherent to the high silver iodide has turned over the situation.

For obtaining such direct transition absorption, it is preferred to have a high silver iodide phase with a local silver iodide content of 90 mol % or more.

Further, it has been found that such high silver iodide particles can be eliminated after the heat development according to a preferred embodiment of the invention. Heretofore, the existing photothermographic material with no fixing mechanism involves a problem of increasing the haze since the silver halide remains in the film also after the heat development and it was difficult to use the silver halide of large size at high sensitivity. However, the use of the silver halide of large size is enabled by the adoption of the fixing mechanism utilizing silver iodide and further higher sensitivity can be attained.

As described above, it has become possible to preferably attain high sensitivity necessary for photosensitive material used for photography by the development of a high silver iodide capable of fixing and a fluorescence intensifying screen having emission preferred for the absorption thereto.

Detailed descriptions are to be made for the respective items.

2. Fluorescence Intensifying Screen

The fluorescence intensifying screen comprises, preferably, a support, an undercoat layer on the support, a fluorescent material layer, and a surface protective layer.

The fluorescent material layer can be formed by dispersing particles of the fluorescent material into a solution of an organic solvent containing a binder resin to prepare a liquid dispersion, and then directly coating the liquid dispersion on a support (or on an undercoat layer in a case where an undercoat layer such as a light reflection layer is formed on the support), followed by drying. Alternatively, the liquid dispersion may be coated on a separately prepared provisional support, followed by drying to prepare a fluorescent body sheet, and then peeling the fluorescent material sheet from the provisional support and appending the sheet on a usual support by using an adhesive.

There is no particular restriction on the grain size of the fluorescent material particles and it is preferably within a range about from 1 µm to 15 µm and more preferably within a range about from 2 µm to 10 µm. The volumetric packaging rate of the fluorescent material particles in the fluorescent material layer is preferably higher. It is preferably within a range from 60 to 85%, more preferably within a range from 65 to 80%, and even more preferably within a range from 68 to 75% (the ratio of the fluorescent material particles in the fluorescent material layer is preferably 80% by weight or more, more preferably 90% by weight or more, and still more preferably 95% by weight or more). The binder resin, the organic solvent, and various kinds of optional additives used for forming the fluorescent material layer are described in various known literatures. The thickness of the fluorescent material layer can be set arbitrarily depending on the aimed sensitivity. Preferably, it is within a range from 70 µm to 150 µm for the screen on the front side, and within a range from 80 µm to 400 µm for the screen on the back side. The X-ray absorbability of the fluorescent material layer is determined depending on the coating amount of the fluorescent material particles.

The fluorescent material layer may be a single layer or may comprise two or more layers. It is preferably one to three layers and more preferably, one or two layers. For example, layers each comprising fluorescent material particles of different grain size with a relatively narrow grain size distribution may be stacked, in which the particle size may be smaller in the layer nearer to the support. It is particularly preferred to coat fluorescent material particles of larger grain size on the side of a surface protective layer and to coat fluorescent material particles of small grain size on the side of the support. Preferably, those of the smaller grain size are within a range from 0.5 µm to 2.0 µm and those of the larger grain size are within a range from 10 µm to 30 µm. Further, the fluorescent material layer may be formed by mixing fluorescent material particles of different grain size. Alternatively, as described in JP-B No. 55-33560, page 3, left column, line 3 to page 4, left column, line 39, a fluorescent material layer of a structure may be used in which the grain size distribution of the fluorescent material particles has a gradient. Usually, the fluctuation coefficient for the grain size distribution of the fluorescent material is within a range from 30 to 50% but a mono-dispersed fluorescent material particles with the fluctuation coefficient of 30% or less may also be used preferably.

It has been attempted to provide a preferred sharpness by dying the fluorescent material layer to the emission wavelength. However, a layer design to retain the dying as less as possible is used preferably. The absorption length of the fluorescent material layer is preferably 100 µm or more and more preferably 1000 µm or more.

The scattering length is designed as preferably 0.1 µm or more and 100 µm or less, and more preferably 1 µm or more and 100 µm or less. The scattering length and the absorption length can be calculated according to the calculation formula based on the Kubelka-Munk's theory.

The support can be properly selected and used depending on the purpose among various kinds of supports used for known fluorescence intensifying screens. For example, a polymer film containing a white pigment such as titanium dioxide or a polymer film containing a black pigment such as carbon black is used preferably. An undercoat layer such as a light reflection layer containing a light reflection material may be disposed to the surface of a support (surface on the side provided with the fluorescent material layer).

A surface protective layer is provided preferably on the surface of the fluorescent material layer. The light scattering length measured at the main emission wavelength of the fluorescent material is preferably within a range from 5 µm to 80 µm, more preferably within a range from 10 µm to 70 µm, and particularly preferably within a range from 10 µm to 60 µm. The light scattering length represents a mean distance for the straight propagation of light till scattering for once, and shorter scattering length means higher light scattering. Further, while the light absorption length expressing the mean free distance till the absorption of light is optional, it is preferable that the surface protective layer has no adsorption with a view point of the screen sensitivity since this causes less desensitization. In order to compensate insufficiency of scattering, a slight absorbability may be provided. The absorption length is preferably 800 µm or more, and particularly preferably 1200 µm or more. The light scattering length and the light absorption length can be calculated according to the calculation formula based on the Kubelka-Munk's theory by using the values measured by the following method.

At first, three or more film specimens having thickness different from each other and each having a composition identical with that of the surface protective layer to be measured are prepared. Then, the thickness (µm) and the diffuse transmittance factor (%) for each of the film specimens are measured. The diffusion transmittance factor can be measured by a device in which an integrating sphere is attached to a usual spectrophotometer. Upon measurement in the invention, a self-recording spectrophotometer (Model U-3210, manufactured by Hitachi Ltd.) provided with a 150 φ integrating sphere (150-0901) is used. It is necessary that the measuring wavelength is aligned with the peak wavelength of the main emission of the fluorescent material in the fluorescent material layer as an object to which the surface protective layer is provided. Then, the measured values for the thickness (µm) and the diffuse transmittance factor (%) for the film are introduced into the following formula (A) derived from the Kubelka-Munk's theoretical formula. Formula (A) can be introduced simply, for example, from the formulae in 5.1.12 to 5.1.15, page 403, in "Fluorescent Material Handbook" (edited by Fluorescent Material Dogakukai, published from Ohm Co in 1987) under the boundary condition for the diffuse transmittance factor T (%).

$$T/100=4\beta/[(1+\beta)^2\cdot\exp(\alpha d)-(1-\beta)^2\cdot\exp(-\alpha d)] \quad \text{Formula (A)}$$

In formula (A), T represents diffuse transmittance factor (%), d represents a film thickness (μm), and each of α and β is defined by the following formulae:

$$\alpha=[K\cdot(K+2S)]^{1/2}$$

$$\beta=[K/(K+2S)]^{1/2}$$

T (diffuse transmittance factor %) and d (film thickness: μm) measured for three or more films are introduced respectively into formula (A) to calculate K and S that satisfy formula (A). The scattering length (μm) is defined as 1/S and the absorption wavelength (μm) is defined as 1/K.

It is preferable that the surface protective layer has a constitution in which the light scattering particles are dispersed and contained in the resin material. The optical refractive index of the light scattering particles is preferably 1.6 or more, and more preferably 1.9 or more. Further, the grain size of the light scattering particles is usually within a range from 0.1 μm to 1.0 μm. Examples of the light scattering particles can include, for example, fine particles of aluminum oxide, magnesium oxide, zinc oxide, zinc sulfide, titanium oxide, niobium oxide, barium sulfate, lead carbonate, silicon oxide, polymethyl methacrylate, styrene, and melamine.

There is no particular restriction on the resin material used for forming the surface protective layer, and polyethylene terephthalate, polyethylene naphthalate, polyamide, alamide, fluoro resin and polyester resin can be used preferably. The surface protective layer can be formed by dispersing the light scattering particles into a solution of an organic solvent containing a resin material (binder resin) to prepare a liquid dispersion and directly coating the liquid dispersion on the fluorescent material layer (or by way of an optional auxiliary layer), followed by drying. Alternatively, a sheet for use in the protective layer formed separately may be appended on the fluorescent material layer by an adhesive. The thickness of the surface protective layer is usually within a range from 2 μm to 12 μm and, preferably, within a range from 3.5 μm to 10 μm.

Further, preferred manufacturing methods for fluorescence intensifying screens and materials used therefor are described specifically, for example, in JP-A No. 9-21899, page 6, left column, line 47 to page 8, left column, line 5, JP-A No. 6-347598, page 2, right column, line 17 to page 3, left column line 33, and page 3, left column line 42 to page 4, left column, line 22, the descriptions of which can be referred to.

It is preferable that the fluorescence intensifying screen according to the invention comprises a light reflecting layer between a support and a fluorescent material layer. The scattering length of the light reflecting layer is preferably in the range of 0.01 μm to 10 μm, more preferably 0.1 μm to 5 μm, the scattering length being measured at a wavelength of light emitted from the fluorescent material. The providing the light reflecting layer having the scattering length in the above range makes it possible to improve sharpness.

Specific examples of the light reflecting material which constitutes a light reflecting layer having a short scattering length include a white pigment such as $Al_2O_3$, $ZrO_2$, $BaSO_4$, $SiO_2$, ZnS, ZnO, $CaCO_3$, $Sb_2O_3$, $Nb_2O_5$, $2PbCO_3\cdot Pb(OH)_2$, MgO, $M^{II}FX$ ($M^{II}$ is at least one of Ba, Sr, and Ca, and X is at least one of Cl and Br), lithopone ($BaSO_4+ZnS$), magnesium silicate, basic lead silicosulfate, basic lead phosphate, and aluminum silicate; and hollow polymer particles. Among these light reflecting materials, the white pigment is preferable. Further, among these white pigments, the white pigment is preferably selected from the group consisting of alumina, yttrium oxide, zirconium oxide, lead fluoride, yttrium oxychloride and bismuth fluoride. The above-described light reflecting material may be used alone or in a combination of two or more thereof.

The scattering length of the light reflecting layer can be set 5 μm or less, for example, by deforming the shape of the light reflecting material into a shape deviated from a spherical shape as much as possible (e.g., into a shape having an uneven surface, a starfish-like shape, a star-like shape, or a star-shaped-candy-like shape), or alternatively by setting the particle size of the light reflecting material as close to the wavelengths as possible.

Specifically, it is preferable to set the bulk density of the light reflecting material at 1 $mg/cm^3$ or less, and preferably at 0.6 $mg/cm^3$ or less. The bulk density is generally expressed with a value obtained by dividing the mass of powder by the bulk volume. The term "bulk density" as used herein means the closest packing bulk density. The term "closest packing bulk density" as used herein means the bulk density obtained when the light reflecting material particles containing voids are packed most closely with vibration. The vibration may be performed mechanically or non-mechanically, e.g., manually.

In addition, it is preferable to set the BET specific surface area of the light reflecting material at 1.5 $m^2/g$ or more, more preferably 2 $m^2/g$ to 10 $m^2/g$, and still more preferably 2.5 $m^2/g$ to 8 $m^2/g$. The term "BET specific surface area" as used herein means the surface area of the light reflecting material per unit mass of the light reflecting material.

In addition, the average particle size of the light reflecting material is preferably one-fourth to twice the excitation wavelength. The excitation wavelength ordinarily employed is in the range of 0.5 μm to 0.8 μm. Therefore, the average particle size of the light reflecting material is preferably in the range of 0.125 μm to 1.6 μm.

If the binder enters into voids formed by the light reflecting material, a difference in refractive index will not be apt to occur, and the scattering length will become long. Therefore, the amount of the binder in the light reflecting layer is preferably as low as possible so as not to adversely affect the mechanical strength and the physical strength of the intensifying screen. The preferable weight ratio of the binder/the light reflecting layer is in the range of 1/5 to 1/200, and more preferably 1/15 to 1/50.

3. Photothermographic Material

The photothermographic material according to the invention has, on at least one surface of a support, an image-forming layer containing at least a photosensitive silver halide, a non-photosensitive organic silver salt, a reducing agent, and a binder. It may also have, preferably, a surface protective layer on the image-forming layer, or a back layer or a back protective layer on the opposite side thereof. Constitution for each of the layers and preferred ingredients thereof are to be described specifically.

Description for Photosensitive Silver Halide

1) Halogen Composition

It is preferable that the halogen composition used in the invention has a composition at a high silver iodide content of 40 mol % or more and 100 mol % or less. The residue may be selected, with no particular restriction, from a silver halide such as silver chloride and silver bromide or an organic silver salt such as silver thiocyanate or silver phosphate, with silver bromide or silver chloride being particularly preferred.

Further, the silver iodide content is more preferably 80 mol % or more and 100 mol % or less, and still more preferably 90 mol % or more and 100 mol % or less.

The distribution of the halogen composition in the particle may be uniform, or the halogen composition may change stepwise, or it may change continuously. Further, silver halide particle having a core/shell structure can also be used preferably. Structurally preferred are those having a 2 to 5 multi-layered structure and, more preferably, a core/shell particle of 2 to 4 multi-layered structure can be used. A high silver iodide core structure in which the silver iodide content is higher in the core, or a high silver shell iodide structure in which the silver iodide content is higher in the shell can also be used preferably. Further, a technique of localizing silver chloride or silver bromide formed as an epitaxial portion on the surface of the particle can also be used preferably.

The silver iodide in the invention can contain optional β-phase or γ-phase content. The β-phase means a high silver iodide structure having a hexagonal system wurtzite structure and the γ-phase means a high silver iodide structure having a cubic system zinc blend structure. The β-phase content is determined by using a method proposed by C. R. Berry. The method determines the content based on a peak ratio for the silver iodide β-phase (100), (101) and (002) and the γ-phase (111) by a powder X-ray diffraction method, and details can be referred, for example, to Physical Review, Vol. 161, No, 3, P 848–851 (1967).

By the use of silver halide containing high content of silver iodide, a strong absorption of a silver halide derived from the crystal structure thereof can be obtained in the wavelength region shorter than about 420 nm. It is desired to effectively utilize the absorption in order to obtain sensitivity that is necessary in the photosensitive material of the invention used for photography.

2) Particle Size

For the silver halide of high silver iodide content used in the invention, a large particle in size can be selected so as to be enough to attain high sensitivity. In the invention, a mean sphere-equivalent diameter of the silver halide is preferably 0.3 μm or more and 5.0 μm or less, and more preferably 0.35 μm or more and 3.0 μm or less. The mean sphere-equivalent diameter means herein a diameter of a sphere having a volume identical with the volume of a silver halide particle. This can be obtained by a measuring method of determining a particle volume based on individual projection area and thickness by electron microscopic observation and converting the same to a sphere of a volume identical therewith.

3) Coating Amount

Generally, in a case of a photothermographic material in which the silver halide remains as it is after the heat development, the coating amount of the silver halide was restricted to a low level in spite of the demand increasing the sensitivity since the transparency of the film is lowered as the coating amount of the silver halide is increased which is not preferred in view of the image quality. However, in the case of the invention, since the haze of the film caused by the silver halide can be decreased by the heat development, more silver halide can be coated. In the invention, it is preferably 0.5 mol % or more and 100 mol % or less, and more preferably 5 mol % or more and 50 mol % or less based on 1 mol of silver for the non-photosensitive organic silver salt.

4) Particle Forming Method

The method of forming the photosensitive silver halide is well-known in the relevant art and, for example, a method described in Research Disclosure No. 17029, June 1978 and U.S. Pat. No. 3,700,458 can be used. Specifically, a method of preparing a photosensitive silver halide by adding a silver supply compound and a halogen supply compound in a gelatin or other polymer solution and then mixing them with an organic silver salt is used. Further, a method described in JP-A No. 11-119374, column Nos. 0217 to 0224 and a method described in JP-A Nos. 11-352627 and 2000-347335 are also preferred. For the method of forming plate particles of silver iodide those methods described in JP-A Nos. 59-119350 and 59-119344 are used preferably.

5) Particle Shape

The shape of the silver halide particles in the invention can include, for example, cuboide particle octahedron particle, dodecahedron particle, tetradecahedron particle, plate particle, sphere particle, rod-like particle and potato-like particle. Dodecahedron particle, tetradecahedron particle and plate particle are preferred. The dodecahedron particle means herein a particle having (001), {1(−1)0}, and {101} faces, and the tetradecahedral particle is a particle having (001), {100}, {101} faces. {100} face and {101} face represent a group of crystal faces having plane index equivalent with (100) and (101) face, respectively.

Dodecahedron, tetradecahedron and octahedron particles of silver iodide can be prepared with reference to JP-A Nos. 2004-004586 (and US 2003/224305, the disclosure of which is incorporated by reference herein), 2003-287835 and 2003-287836.

As the shape of the silver halide particle in the invention, plate particle is particularly preferred. The aspect ratio of the plate particle is preferably 2 or more and more preferably 2 to 50.

The silver halide of a composition having high silver iodide content in the invention can take a complicate form and the preferred form can include, for example, a joined particle shown by R. L. JENKINS, et al., in J. of Phot. Sci. vol. 28 (1980), p 164—FIG. 1. A plate particle shown in FIG. 1 can also be used preferably. A particle rounded at the corners of the silver halide particle can also be used preferably. While there is no particular restriction on the index of plane (Mirror's index) of the photosensitive silver halide particle, it is preferable that the ratio of [100] face is higher, in which the spectral sensitizing efficiency is higher in a case of adsorption of a spectral sensitizing dye. The ratio is preferably 50% or more, more preferably 65% or more, and further preferably 80% or more.

The ratio of the Mirror's index [100] face can be determined by the method of utilizing the adsorption dependence of the [111] face and [100] face upon adsorption of a sensitizing dye described by T. Tani; in J. Imaging Sci., 29, 165 (1985).

6) Heavy Metal

The photosensitive silver halide particle of the invention may contain metals or complexes of metals belonging to groups 6 to 13 of the periodical table (showing groups 1 to 18). The photosensitive silver halide particle may more preferably contain metals or complexes of metals belonging to groups 6 to 10 of the periodical table. Preferable examples of the metal or the center metal of the metal complex in the groups 6 to 10 of the periodical table include rhodium, ruthenium, iridium and iron. The metal complex may be used alone, or two or more kinds of complexes comprising identical or different species of metals may be used together.

A preferred content is within a range from $1\times10^{-9}$ mol to $1\times10^{-3}$ mol based on one mol of silver. The heavy metals, metal complexes and the addition method thereof are described in JP-A No. 7-225449, JP-A No.11-65021, column Nos. 0018 to 0024 and JP-A No. 11-119374, column Nos. 0227 to 0240.

In the present invention, a silver halide particle in which a hexacyano metal complex is present on the outermost surface of the particle is preferred. The hexacyano metal complex includes, for example, $[Fe(CN)_6]^{4-}$, $[Fe(CN)_6]^{3-}$, $[Ru(CN)_6]^{4-}$, $[Os(CN)_6]^{4-}$, $[Co(CN)_6]^{3-}$, $[Rh(CN)_6]^{3-}$, $[Ir(CN)_6]^{3-}$, $[Cr(CN)_6]^{3-}$, and $[Re(CN)_6]^{3-}$. In the invention, hexacyano Fe complex is preferred.

The hexacyano metal complex can be added while being mixed with water, as well as a mixed solvent of water and an appropriate organic solvent miscible with water (for example, alcohols, ethers, glycols, ketones, esters and amides) or gelatin.

The addition amount of the hexacyano metal complex is, preferably, $1\times10^{-5}$ mol or more and $1\times10^{-2}$ mol or less and, more preferably, $1\times10^{-4}$ mol or more and $1\times10^{-3}$ or less based on one mol of silver.

The hexacyano metal complex is caused to be present on the outermost surface of a silver halide particle by adding the hexacyano metal complex directly after completion of addition of an aqueous solution of silver nitrate used for particle formation, before completion of charging step prior to a chemical sensitization step of conducting chalcogen sensitization such as sulfur sensitization, selenium sensitization and tellurium sensitization or noble metal sensitization such as gold sensitization, during water washing step, during dispersion step or before chemical sensitization step. In order not to grow the fine silver halide particle, the hexacyano metal complex is added preferably soon after the particle formation and it is preferably added before completion of the charging step.

Further metal atoms that can be contained in the silver halide particle used in the invention (for example, $[Fe(CN)_6]^{4-}$), a desalting method and a chemical sensitization method of a silver halide emulsion are described in JP-A No.11-84574, column Nos. 0046 to 0050, JP-A No.11-65021, column Nos. 0025 to 0031, and JP-A No.11-119374, column Nos. 0242 to 0250.

7) Gelatin

As the gelatin contained in the photosensitive silver halide emulsion used in the invention, various kinds of gelatins can be used. For favorably keeping the dispersion state of the photosensitive silver halide emulsion in the coating solution containing the organic silver salt, a low molecular weight gelatin having a molecular weight of 500 to 60,000 is used preferably. The low molecular weight gelatin may be used upon formation of particles or upon dispersion after the desalting treatment but it is preferably used upon dispersion after the desalting treatment.

8) Chemical Sensitization

When the photosensitive silver halide used in the invention may not be chemically sensitized, it is preferably sensitized chemically by at least one of methods of the chalcogen sensitizing method, the gold sensitizing method and the reducing sensitizing method. The chalcogen sensitization method can include, sulfur sensitization, selenium sensitization, and tellurium sensitization.

In the sulfur sensitization, instable sulfur compounds are used and instable sulfur compounds described, for example, in Chemie et Physique Photographique, written by P. Grafkides (published from Paul Momtel Co. in 1987, 5th edition), and Journal of Research Disclosure, vol. 307, No. 307105 can be used.

Specifically, known sulfur compounds such as thiosulfates (for example, hypo), thioureas (for example, diphenyl thiourea, triethyl thiourea, N-ethyl-N'-(4-methyl-2-thiazolyl) thiourea, carboxymethyl trimethyl thiourea), thioamides (for example, thioacetoamide), rhodanines (for example, diethyl rhodanine and 5-benzylidene-N-ethylrhodanine), phosphine sulfides (for example, trimethyl phosphine sulfide), thiohydantoins, 4-oxo-oxazolydine-2-thiones, disulfides or polysulfides (for example, dimorpholine disulfide, cystine, or lenthionine (1,2,3,5,6-pentathiepane), polythionate and elemental sulfur, as well as active gelatin can also be used. Particularly, thiosulfates, thioureas and rhodanines are preferred.

In the selenium sensitization, instable selenium compounds are used and selenium compounds described, for example, in JP-B Nos. 43-13489, and 44-15748, JP-A Nos. 4-25832, 4-109340, 4-271341, 5-40324, 5-11385, 6-051415, 6-175258, 6-180478, 6-208186, 6-208184, 6-317867, 7-092599, 7-098483 and 7-140579 can be used.

Specifically, colloidal metallic selenium, selenoureas (for example, N,N-dimethyl selenourea, trifluoromethylcarbonyl-trimethyl selenourea and acetyltrimethyl selenourea), selonoamides (for example, selenoamide, N,N-diethylphenyl selenoamide), phosphine selenides (for example, triphenyl phosphine selenide, pentafluorophenyl-triphenylphospnine selenide), selenophosphates (for example, tri-p-tolylselenophosphate, and tri-n-butylselenophosphate), selenoketones (for example, seleno benzophenone), isoselenocyanates, selenocarboxylic acids, seleno esters and diacylselenides may be used. Further, non-unstable selenium compounds as described, for example, in JP-B Nos. 46-4553 and 52-34492, such as selenious acid, selenocyanate, selenazoles and selenides can also be used. Particularly, phosphine selenides, selenoureas and selenocyanates are preferred.

In the tellurium sensitization, instable tellurium compounds are used and instable tellurium compounds described, for example, in JP-A Nos. 4-224595, 4-271341, 4-333043, 5-303157, 6-27573, 6-175258, 6-180478, 6-208186, 6-208184, 6-317867, 7-140579, 7-301879 and 7-301880 may also be used.

Specifically, phosphinetellurides (for example, butyl-diisopropyl phosphinetelluride, tributyl phosphinetelluride, tributoxyphosphinetelluride, ethoxy-diphenylphosphinetelluride), diacyl(di)tellurides (for example, bis(diphenylcarbamoyl)ditelluride, bis(N-phenyl-N-methylcarbamoyl)ditelluride, bis(N-phenyl-N-methylcarbamoyl)telluride, bis(N-phenyl-N-benzylcarbamoyl)telluride, bis(ethoxycarbonyl) telluride, telluroureas (for example, N,N'-dimethylethylene tellulourea, N,N'-diphenylethylene tellurourea), telluroamides, and telluro esters may be used. Particularly, diacyl(di) tellurides and phosphinetellurides are preferred and, particularly, compounds described in the literature cited in JP-A No. 11-65021 at column No. 0030 and compounds shown by formulae (II), (III), and (IV) in JP-A No. 5-313284 are more preferred.

Particularly, selenium sensitization and tellurium sensitization are preferred as the chalcogen sensitization in the invention, and tellurium sensitization is particularly preferred.

In the gold sensitization, gold sensitizers described in Chemie et Physique Photographique, written by P. Grafkides (published from Paul Momtel Co. in 1987, 5th edition), and Journal of Research Disclosure, vol. 307, No. 307105 can be used. Specifically, they are chloroauric acid, potassium chloroaurate, potassium aurithiocyanate, gold sulfide and gold selenide and, in addition, gold compounds described, for example, in U.S. Pat. Nos. 2,642,361, 5,049,484, 5,049,485, 5,169,751, 5,252,455, and Belgium Patent No. 691857 can also be used. Further, salts of noble metal other than gold such as platinum, palladium and iridium described in Chemie et Physique Photographique, written by P. Grafkides (published from Paul Momtel Co. in 1987, 5th edition), and Journal of Research Disclosure, vol. 307, No. 307105 can also be used.

While gold sensitization may be used alone, it is used preferably in combination with the chalcogen sensitization. Specifically, this is gold sulfur sensitization, gold selenium sensitization, gold tellurium sensitization, gold sulfur selenium sensitization, gold sulfur tellurium sensitization, gold selenium tellurium sensitization, and gold sulfur selenium tellurium sensitization.

In the invention, chemical sensitization can be conducted, after desalting, at any timing after forming particles and before coating and it can include (1) before spectral sensitization, (2) simultaneously with spectral sensitization, (3) after spectral sensitization, and (4) just before coating.

The amount of the chalcogen sensitizer used in the invention varies depending on silver halide particles used and the chemical aging conditions, and it is preferably about $10^{-8}$ to $10^{-1}$ mol, and more preferably $10^{-7}$ to $10^{-2}$ mol per one mol of the silver halide.

In the same manner, the addition amount of the gold sensitizer used in the invention is different depending on various conditions and it is preferably $10^{-7}$ to $10^{-2}$ mol, and more preferably $10^{-6}$ to $5 \times 10^{-3}$ mol per 1 mol of the silver halide. While any circumstantial condition may be selected for chemical sensitization of the emulsion, pAg is preferably 8 or less, more preferably 7.0 or less, even more preferably 6.5 or less, and particularly preferably 6.0 or less, and pAg is preferably 1.5 or more, more preferably 2.0 or more, and particularly preferably 2.5 or more. pH is preferably 3 to 10, and more preferably 4 to 9, and the temperature is preferably about 20 to 95° C., and more preferably 25 to 80° C.

In the invention, the reducing sensitization can further be used together in addition to the chalcogen sensitization or gold sensitization. Particularly preferably, it is used together with the chalcogen sensitization.

As the specific compound for the reducing sensitization, ascorbic acid, thiourea dioxide or dimethyl amine borane is preferred, as well as use of stannous chloride, aminoimino methane sulfinic acid, hydrazine derivatives, borane compounds, silane compounds, polyamine compounds and the like is preferred. The reducing sensitizer may be added at any stage in the photosensitive emulsion production process from crystal growth to the preparation step just before coating. Further, it is preferred to apply reducing sensitization by ripening while keeping pH to 8 or higher or pAg to 4 or lower for the emulsion, and it is also preferred to apply reducing sensitization by introducing a single addition portion of silver ions during particle formation.

The addition amount of the reducing sensitizer may vary depending on various conditions and it is preferably about $10^{-7}$ mol to $10^{-1}$ mol, and more preferably $10^{-6}$ to $5 \times 10^{-2}$ mol per one mol of the silver halide.

To the silver halide emulsion used in the invention, a thiosulfonic acid compound may be added by the method shown in EP-A No. 293917.

It is preferable that the photosensitive silver halide particle used in the invention is chemically sensitized by at least one of the methods of gold sensitization or chalcogen sensitization with a view point of designing for the highly sensitive photothermographic material.

9) Compound in Which a One-Electron Oxidant Formed by one-Electron Oxidation Can Release One Electron or More Electrons The photothermographic material in the invention preferably contains a compound in which a one-electron oxidant formed by one-electron oxidation can release one electron or more electrons. The compound is used alone or together with the various chemical sensitizers described above and can increase the sensitivity of the silver halide.

The compound in which a one-electron oxidant formed by one-electron oxidation can release one electron or more electrons contained in the photosensitive material of the invention is a compound selected from the following types 1 and 2.

Type 1 and Type 2 compounds contained in the photothermographic material of the invention are to be described.

Type 1

A compound in which a one-electron oxidant formed by one-electron oxidation can further release one or more electrons accompanying successive bonding cleavage reaction.

Type 2

A compound in which a one-electron oxidant formed by one-electron oxidation can further release one or more electrons after successive bonding forming reaction.

At first the type 1 compound is described.

The type 1 compound in which a one-electron oxidant formed by one-electron oxidation can further release one electron accompanying successive bonding cleavage reaction can include those compounds which are referred to as "1-photon 2-electron sensitizing agent" or "deprotonating electron donating sensitizing agent" described in patent literatures such as JP-A No. 9-211769 (specific examples: compounds PMT-1 to S-37 described in Table E and Table F in pages 28-32), JP-A Nos. 9-211774, and 11-95355 (specific examples: compounds INV 1 to 36), JP-W No. 2001-500996 (specific examples; compounds 1 to 74, 80 to 87, and 92 to 122), U.S. Pat. Nos. 5,747,235 and 5,747,236, EP No. 786692 A1 (specific examples: compounds INV 1 to 35), EP-A No. 893732 A1, U.S. Pat. Nos. 6,054,260 and 5,994,051. Further, preferred ranges for the compounds are identical with the preferred ranges described in the cited patent specifications.

The type 1 compound in which a one-electron oxidant formed by one-electron oxidation can further release one electron or more electrons accompanying successive bonding cleavage reaction can include those compounds represented by formula (1) (identical with formula (1) described in JP-A No. 2003-114487), formula (2) (identical with formula (2) described in JP-A No. 2003-114487), formula (3) (identical with formula (1) described in JP-A No. 2003-114488), formula (4) (identical with formula (2) described in JP-A No. 2003-114488), formula (5) (identical with formula (3) described in JP-A No. 2003-114488), formula (6) (identical with formula (1) described in JP-A No. 2003-75950), formula (7) (identical with formula (2) described in JP-A No. 2003-75950), formula (8) (identical with formula (1) described in Japanese Patent Application No. 2003-25886, which has not been published at the time of the present application), and formula (9) (identical with formula (3) described in Japanese Patent Application No. 2003-33446, which has not been published at the time of the present application) among the compounds capable of causing reaction represented by the chemical reaction formula (1) (identical with chemical reaction formula (1) described in Japanese Patent Application No. 2003-33446, which has not been published at the time of the present application). Further, preferred ranges for the compounds are identical with the preferred ranges described in the cited patent specifications. The disclosure of the above-described patent documents are incorporated by reference herein.

Formula (1)

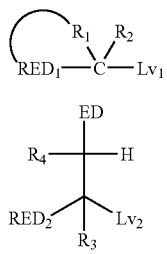

Formula (2)

$$R_4 \overset{ED}{\underset{RED_2}{\overset{|}{\underset{|}{C}}}} \overset{H}{\underset{Lv_2}{}}$$

In formulae (1) and (2), $RED_1$ and $RED_2$ each independently represent a reducing group. $R_1$ represents a group of non-metal atoms capable of forming, together with the carbon atom (C) and $RED_1$, a cyclic structure corresponding to a tetrahydro form or a hexahydro form of a 5-membered or 6-membered aromatic ring (including aromatic heterocyclic ring), $R_2$, $R_3$ and $R_4$ each independently represent a hydrogen atom or a substituent, $Lv_1$ and $Lv_2$ each independently represent a leaving group, and ED represents an electron donating group.

Formula (3)

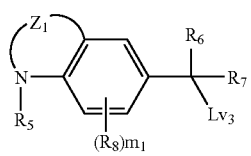

Formula (4)

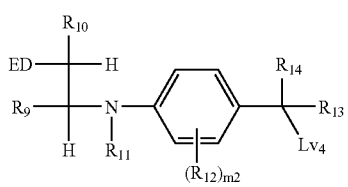

Formula (5)

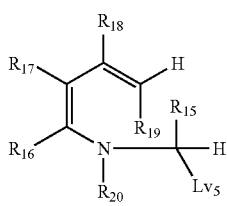

In formulae (3), (4) and (5), $Z_1$ represents a group of atoms capable of forming a 6-membered ring together with a nitrogen atom and two carbon atoms of the benzene ring, $R_5$, $R_6$, $R_7$, $R_9$, $R_{10}$, $R_{11}$, $R_{13}$, $R_{14}$, $R_{15}$, $R_{16}$, $R_{17}$, $R_{18}$ and $R_{19}$ each independently represent a hydrogen atom or a substituent, $R_{20}$ represents a hydrogen atom or a substituent, in which $R_{16}$ and $R_{17}$ are joined to each other to form an aromatic ring or aromatic heterocyclic ring in a case where $R_{20}$ represents a group other than the aryl group, $R_8$ and $R_{12}$ each independently represent a substituent capable of substituting the benzene ring, m1 represents an integer of 0 to 3, m2 represents an integer of 0 to 4 and $Lv_3$, $Lv_4$ and $Lv_5$ each independently represent a leaving group.

Formula (6)

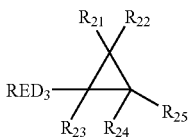

Formula (7)

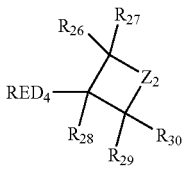

In formulae (6) and (7), $RED_3$ and $RED_4$ each independently represent a reducing group, $R_{21}$ to $R_{30}$ each independently represent a hydrogen atom or a substituent, $Z_2$ represents $-CR_{111}R_{112}-$, $-NR_{113}-$, or $-O-$, $R_{111}$ and $R_{112}$ each independently represent a hydrogen atom or a substituent, and $R_{113}$ represents a hydrogen atom, alkyl group, aryl group or heterocyclic group.

Formula (8)

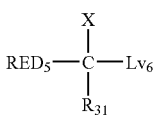

In formula (8), $RED_5$ is a reducing group, which represents an aryl amino group or heterocyclic amino group, $R_{31}$ represents a hydrogen atom or a substituent, X represents an alkoxy group and aryloxy group, heterocyclicoxy group, alkylthio group, arylthio group, heterocyclicthio group, alkylamino group, arylamino group, or heterocyclic amino group. $Lv_6$ is a leaving group which represents a carboxyl group or a salt thereof, or a hydrogen atom.

Chemical reaction formula (1)

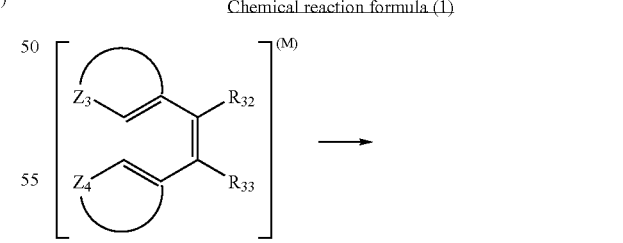

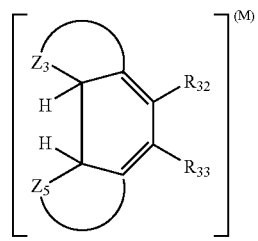

-continued

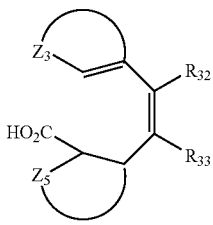

Formula (9)

The compound represented by formula (9) is a compound causing bonding forming reaction represented by the chemical reaction formula (1) by further oxidation after 2-electron oxidation accompanying decarbonation. In the chemical reaction formula (1), $R_{32}$ and $R_{33}$ each independently represent a hydrogen atom or a substituent, $Z_3$ represents a group forming a 5-membered or 6-membered heterocyclic ring together with C=C, $Z_4$ represents a group forming a 5-membered or 6-membered aryl group or heterocyclic group together with C=C, M represents a radial, radical cation or cation. In formula (9), $R_{32}$ and $R_{33}$, $Z_3$ have the same meanings as those for the chemical reaction formula (1), $Z_5$ represents a group forming a 5-membered or 6-membered cycloaliphatic hydrocarbon group or heterocyclic group together with C—C.

Then the type 2 compound is to be described.

The type 2 compound in which one-electron oxidant formed by one-electron oxidation can further release one electron or more electrons accompanying successive bonding forming reaction can include those compounds represented by formula (10) (identical with formula (1) described in JP-A No. 2003-140287), and those compounds capable of causing reaction represented by the chemical reaction formula (1) (identical with chemical reaction formula (1) described in Japanese Patent Application No. 2003-33446, which has not been published at the time of the present application) represented by formula (11) (identical with formula (2) described in Japanese patent Application No. 2003-33446, which has not been published at the time of the present application). Preferred ranges for the compounds are identical with preferred ranges described in the cited patent specifications.

RED$_6$-Q-Y        Formula (10)

In formula (10), RED$_6$ represents a reducing group subjected to one-electron oxidation, Y represents a reaction group including a carbon-carbon double bond site, carbon-carbon triple bond site, aromatic group site, or a non-aromatic heterocyclic site formed by condensation of benzo ring capable of reacting with one-electron oxidant formed by one-electron oxidation of RED$_6$ and forming a new bond, and Q represents a connection group connecting RED$_6$ and Y.

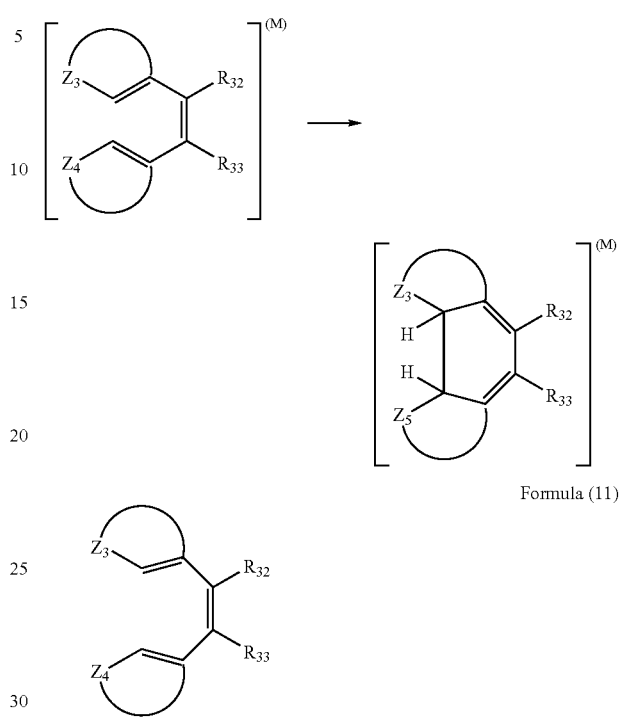

Chemical reaction formula (1)

Formula (11)

The compound represented by formula (11) is a compound causing the bonding forming reaction represented by the chemical reaction formula (1) upon oxidation. In the chemical reaction formula (1), $R_{32}$ and $R_{33}$ each independently represent a hydrogen atom or a substituent, $Z_3$ represents a group forming, together with C=C, a 5-membered or 6-membered heterocyclic group, $Z_4$ represents a group forming a 5-membered or 6-membered aryl group or hetercyclic group together with C=C, $Z_5$ represents a group forming a 5-membered or 6-membered cycloaliphatic hydrocarbon group or heterocyclic group together with C—C, and M represents a radical, radical cation or cation. In formula (11), $R_{32}$, $R_{33}$, $Z_3$, $Z_4$ have the same meanings as those in the chemical reaction (1).

Among the type 1 and type 2 compounds, preferred are "compound having an adsorptive group to silver halide in the molecule" or "compound having a partial structure of a spectral sensitizing dye in the molecule". A typical absorptive group to the silver halide is a group described in the specification of JP-A No. 2003-156823, page 16, right column, line 1 to page 17, right column, line 12. The partial structure for the spectral sensitizing dye is a structure described in the above-mentioned specification, page 17, right column, line 34 to page 18, left column, line 6.

Among the type 1 and type 2 compounds, more preferred are "compound having at least one adsorptive group to silver halide in the molecule" and, further preferably, "compound having two or more absorptive groups to silver halide in the identical group". In a case where two or more absorptive groups are present in a single molecule, the absorptive groups may be identical or different with each other.

Preferred adsorptive groups can include a mercapto-substituted nitrogen-containing heterocyclic group (for example, 2-mercaptothiadiazole group, 3-mercapto-1,2,4-triazole group, 5-mercaptotetrazole group, 2-mercapto-1,3,4-oxathiazole group, 2-mercaptobenzoxazole group, 2-mercaptobenzthiazole group, 1,5-dimethyl-1,2,4-triazolium-3-thiorate group, etc.), or a nitrogen-containing hetero-ring group having —NH— group capable of forming imino silver (>NAg) as a partial structure of the heterocyclic (for example, benzotriazole group, benzimadazole group, indazole group, etc.). Particularly preferred are 5-mercaptotetrazole group, 3-mercapto-1,2,4-triazole group, and benzotriazole group and, most preferred are 3-mercapto-1,2,4-triazole group and 5-mercaptotetrazole group.

Absporptive group having two or more mercapto groups in the molecule as the partial structure are also particularly preferred. The mercapto group (—SH), in a case where it is tautomerically isomerizable, may form a thion group. Preferred examples of adsorptive groups having two or more mercapto groups as the partial structure (for example, dimercapto substituted nitrogen-containing heterocyclic group) can include a 2,4-dimercaptopyrimidine group, 2,4-dimercaptotriazine group, and 3,5-dimercapto-1,2,4-triazole group.

A quaternary salt structure of nitrogen or phosphorus can also be used preferably as the absorptive group. The quaternary salt structure of nitrogen can include, specifically, an ammonio group (trialkyl ammonio group, dialkylaryl (or heteroaryl) ammonio group, alkyldiaryl (or heteroaryl) ammonio group) or a group containing a nitrogen-containing heterocyclic group containing a quatenarized nitrogen atom. The quaternary salt structure of phosphorus can include a phosphonio group (trialkyl phosphonio group, dialkylaryl or heteroaryl) phosphonio group, alkyldiaryl (or heteroaryl) phosphonio group, triaryl (or heteroaryl) phosphonio group. More preferably, a quaternary salt structure of nitrogen is used and, further preferably, a 5-membered or 6-membered nitrogen containing aromatic heterocyclic group containing quaternarized nitrogen atom is used. Particularly preferably, a pyridinio group, quinolinio group or isoquinolinio group is used. The nitrogen-containing heterocyclic group containing the quaternarized nitrogen atom may have an optional substituent.

Examples for the counter anion of the quaternary salt can include, for example, halogen ion, carboxylate ion, sulfonate ion, sulfate ion, perchlorate ion, carbonate ion, nitrate ion, $BF_4^-$ $PF_6^-$ and $Ph_4B$. In a case where there exists a group having negative charges such as on a carboxylate group in the molecule, it may form an intramolecular salt therewith. As the counter anion not present in the molecule, chlorine ion, bromine ion or methane sulfonate ion is particularly preferred.

The preferred structure of the compound represented by the types 1 and 2 having the quaternary salt structure of nitrogen or phosphorus as the adsorptive group is represented by formula (X).

$$(P-Q_1-)_i-R(-Q_2-S)_j \qquad \text{Formula (X)}$$

In formula (X), P and R each independently represent a quaternary salt structure of nitrogen or phosphorus which is not a partial structure of the sensitizing dye, $Q_1$ and $Q_2$ each independently represent a connection group, specifically, a single bond, alkylene group, arylene group heterocyclic group, —O—, —S—, —$NR_N$—, —C(=O)—, —$SO_2$—, —SO—, —P(=O)— each alone or in combination of such groups in which $R_N$ represents a hydrogen atom, alkyl group, aryl group, or heterocyclic group, S represents a residue formed by removing one atom from the compound represented by type (1) or (2), i and j each independently represent an integer of 1 or greater and are selected within a range of i+j of from 2 to 6. Preferably, i is 1 to 3 and j is 1 to 2 and, more preferably, i is 1 or 2 and j is 1 and, most preferably, i is 1 and j is 1. In the compound represented by formula (X), the total number of carbon atoms thereof is preferably within a range from 10 to 100 and, more preferably, 10 to 70 and, further preferably, 11 to 60 and, particularly preferably, 12 to 50.

Specific examples for the compounds represented by type 1 and type 2 are set forth below but the invention is not restricted to them.

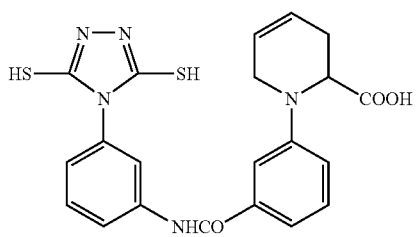

1

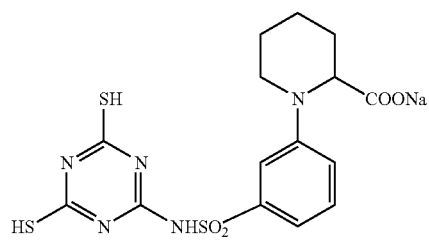

2

-continued
| 3 | 4 |
|---|---|
| 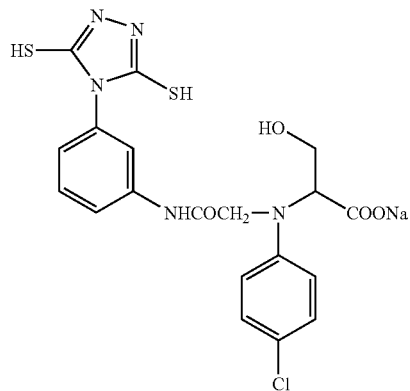 | 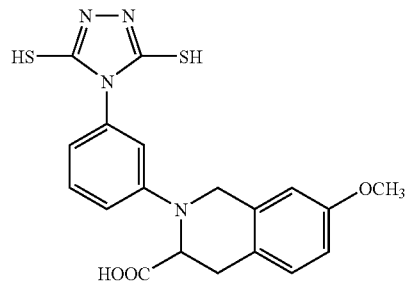 |
| 5 | 6 |
|---|---|
| 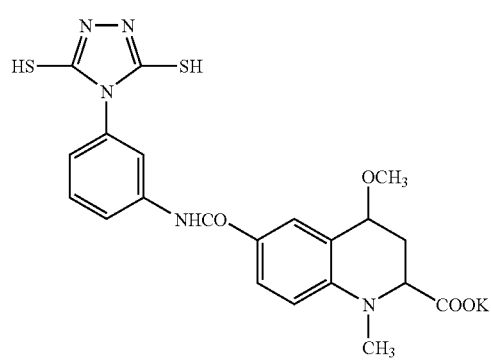 | 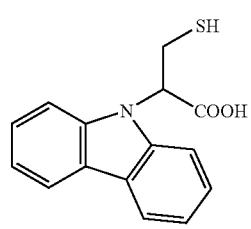 |
| 7 | 8 |
|---|---|
| 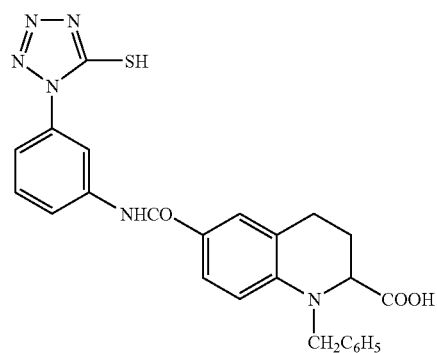 | 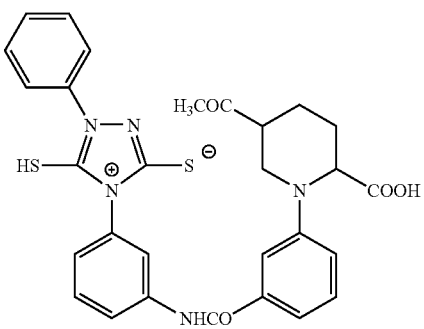 |
| 9 | 10 |
|---|---|
| 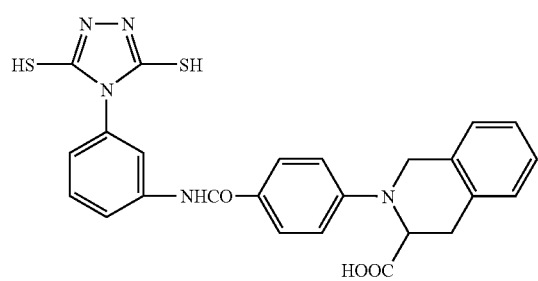 | 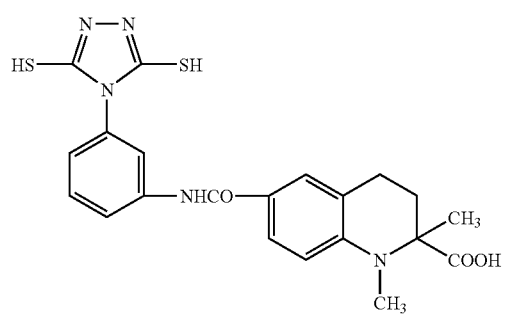 |

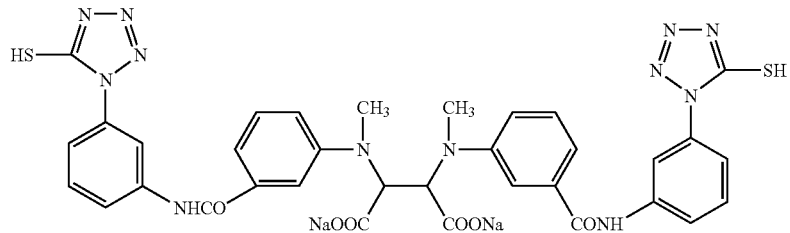
11
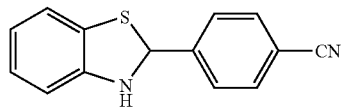
12
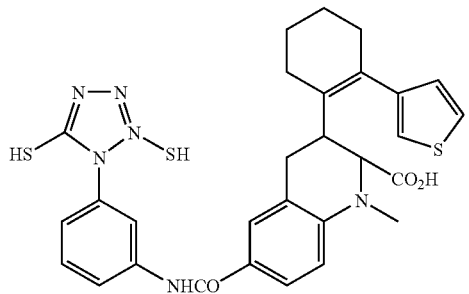
13
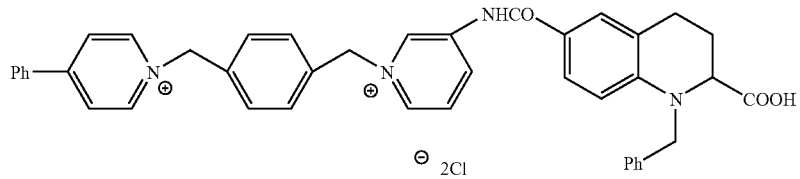
14
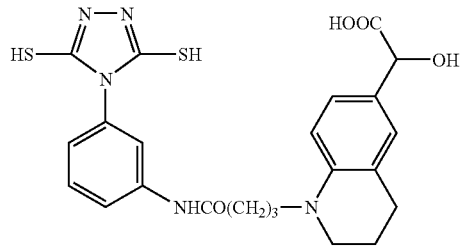
15
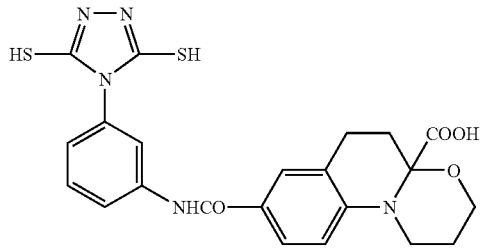
16
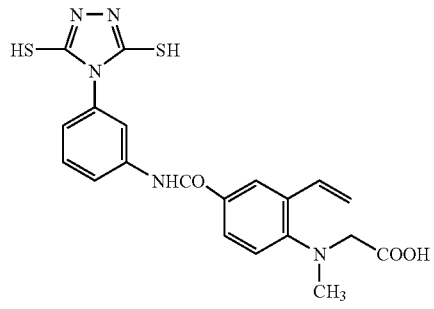
17
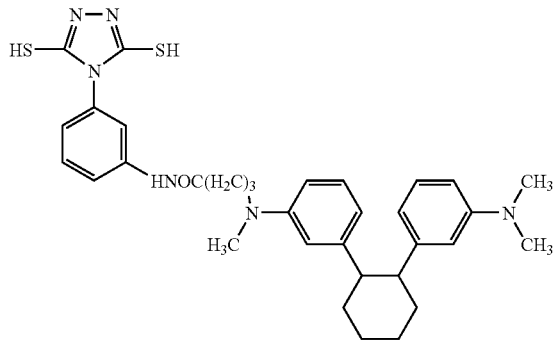
18

-continued
19
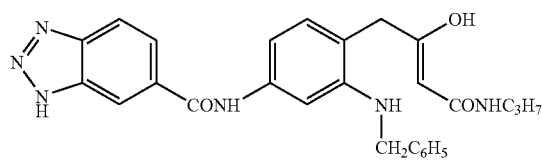
20
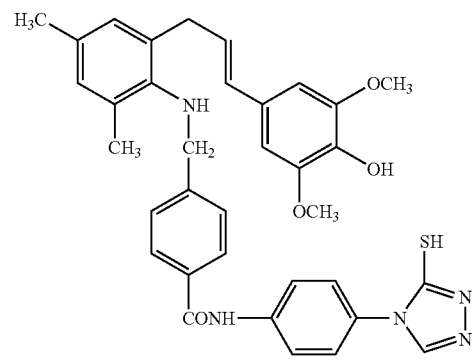
21
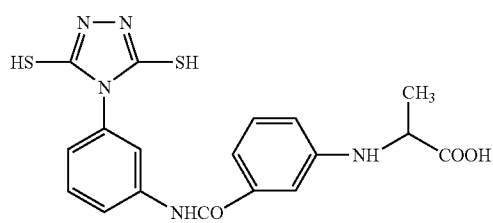
22
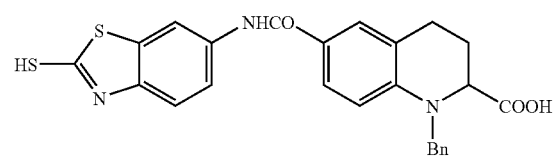
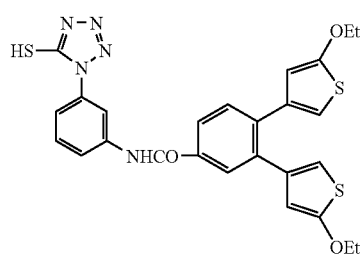
24
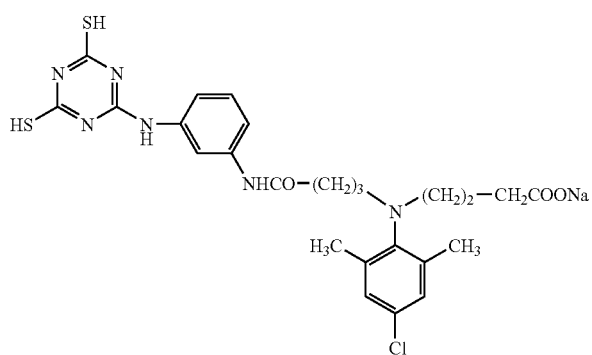
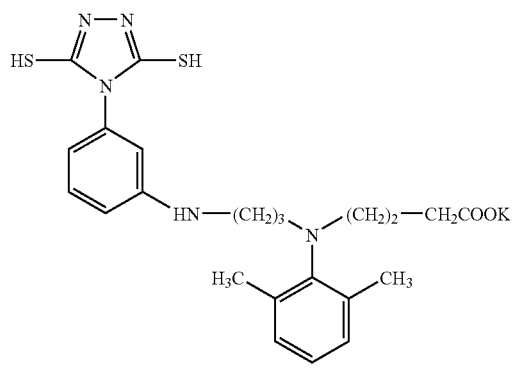
25
26
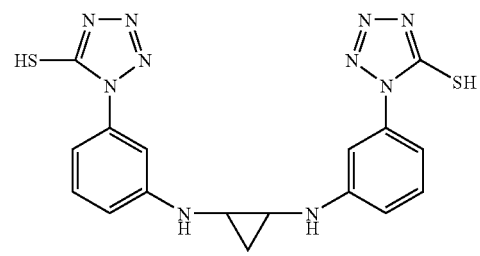

-continued
27
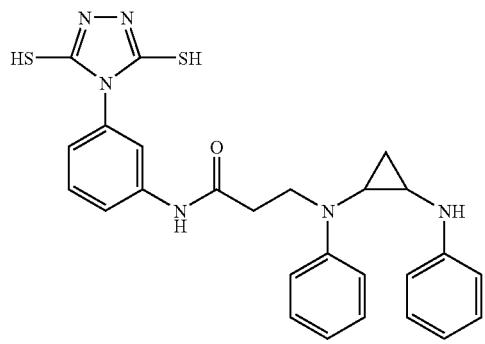
28
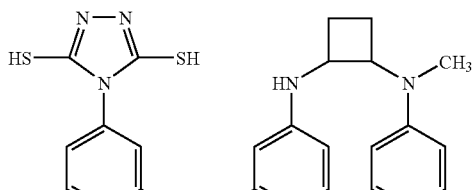
29
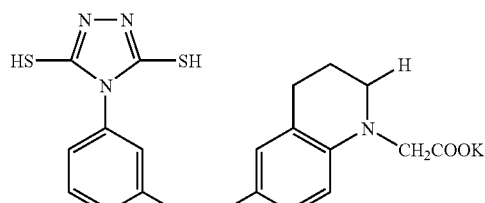
30
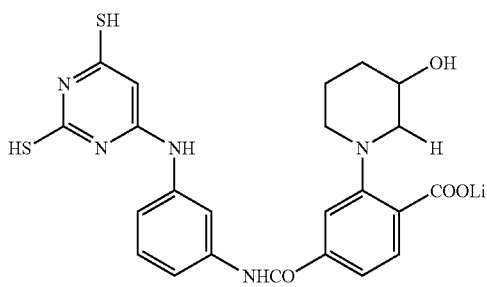
31
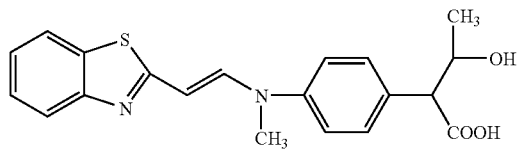
32
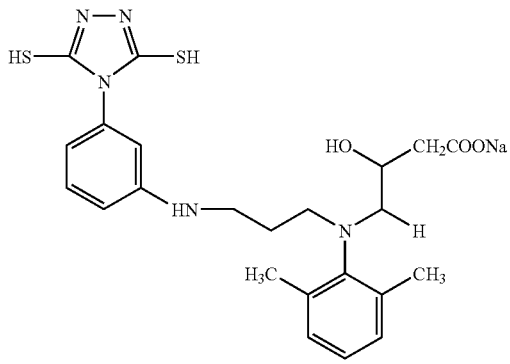
33
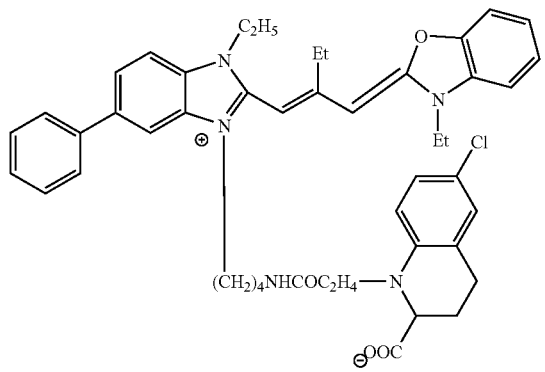
34
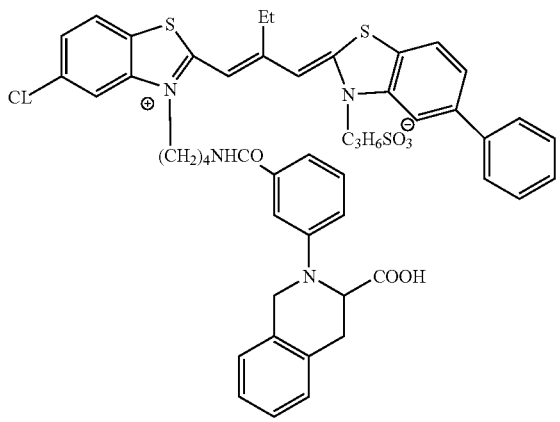
35
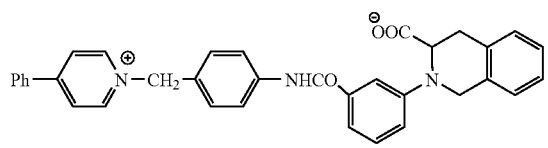
36
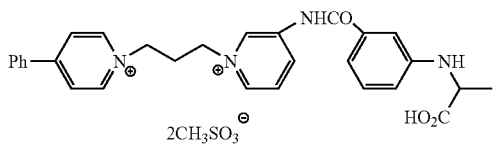

-continued
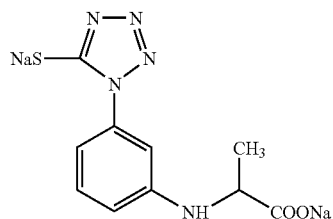
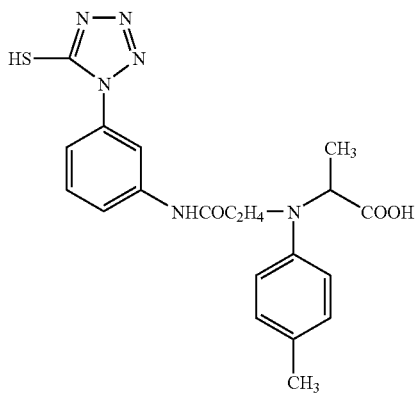
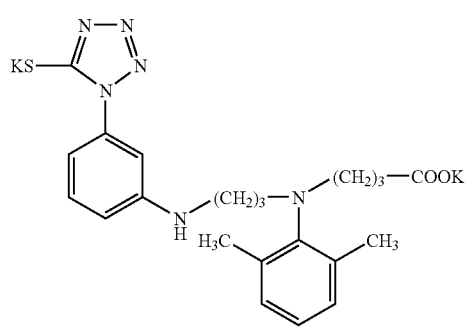
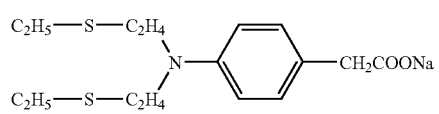
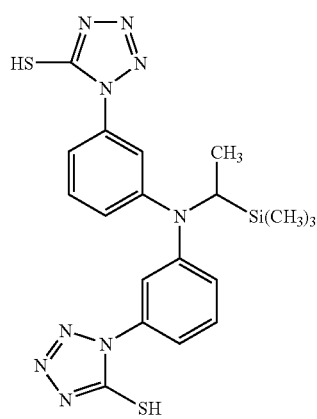
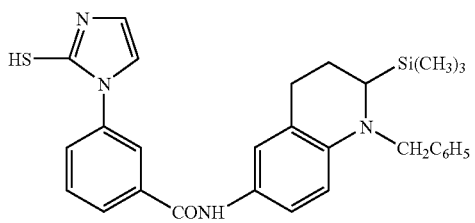
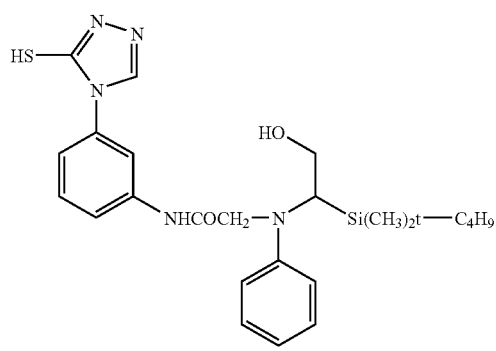
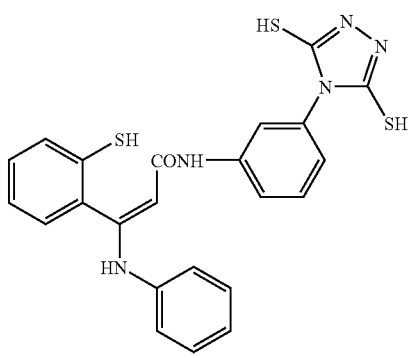

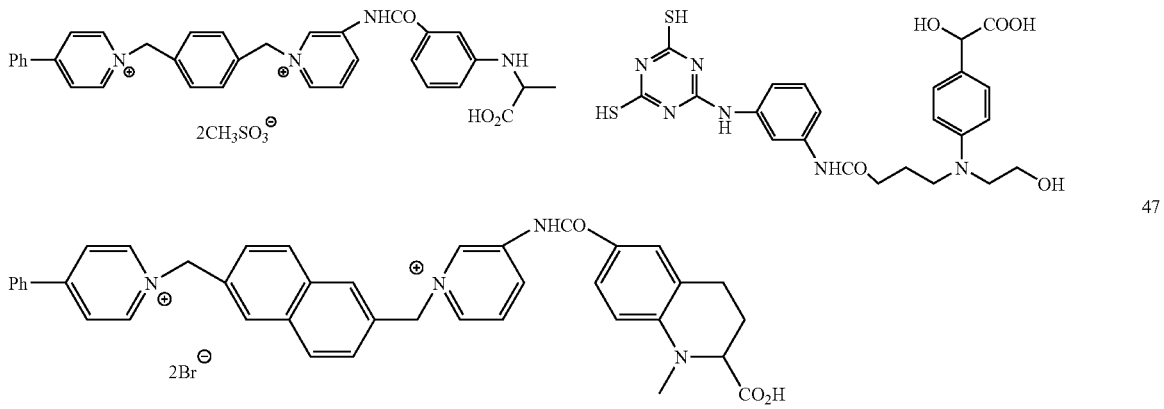

The compound of type 1 or type 2 in the invention may be used at any step during preparation of the emulsion or in the production steps for the photothermographic material. For example, the compound may be used upon formation of particles, during desalting step, during chemical sensitization and before coating. Further, the compound can be added divisionally for plural times during the steps and added, preferably, from the completion of formation of the particles before the desalting step, during chemical sensitization (just before starting to just after completion of chemical sensitization), and before coating and, more preferably, during the chemical sensitization and before coating.

The compounds of type 1 and type 2 in the invention are preferably added being dissolved in a water or a water soluble solvent such as methanol or ethanol or a mixed solvent of them. In a case of dissolving in water, a compound the solubility of which is improved by controlling the pH higher or lower may be added by dissolution while controlling the pH to a higher or lower level.

The compound of type 1 or type 2 in the invention is preferably used in an emulsion layer but it may be added to a protective layer or an intermediate layer as well as to the emulsion layer, and then diffused upon coating. The addition timing of the compound may be either before or after the applying of the sensitizing dye and is incorporated respectively in a silver halide emulsion layer, preferably, at a ratio of $1 \times 10^{-9}$ mol or more and $5 \times 10^{-2}$ mol or less and, more preferably, $1 \times 10^{-8}$ mol or more and to $2 \times 10^{-3}$ mol per one mol of the silver halide.

10) Adsorptive Redox Compound Having Adsorptive Group and Reducing Group

In the invention, an adsorptive redox compound having the adsorptive group to the silver halide and the reducing group in the molecule is preferably contained. The adsorptive redox compound is preferably a compound represented by the following formula (i).

A-(W)$_n$-B     Formula (I)

In formula (I), A represents a group that can be adsorbed to a silver halide (hereinafter referred as an adsorptive group), W represents a bivalent connection group, n represents 0 or 1 and B represents a reducing group.

The adsorptive group represented by A in formula (I) is a group directly adsorbing to the silver halide or a group promoting adsorption to the silver halide and it can include, specifically, a mercapto group (or a salt thereof), thion group (—C(=S)—), a heterocyclic group containing at least one atom selected from nitrogen atom, sulfur atom, selenium atom and tellurium atom, sulfide group, disulfide group, cationic group or ethynyl group.

The mercapto group (or a salt thereof) as the adsorptive group means the mercapto group (or a salt thereof) itself, as well as represents, more preferably, a heterocyclic group, aryl group or alkyl group substituted with at least one mercapto group (or the salt thereof). The heterocyclic group is at least a 5-membered to 7-membered single or condensed aromatic or non-aromatic heterocyclic group including, for example, imidazole ring group, thiazole ring group, oxazole ring group, benzimidazole ring group, benzothiazole ring group, benzoxazole ring group, triazole ring group, thiadiazole ring group, oxadiazole ring group, tetrazole ring group, purine ring group, pyridine ring group, quinoline ring group, isoquinoline ring group, pyrimidine ring group, and triazine ring group. Further, it may also be a heterocyclic group containing a quaternarized nitrogen atom, in which the substituting mercapto group may be dissociated to form a meso ion. When the mercapto group forms a salt, the counter ion can include, for example, a cation of an alkali metal, alkaline earth metal or heavy metal ($Li^+$, $Na^+$, $K^+$, $Mg^{2+}$, $Ag^+$, $Zn^{2+}$), ammonium ion, heterocyclic group containing quaternarized nitrogen atom, or phosphonium ion.

The mercapto group as the adsorptive group may also be tautomerically isomerized into a thion group.

The thione group as the adsorptive group can also include a linear or cyclic thioamide group, thioureido group, thiourethane group or dithiocarbamate ester group.

The heterocyclic group containing at least one atom selected from the nitrogen atom, sulfur atom, selenium atom and tellurium atom as the adsorptive group is a nitrogen-containing heterocyclic group having —NH— group capable of forming imino silver (>NAg) as a partial structure of the heterocyclic ring, or a heterocyclic group having an —S— group, —Se— group, —Te— group or =N— group capable of coordination bond to a silver ion by way of coordination bonding as a partial structure of the heterocyclic ring. Examples of the former can include, for example, benzotriazole group, triazole group, indazole group, pyrazole group, tetrazole group, benzoimidazole group, imidazole group, and purine group, and examples of the latter can include, for example, thiophene group, thiazole group, oxazole group, benzothiophene group, benzothiazole group, benzoxazole group, thiadiazole group, oxadiazole group, triazine group, selenoazole group, benzoselenoazole group, tellurazole group, and benzotellurazole group.

The sulfide group or disulfide group as the adsorptive group can include all of the groups having the —S— or —S—S— partial structure.

The cationic group as the adsorptive group means a group containing a quaternarized nitrogen atom, specifically, a group containing a nitrogen-containing heterocyclic group containing an ammonio group or quaternarized nitrogen atom. The nitrogen-containing heterocyclic group containing the quaternarized nitrogen atom can include, for example, pyridinio group, quinolinio group, isoquinolinio group, and imidazolio group.

The ethynyl group as the adsorptive group means —C≡CH group in which the hydrogen atom may be substituted.

The adsorptive group may have an optional substituent.

Further, specific examples of the adsorptive group can include those described in the specification of JP-A No. 11-95355, in pages 4 to 7.

Preferred adsorptive group represented by A in formula (I) can include mercapto-substituted heterocyclic group (for example, 2-mercaptothiadiazole group, 2-mercapto-5-aminothiadiazole group, 3-mercapto-1,2,4-triazole group, 5-mercaptotetrazole group, 2-mercapto-1,3,4-oxadiazole group, 2-mercaptobenzimidazole group, 1,5-dimethyl-1,2,4-triazolium-3-thiorate group, 2,4-dimercapto pyrimidine group, 2,4-dimercapto triazine group, 3,5-dimercapto-1,2,4-triazole group, and 2,5-dimercapto-1,3-thiazole), or a nitrogen-containing heterocyclic group having —NH— group capable of forming imino silver (>NAg) as a partial structure of the heterocyclic ring (for example, benzotriazole group, benzimidazole group, and indazole group). More preferred adsorptive groups are 2-mercaptobenzimidazole group and 3,5-dimercapto-1,2,4-triazole group.

In formula (I), W represents a bivalent connection group. Any connection group may be used so long as it does not give undesired effects on photographic properties. For example, bivalent connection groups constituted with carbon atom, hydrogen atom, oxygen atom, nitrogen atom or sulfur atom can be utilized. They can include, specifically, alkylene group of 1 to 20 carbon atoms (for example, methylene group, ethylene group, trimethylene group, tetramethylene group, and hexamethylene group), alkenylene group of 2 to 20 carbon atoms, alkinylene group of 2 to 20 carbon atoms, arylene group of 6 to 20 carbon atoms (for example, phenylene group and naphthylene group), —CO—, —SO$_2$—, —O—, and —NR$_1$— and combination of such connection groups, in which R$_1$ represents a hydrogen atom, alkyl group, heterocyclic group, or aryl group.

The connection group represented by W may further have other optional substituent.

In formula (I), the reducing group represented by B represents a group capable of reducing silver ion and can include, for example, residues derived by removing one hydrogen atom, from formyl group, amino group, triple bond group such as an acetylene group or propargyl group, mercapto group, hydroxylamines, hydroxamic acids, hydroxy ureas, hydroxy urethanes, hydroxy semicarbazides, reductones (including reductone derivatives), anilines, phenols (including chroman-6-ols, 2,3-dihydrobenzofuran-5-ols, aminophenols, sulfoneamide phenols, and polyphenols such as hydroquinones, catechols, resorcinols, benzene triols and bisphenols), acyl hydrazines, carbamoyl hydrazides, and 3-pyrazolidone. They may have an optional substituent.

In formula (I), the oxidation potential for the reducing agent represented by B can be measured by a measuring method described in "Electrochemical Measuring Method" written by Akira Fujishima (published from Gihodo, pp 150–208) or "Experimental Chemical Course" edited by Chemical Society of Japan, 4th edition (vol. 9, pp 282–344, published from Maruzen). For example, it can be measured by a method of rotational disk voltammetry, specifically, by dissolving a specimen into a solution of methanol: pH 6.5, Britton-Robinson buffer=10%: 90% (vol %), passing a nitrogen gas for 10 min, and then measuring at 25° C. under 1000 rpm, at a sweeping velocity of 20 mV/sec while using a rotational disk electrode (RDE) made of glassy carbon as an operational electrode, using a platinum wire as a counter electrode and using a saturation calomel electrode as a reference electrode. A half-wave potential (E½) can be determined based on the obtained voltamogram.

The oxidation potential for the reducing group represented by B in the invention, when measured by the measuring method described above, is preferably within a range from about −0.3 V to about 1.0 V. More preferably, it is within a range from about −0.1 V to about 0.8 V and, particularly preferably, is within a range from about 0 to about 0.7 V.

The reducing agent represented by B in formula (1) is preferably a residue, derived by removing one hydrogen atom from hydroxylamines, hydroxamic acids, hydroxy ureas, hydroxy semi-carbazid, reductone, phenols, acyl hydrazines, carbamoyl hydrazines and 3-pyrazolidones.

The compound of formula (I) of the invention may also be incorporated with a ballast group or a polymer chain used customarily as additives for static photography such as couplers. Further, the polymer can include those described, for example, in JP-A No. 1-100530.

The compound of formula (I) in the invention may be a bis-form or tris-form. The molecular weight of the compound of formula (I) according to the invention is, preferably, between 100 to 10,000, more preferably, between 120 to 1,000 and, particularly preferably, between 150 to 500.

Compounds of formula (I) according to the invention are exemplified below but the invention is not restricted to them.

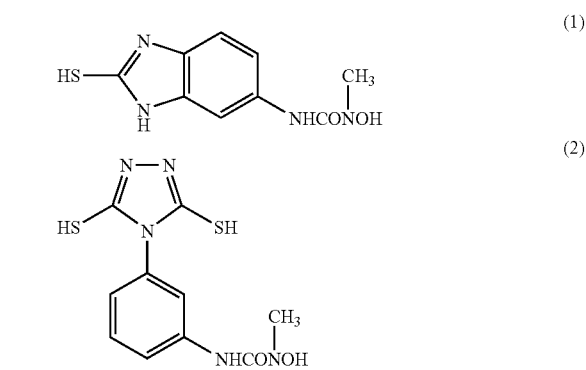

-continued
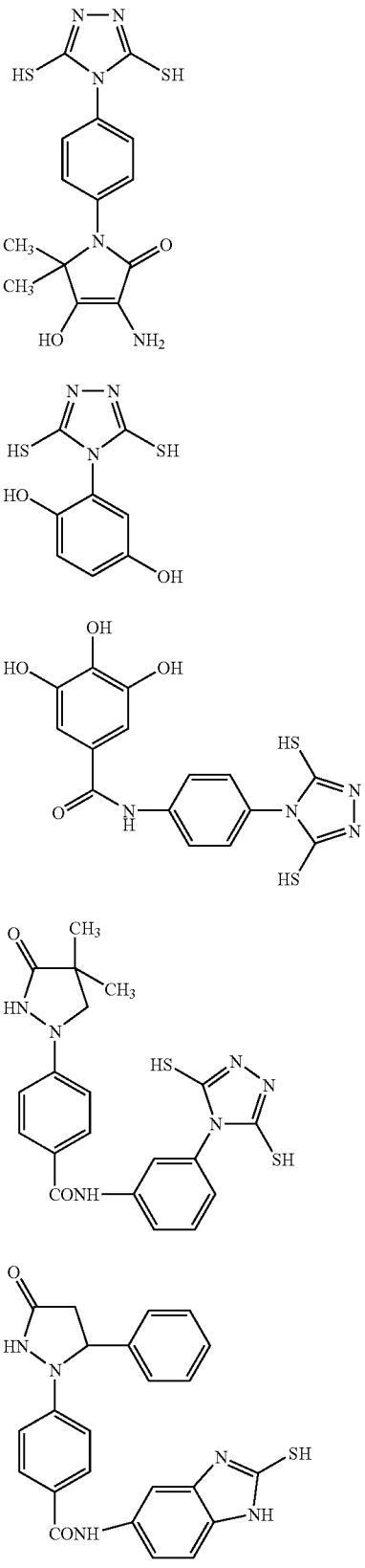
-continued
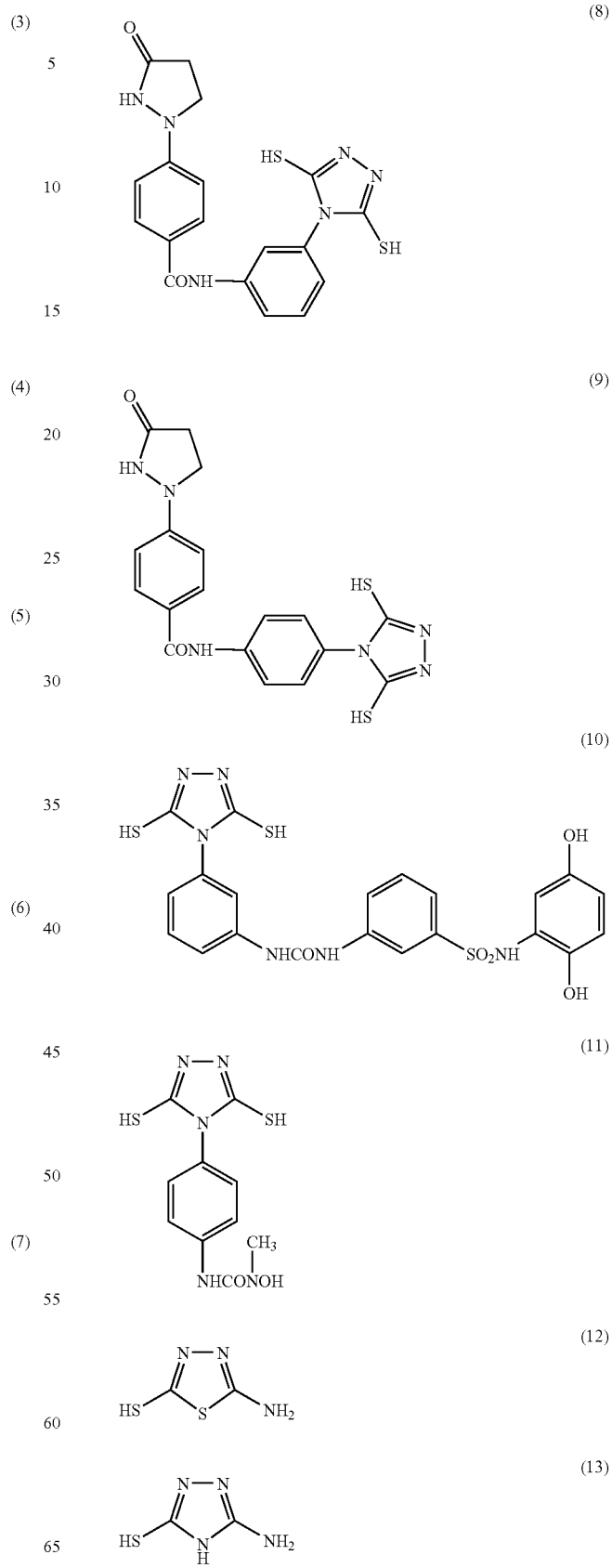

Further, also the specific compounds 1 to 30, 1"-1 to 1"-77 described in the specification of EP No. 1308776A2, pages 73 to 87 can also been mentioned as preferred examples of the compound having the adsorptive group and the reducing group in the invention.

The compound of the invention can be synthesized easily according to the known method. The compound of formula (I) in the invention may be used alone as a single kind of compound and it is also preferred to use two or more kinds of compounds together. In a case of using two or more kinds of compounds, they may be added to an identical layer or two separate layers, and the addition methods may be different, respectively.

The compound of formula (I) according to the invention is preferably added to a silver halide emulsion layer and it is preferably added upon preparation of the emulsion. In a case of adding upon preparation of the emulsion, it may be added at any step thereof. Examples of addition can include, for example, during the particle forming step of silver halide, before the starting the desalting step, during desalting step, before starting chemical aging, during the chemical aging step and step before preparation of complete emulsion. Further, the compound may be added divisionally for several times during the steps. Further, while it is preferably used for the image-forming layer, it may be added also to the adjacent protective layer or the intermediate layer as well as the image-forming layer, and may be diffused during coating.

A preferred addition amount greatly depends on the addition method described above or species of the compounds to be added. It is generally $1\times10^{-6}$ mol or more and 1 mol or less, preferably, $1\times10^{-5}$ mol or more and $5\times10^{-1}$ mol or less and, more preferably, $1\times10^{-4}$ mol or more and $1\times10^{-1}$ mol or less per one mol of the photosensitive silver halide.

The compound of formula (I) in the invention may be added by being dissolved in water, a water soluble solvent such as methanol or ethanol or a mixed solvent thereof. In this case, pH may be controlled adequately with an acid or base, or a surfactant may be present together. Further, it may be added as an emulsified dispersion being dissolved in a high boiling organic solvent. Further, it may be added also as a solid dispersion.

11) Sensitizing Dye

As the sensitizing dye applicable to the invention, sensitizing dyes capable of spectrally sensitizing silver halide particles at a desired wavelength region upon adsorption to silver halide particles and having spectral sensitivity suitable to spectral characteristics of an exposure light source can be selected advantageously. The photothermographic material according to the invention is preferably sensitized spectrally so as to have a spectral sensitivity peak, particularly, in a region of 600 nm or more and 900 nm or less, or 300 nm or more and 500 nm or less. The sensitizing dyes and addition methods are described, for example, as compounds in JP-A No. 11-65021, column Nos. 0103 to 0109, compounds represented by formula (II) in JP-A No. 10-186572, dye represented by formula (I) and in column No. 0106 in JP-A No. 11-119374, dyes described in U.S. Pat. Nos. 5,510,236, and 3,871,887 in Example 5, dyes disclosed in JP-A Nos. 2-96131 and 59-48753, and in EP-A No. 0803764A1, page 19, line 38 to page 20, line 35, JP-A Nos. 2001-272747, 2001-290238 and 2002-023306. The sensitizing dyes may be used alone or two or more of them may be used in combination.

The addition amount of the sensitizing dye in the invention can be a desired amount corresponding to the performance of the sensitivity and fogging and it is, preferably, from $10^{-6}$ to 1 mol, further preferably, from $10^{-4}$ to $10^{-1}$ mol per 1 mol of the silver halide in the photosensitive layer.

For improving the spectral sensitizing efficiency in the invention, a super sensitizer may be used. The super sensitizer used in the invention can include those compounds as described in EP-A No. 587338, U.S. Pat. Nos. 3,877,943 and 4,873,184, JP-A Nos. 5-341432, 11-109547, and 10-111543.

12) Combined Use of Silver Halides

The photosensitive silver halide emulsion in the photothermographic material used in the invention may be used each alone or in combination of two or more of them (for example, those of different average grain sizes, different halogen compositions, different crystal habits or different conditions for the chemical sensitization). Gradation can be controlled by using plural kinds of photosensitive silver halides of different sensitivities. The techniques concerned can include those described in JP-A Nos. 57-119341, 53-106125, 47-3929, 48-55730, 46-5187, 50-73627, and 57-150841. For the difference of the sensitivity, it is preferred to provide a difference of 0.2 log E or more between each of the emulsions.

13) Mixing of Photosensitive Silver Halide and Organic Silver Salt

Particles of the photosensitive silver halide of the invention are formed particularly preferably in the absence of the non-photosensitive organic silver salt and sensitized chemically. This is because a sufficient sensitivity can not be attained sometimes by a method of forming a silver halide by adding a halogenating agent to the organic silver salt.

The method of mixing the silver halide and the organic silver salt can include a method of mixing the photosensitive silver halide and the organic silver salt prepared separately by a high speed stirrer, ball mill, sand mill, colloid mill, vibration mill or homogenizer, or a method of mixing the photosensitive silver halide completed for preparation at a certain timing during preparation of the organic silver salt thereby preparing the organic silver salt. The effect of the invention can be obtained preferably by any of the methods.

14) Mixing of Silver Halide to Coating Solution

A preferred timing for adding the silver halide to an image-forming layer coating solution in the invention is from 180 min to immediately before the coating, preferably, from 60 min to 10 sec before the coating, and there are no particular restrictions for the mixing method and the mixing condition so long as the sufficient effect of the invention is obtained. Concrete mixing method includes a method of mixing in a tank adapted such that an average staying time calculated based on the addition flow rate and the liquid feed amount to a coater give a desired time, or a method of using a static mixer as described, for example, in "Liquid Mixing Technique" written by N. Harnby, M. F. Edwards, and A. W. Nienow, translated by Koji Takahashi (published from Nikkan Kogyo Shinbun Co., 1989), Chapter 8.

Compound Substantially Decreasing the Visible Light Absorption Derived from Photosensitive Silver Halide after Heat Development The photothermographic material in the invention preferably contains a compound for substantially decreasing the visible light absorption derived from the photosensitive silver halide after heat development as described below.

In the invention, it is particularly preferred to use a silver iodide complex forming agent as a compound of substantially decreasing the visible light absorption derived from the photosensitive silver halide after heat development.

Silver Iodide Complex Forming Agent

At least one of the nitrogen atom or sulfur atom in the compound of the silver iodide complex forming agent can contribute to the Luis acid base reaction of donating electrons to silver ions as a coordination atom (electron doner: Luis base). The stability of the complex is defined by the sequential stability constant or total stability constant and it depends on the combination of three components, that is, silver ion, iodide ion and silver complex forming agent. As a general guide, a large stability constant can be obtained by the means such as the chelating effect by the formation of the intra-molecular chelate ring or increase in the acid base dissociation constant of the ligand.

The UV-visible absorption spectrum of the photosensitive silver halide can be measured by a transmission method or a reflection method. In a case where the absorption derived from other compound added to the photothermographic material overlaps with the absorption of photosensitive silver halide, the UV-visible absorption spectrum for the photosensitive silver halide can be observed by the difference spectrum or removal of other compound by solvent alone or in combination.

For the silver iodide complex forming agent in the invention, 5 to 7-membered heterocyclic compounds containing at least one nitrogen atom are preferred. In a case of a compound not having a mercapto group, sulfide group or thion group as the substituent, the nitrogen-containing 5 to 7-membered heterocyclic rings may be saturated or unsaturated and may be substituted with other substituent. Further, substituents on the heterocyclic ring may join to each other to form a ring.

Examples of preferred 5 to 7-membered heterocyclic ring compounds can include, for example, pyrrol, pyridine, oxazole, isooxazole, thiazole, isothiazole, imidazole, pyrazole, pyradine, pyrimidine, pyridazine, indole, isoindole, indolizine, quinoline, isoquinoline, benzoimidazole, 1H-imidazole, quinoxaline, quinazoline, cinnoline, phthalazine, naphthylidine, purine, pteridine, carbazole, acridine, phenanthridine, phenanthroline, phenazine, phenoxazine, phenothiazine, benzothiazole, benzoxazole, benzoimidazole, 1,2,4-triazine, 1,3,5-triazine, pyrrolidine, imidazolidine, pyrazolidine, piperidine, piperazine, morpholine, indoline, and isoindoline. Further preferably, it can include, for example, pyridine, imidazole, pyrazole, pyradine, pyrimidine, pyridazine, indole, isoindole, indolizine, quinoline, isoquinoline, benzoimidazole, 1H-imidazole, quinoxaline, quinazoline, cinnoline, phthalazine, 1,8-naphthyridine, 1,10-phenanthroline, benzoimidazole, benzotriazole, 1,2,4-triazine and 1,3,5-triazine. It can include, particularly preferably, for example pyridine, imidazole, pyrazine, pyrimidine, pyridazine, phthalazine, triazine, 1,8-naphthyridine, or 1,10-phenanthroline.

The rings may have substituent and any substituent may be used so long as the substituent gives no undesired effect on the photographic property. Preferred examples can include, for example, halogen atoms (fluorine atom, chlorine atom, bromine atom or iodine atom), alkyl group (linear, branched or cyclic alkyl groups including bicycloalkyl group, and active methine group), alkenyl group, alkinyl group, aryl group, heterocyclic group (irrespective of the position for the substitution), acyl group, alkoxy carbonyl group, aryloxy carbonyl group, heterocyclicoxy carbonyl group, carbamoyl group, N-acyl carbamoyl group, N-sulfonyl carbamoyl group, N-carbamoyl carbamoyl group, N-sulfamoyl carbamoyl group, carbazoyl group, carboxy group or salt thereof, oxalyl group, oxamoyl group, cyano group, carbon imidoyl group, formyl group, hydroxy group, alkoxy group (also including those groups containing ethylene oxy group or propylene oxy group units repetitively), aryloxy group, heterocyclic oxy group, acyl oxy group, (alkoxy or aryloxy)carbonyl oxy group, carbamoyl oxy group, sulfonyl oxy group, amino group, (alkyl or aryl or heterocyclic) amino group, acylamino group, sulfone amide group, ureido group, thio ureido group, imido group, (alkoxy or aryloxy) carbonyl amino group, sulfamoyl amino group, semicarbazide group, ammonio group, oxamoyl amino group, N-(alkyl or aryl)sulfonyl ureido group, N-acyl ureido group, N-acyl sulfamoyl amino group, nitro group, heterocyclic group containing quaternarized nitrogen atom (for example, pyridinio group, imidazolio group, quinolinio group and isoquinolinio group), isocyano group, imino group, (alkyl or aryl)sulfonyl group, (alkyl or aryl)sulfinyl group, sulfo group or salt thereof, sulfamoyl group, N-acyl sulfamoyl group, N-sulfonyl sulfamoyl group or salt thereof, phosphino group, phosphinyl group, phosphinyloxy group, phosphinylamino group, or silyl group. The active methine group means herein a methine group substituted with two electron attracting groups, and the electron attracting group means herein an acyl group, alkoxy carbonyl group, aryloxy carbonyl group, carbamoyl group, alkyl sulfonyl group, aryl sulfonyl group, sulfamoyl group, trifluoromethyl group, cyano group, nitro group, or carbon imidoyl group. In this case, the two electron attracting groups may join with each other to form a cyclic structure. The salt means a cation of alkali metal, alkaline earth metal and heavy metal or organic cation such as ammonium ion or phosphonium ion. The substituent may further be substituted with the substituent described above.

The heterocyclic ring may further be condensed with other ring. Further, in a case where the substituent is an anionic group (for example —$CO_2^-$, —$SO_3^-$, —$S^-$), the nitrogen containing heterocyclic ring in the invention may form, as a cation (for example, pyridinium or 1,2,4-triazolium), an intra-molecular salt.

In a case where the heterocyclic compound is pyridine, pyradine, pyrimidine, pyridazine, phthalazine, triazine, naphthylidine or phenanthroline derivative, the acid dissociation constant (pKa) of the conjugated acid for the nitrogen containing heterocyclic portion at the acid dissociation equilibrium of the compound in a mixed solution of tetrahydrofuran/water (3/2) at 25° C. is, preferably, 3 to 8 and, more preferably, pKa is 4 to 7.

As such a heterocyclic compound, pyridine, pyridazine or phthaladine derivative is preferred and pyridine or phthaladine derivative is particularly preferred.

In a case where the heterocyclic compound has a mercapto group, sulfide group or thion group as the substituent, it is preferably a pyridine, thiazole, isothiazone, oxazole, isooxazole, imidazole, pyrazole, pyradine, pyrimidine, pyridazine, triazine, triazole, thiazole, or oxadiazole derivative and, particularly preferably, thiazole, imidazole, pyrazole, pyradine, pyrimidine, pyridazine, triazine or triazole derivative.

For example, the compound represented by the following formula (21) or formula (22) can be utilized for the silver iodide complex forming agent.

Formula (21)

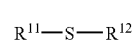

-continued

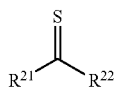

Formula (22)

In formula (21), $R^{11}$ and $R^{12}$ each independently represent a hydrogen atom or a substituent. In formula (22), $R^{21}$ and $R^{22}$ each independently represent a hydrogen atom or a substituent, providing that both $R^{11}$ and $R^{12}$ are not hydrogen atom and both $R^{21}$ and $R^{22}$ are not hydrogen atom. The substituent referred to herein can include those described as the substituent for the nitrogen containing 5 to 7-membered heterocyclic silver iodide complex forming agents described above.

Further, the compound represented by the following formula (23) can also be used preferably.

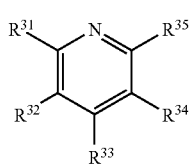

Formula (23)

In formula (23), $R^{31}$-$R^{35}$ each independently represent a hydrogen atom or a substituent. The substituent represented by the $R^{31}$ to $R^{35}$ can include those described as the substituent for the nitrogen-containing 5 to 7-membered heterocyclic ring silver iodide complex forming agents described above. In a case where the compound represented by formula (23) has a substituent, a preferred substitution positions are at $R^{32}$ to $R^{34}$. $R^{31}$ to $R^{35}$ may join with each other to form a saturated or unsaturated ring. It is preferably, halogen atom, alkyl group, aryl group, carbamoyl group, hydroxy group, alkoxy group, aryloxy group, carbamoyloxy group, amino group, acylamino group, ureido group, (alkoxy or aryloxy) carbonylamino group.

For the compound represented by formula (23), the acid dissociation constant (pKa) of the conjugated acid for the pyridine ring portion in a mixed solution of tetrahydrofuran/water (3/2) at 25° C. is, preferably, 3 to 8 and particularly preferably, 4 to 7.

Further, the compound represented by formula (24) is also preferred.

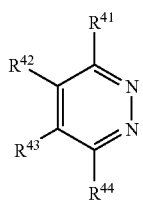

Formula (24)

In formula (24), $R^{41}$ to $R^{44}$ each independently represent a hydrogen atom or a substituent. $R^{41}$ to $R^{44}$ may join with each other to form a saturated or unsaturated ring. The substituent represented by $R^{41}$ to $R^{44}$ can include those described as the substituent for the nitrogen-containing 5 to 7-membered heterocyclic silver iodide complex forming agents described above. Preferred group can include an alkyl group, alkenyl group, alkinyl group, aryl group, hydroxy group, alkoxy group, aryloxy group, heterocyclicoxy group, and phthalazine ring formed by benzo ring condensation. In a case where a hydroxyl group is substituted on the carbon atom adjacent with the nitrogen atom of the compound represented by formula (24), equilibrium exists relative to pyridazinone.

The compound represented by formula (24) further preferably forms the phthalazine ring represented by the following formula (25) and, particularly preferably, the phthalazine ring may further have at least one substituent. Examples for the $R^{51}$ to $R^{56}$ in formula (25) can include those described as the substituent for the nitrogen containing 5 to 7-membered heterocyclic silver iodide complex forming agents. A further preferred substituent can include an alkyl group, alkenyl group, alkinyl group, aryl group, hydroxy group, alkoxy group, and aryloxy group. Preferred are alkyl group, alkenyl group, aryl group, alkoxy group, or aryloxy group. More preferred are alkyl group, alkoxy group, and aryloxy group.

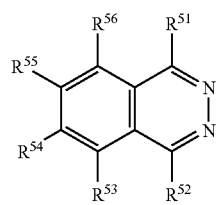

Formula (25)

A compound represented by the following formula (26) is also a preferred form.

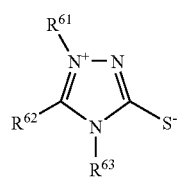

Formula (26)

In formula (26), $R^{61}$ to $R^{63}$ each independently represent a hydrogen atom or a substituent. Examples for the substituent represented by $R^{62}$ can include those described as the substituent for the nitrogen containing 5 to 7-membered heterocyclic silver iodide complex forming agent described above.

The compound used preferably can include the compound represented by the following formula (27).

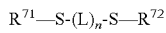

$R^{71}$—S-(L)$_n$-S—$R^{72}$

Formula (27)

In formula (27), $R^{71}$ to $R^{72}$ each independently represent a hydrogen atom or a substituent, L represents a bivalent connection group, n represents 0 or 1. The substituent represented by $R^{71}$ to $R^{72}$ can include, for example, an alkyl group (including cycloalkyl group), alkenyl group (including cycloalkenyl group), alkinyl group, aryl group, heterocyclic group, acyl group, aryloxycarbonyl group, alkoxycarbonyl group, carbamoyl group, or imide group, and composite substituent containing them. The bivalent connection group represented by L is a connection group having a length, preferably, for 1 to 6 atoms and, more preferably, 1 to 3 atoms, and it may have a further substituent.

A further example of the compound used preferably is the compound represented by formula (28).

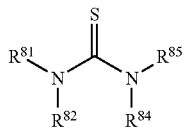

Formula (28)

In formula (28), $R^{81}$ to $R^{84}$ each independently represent a hydrogen atom or a substituent. The substituent represented by $R^{81}$ to $R^{84}$ can include, for example, alkyl group (including cycloalkyl group), alkenyl group (including cycloalkenyl group), alkinyl group, aryl group, heterocyclic group, acyl group, aryloxycarbonyl group, alkoxycarbonyl group, carbamoyl group, or imide group.

Among the silver iodide complex forming agents described above, more preferred are those compounds represented by formulae (23), (24), (25), (26), and (27), and the compounds represented by formulae (23) and (25) are particularly preferred.

Preferred examples for the silver iodide complex forming agent in the invention are to be described below but the invention is not restricted to them.

(1)

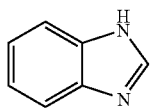

(2)

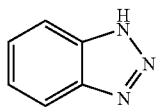

(3)

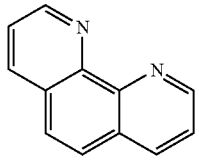

(4)

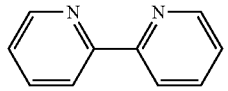

(5)

C$_5$H$_{11}$SC$_5$H$_{11}$ (6)

C$_4$H$_9$SCH$_2$CH$_2$SC$_4$H$_9$ (7)

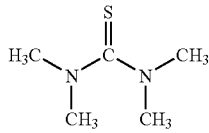

(8)

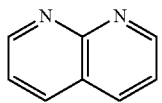

-continued (9)

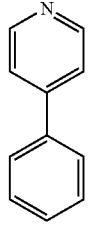

(10)

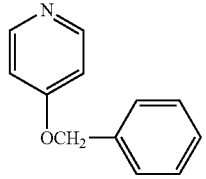

(11)

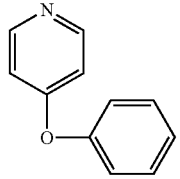

(12)

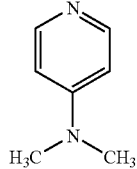

(13)

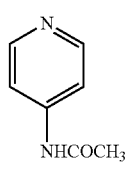

(14)

(15)

(16)

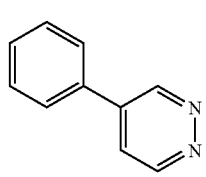

-continued
(17) 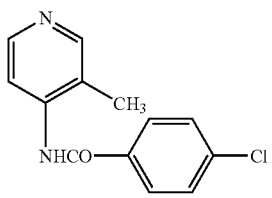
(18) 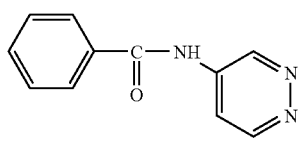
(19) 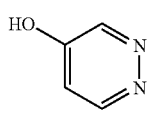
(20) 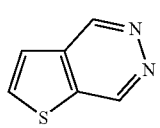
(21) 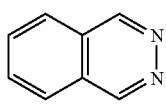
(22) 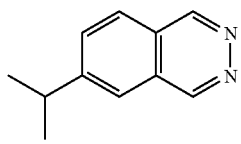
(23) 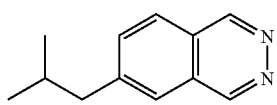
(24) 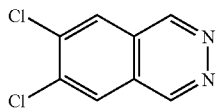
(25) 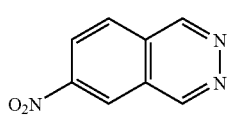
(26) 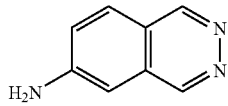
(27) 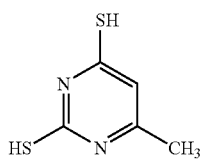
-continued
(28) 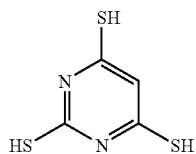
(29) 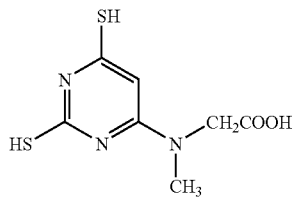
(30) 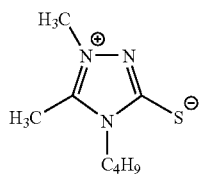
(31) 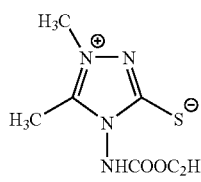
(32) 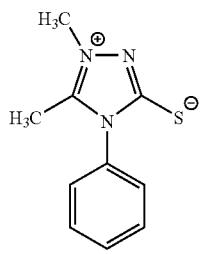
(33) 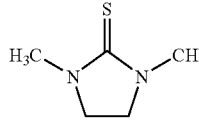
(34) 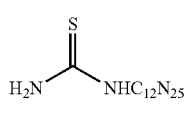
(35) 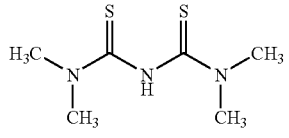
(36) HO(CH$_2$)$_3$S(CH$_2$)$_2$S(CH$_2$)$_3$OH
(37) 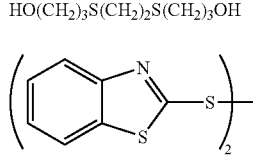

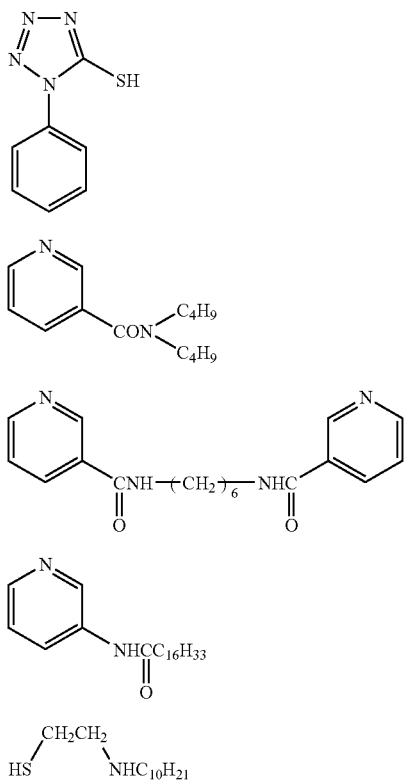

In a case where the silver iodide complex forming agent in the invention has a function of a color-tone-adjusting agent known so far, it can also be a compound in common with the color-tone-adjusting agent. The silver iodide complex forming agent in the invention can also be used being combined with the color-tone-adjusting agent. Further two or more kinds of silver iodide complex forming agents may be used in combination.

The silver iodide complex forming agent in the invention is preferably present in the film in a state being separated from the photosensitive silver halide such as being present as a solid state in the film. It is also preferred to add the agent to the adjacent layer. For the silver iodide complex forming agent in the invention, the melting point of the compound is preferably controlled within an appropriate range such that it is melted when heated to a heat development temperature.

In the invention, it is preferable that the absorption intensity of the UV visible absorption spectrum of the photosensitive silver halide after heat development is 80% or less when compared with that before the heat development. It is more preferably 40% or less and, particularly preferably, 10% or less.

The silver iodide complex forming agent in the invention may be incorporated into the coating solution by any method such as in the form of solution, in the form of emulsified dispersion or in the form of solid fine particle dispersion and incorporated in the photosensitive material.

The well-known emulsifying dispersion method can include a method of dissolving by using an oil such as dibutyl phthalate, tricresyl phosphate, glyceryl triacetate or and diethyl phthalate or an auxiliary solvent such as ethyl acetate and cyclohexanone, and preparing the emulsified dispersion mechanically.

Further, the fine solid particle dispersion method can include a method of dispersing a powder of the silver iodide complex forming agent in the invention in an appropriate solvent such as water by a ball mill, colloid mill, vibration ball mill, sand mill, jet mill, roller mill or supersonic waves thereby preparing a solid dispersion. In this case, a protection colloid (for example, polyvinyl alcohol), a surfactant (for example, anionic surfactant such as sodium triisopropyl naphthalene sulfonate (mixture of those having different substitution positions for three isopropyl groups)) may be used. In the mills described above, beads of zirconia, etc. are generally used as the dispersion medium, and Zr or the like leaching from the beads may sometimes intrude into the dispersion. Depending on the dispersion condition, it is usually within a range of 1 ppm or more and 1000 ppm or less. When the content of Zr in the photosensitive material is 0.5 mg or less per 1 g of the silver, it causes no practical problem.

The liquid dispersion is preferably incorporated with a corrosion inhibitor (for example, sodium salt of benzoisothiazolinone).

The silver iodide complex forming agent in the invention is preferably used as a solid dispersion.

The silver iodide complex forming agent in the invention is preferably used within a range of 1 mol % or more and 5,000 mol % or less, more preferably, within a range of 10 mol % or more and 1000 mol % or less and, further preferably, within a range of 50 mol % or more and 300 mol % or less, based on the photosensitive silver halide.

Description for Organic Silver Salt

The non-photosensitive organic silver salt usable in the invention is a silver salt which is relatively stable to light but forms silver images in a case when it is heated at 80° C. or higher in the presence of an exposed photosensitive silver halide and a reducing agent. The organic silver salt may be any organic substance including a source capable of reducing silver ions. The non-photosensitive organic silver salt is described, for example, in JP-A No. 10-62899, in column Nos. 0048 to 0049, EP-A No. 0803764 A1, from page 18, line 24 to page 19, line 37, EP-A No. 0962812 A1, and JP-A Nos. 11-349591, 2000-7683 and 2000-72711. Among them, silver salts of organic acids, particularly, silver salts of long chained aliphatic carboxylic acids (number of carbon atoms of 10 to 30, preferably, 15 to 28) are preferred. Preferred examples of the organic silver salts can include, for example, silver behenate, silver arachidate, silver stearate, silver oleate, silver laurate, silver caproate, silver myristate, silver palmitate, and mixtures thereof. In the invention, it is preferred to use, among the organic acid silver salts, an organic acid silver salt with the silver behenate content, preferably, of 50 mol % or more and 100 mol % or less. It is particularly preferable that the silver behenate content is 75 mol % or more and 98 mol % or less.

There is no particular restriction on the shape of the organic silver salt usable in the invention and it may be needle-like, bar-like, plate-like or flaky shape.

In the invention, a flaky organic silver salt is preferred. In the present specification, the flaky organic silver salt is defined as described below. An organic acid silver salt is observed under an electron microscope, to conduct calculation, while approximating the shape of an organic acid silver salt particle to that of a rectangular solid and assuming respective sides of the rectangular solid as a, b, c from the shortest side (c may be identical with b), and x is calculated based on numerical values a, b for the shorter sides as below.

$x = b/a$

When x is determined as described above for the particles by the number of about 200, those capable of satisfying the relation: x (average)≧1.5, x being an average value, are defined to have a flaky shape. The relation is preferably: 30≧x (average)≧1.5 and, more preferably, 15≧x (average) ≧1.5. By the way, needle-like shape is defined as 1≦x (average)<1.5.

In the flaky particle, a can be regarded as a thickness of a plate particle having a main plane with b and c being as the sides. a is, preferably, 0.01 μm or more and 0.3 μm or less and, more preferably, 0.1 μm or more and 0.23 μm or less in average. c/b is, preferably, 1 or more and 6 or less, more preferably, 1 or more and 4 or less and, further preferably, 1 or more and 3 or less and, most preferably, 1 or more and 2 or less in average.

The grain size distribution of the organic silver salt is preferably a mono-dispersion. In the mono-dispersion, the percentage value obtained by dividing the standard deviation for the respective length of the minor axis and the major axis with the minor axis and the major axis respectively is preferably 100% or less, more preferably, 80% or less and, further preferably, 50% or less. As the method of measuring the shape of the organic silver salt, it can be determined from transmission electron microscopic images for the dispersion of the organic silver salt. Another method of measuring the mono-dispersibility is a method of determining from the standard deviation for the volume addition average diameter of the organic silver salt, in which the percentage value obtained by dividing with the volume addition average diameter (fluctuation coefficient) is, preferably, 100% or less, more preferably, 80% or less and, further preferably, 50% or less. As the measuring method, this can be determined, for example, from a particle size (volume addition average diameter) obtained by irradiating a laser light to an organic silver salt dispersed in a liquid and determining the self-correlation function of the scattering light relative to the change with time of fluctuation.

For the production of the organic acid silver salts used in the invention and the dispersion method thereof, known methods can be applied. Reference can be made, for example, to JP-A No. 10-62899, EP-A Nos. 0803763 A1 and 0962812 A1, JP-A Nos. 11-349591, 2000-7683, 2000-72711, 2001-163827, 2001-163889 to 163890, 11-203413, 2001-188313, 2001-083652, 2002-006442, 2002-031870 (or U.S. Pat. No. 6,613,504, the disclosure of which is incorporated by reference herein), 2002-107868 and 2002-006442.

In the invention, the photosensitive material can be produced by mixing an aqueous dispersion of an organic silver salt and an aqueous dispersion of a photosensitive silver salt. Mixing of two or more kinds of the aqueous dispersions of organic silver salts and two or more kinds of aqueous dispersions of the photosensitive silver salts upon mixing is a method used preferably for controlling the photographic properties.

The organic silver salt in the invention can be used by a desired amount and it is, preferably, 0.1 g/m² or more and 5 g/m² or less, more preferably, 1 g/m² or more and 3 g/m² or less and, particularly preferably, 1.2 g/m² or more and 2.5 g/m² or less.

Description for Reducing Agent

The photothermographic material according to the invention contains a reducing agent for the organic silver salt. The reducing agent may be any substance (preferably, organic substance) capable of reducing silver ion into metallic silver. Examples of the reducing agent are described in JP-A No. 11-65021, in column Nos. 0043 to 0045, and EP No. 0803764, from page 7, line 34 to page 18, line 12.

Preferred reducing agent used in the invention is a so-called hindered phenolic reducing agent or a bisphenolic reducing agent having a substituent on the ortho-position to the phenolic hydroxyl group, and the compound represented by the following formula (R) is particularly preferred.

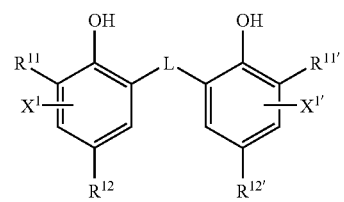

Formula (R)

In formula (R), $R^{11}$ and $R^{11'}$ each independently represent an alkyl group of 1 to 20 carbon atoms, $R^{12}$ and $R^{12'}$ each independently represent a hydrogen atom or a substituent capable of substitution on the benzene ring, L represents —S— group or —CHR$^{13}$— group, $R^{13}$ represents a hydrogen atom or an alkyl group of 1 to 20 carbon atoms, $X^1$ and $X^{1'}$ each independently represent a hydrogen atom or a group capable of substitution on the benzene ring.

Each of the substituents is to be described specifically.

1) $R^{11}$ and $R^{11'}$ $R^{11}$ and $R^{11'}$ each independently represent a substituted or not-substituted alkyl group of 1 to 20 carbon atoms. While there is no particular restriction on the substituent of the alkyl group, it can preferably include, for example, aryl group, hydroxyl group, alkoxy group, aryloxy group, alkylthio group, arylthio group, acylamino group, sulfonamide group, sulfonyl group, phosphoryl group, acyl group, carbamoyl group, ester group, and halogen atom.

2) $R^{12}$ and $R^{12'}$ and $X^1$ and $X^{1'}$ $R^{12}$ and $R^{12'}$ each independently represent a hydrogen atom or a substituent capable of substitution on the benzene ring, and $X^1$ and $X^{1'}$ each independently represent a hydrogen atom or a group capable of substitution on the benzene ring. The groups capable of substitution on the benzene ring, respectively, can include, preferably, an alkyl group, aryl group, halogen atom, alkoxy group or acylamino group.

3) L

L represents an —S— group or —CHR$^{13}$— group, $R^{13}$ represents a hydrogen atom or an alkyl group of 1 to 20 carbon atoms, and the alkyl group may have a substituent.

Specific examples of the not-substituted alkyl group of $R^{13}$ can include, for example, a methyl group, ethyl group, propyl group, butyl group, heptyl group, undecyl group, isopropyl group, 1-ethylpentyl group, or 2,4,4-trimethylpentyl group.

Examples of the substituent for the alkyl group can include substituents identical with those for $R^{11}$ and can include, for example, a halogen atom, alkoxy group, alkylthio group, aryloxy group, arylthio group, acylamino group, sulfonamide group, sulfonyl group, phosphoryl group, oxycarbonyl group, carbamoyl group, or sulfamoyl group.

4) Preferred Substituent $R^{11}$ and $R^{11'}$ can include each, preferably, a secondary or tertiary alkyl group of 3 to 15 carbon atoms and, specifically, isopropyl group, isobutyl group, t-butyl group, t-amyl group, t-octyl group, cyclohexyl group, cyclopentyl group, 1-methylcyclohexyl group, and 1-methylcyclopropyl group. $R^{11}$ and $R^{11'}$ each independently represent, more preferably, tertiary alkyl groups of 4 to 12 carbon atoms. Among them, t-butyl group, t-amyl group and 1-methylcyclohexyl group are further preferred, with the t-butyl group being most preferred.

$R^{12}$ and $R^{12'}$ each independently represent, preferably, an alkyl group of 1 to 20 carbon atoms and can include specifically a methyl group, ethyl group, propyl group, butyl group, isopropyl group, t-butyl group, t-amyl group, cyclohexyl group, 1-methylcyclohexyl group, benzyl group, methoxymethyl group, or methoxyethyl group. It is, more preferably, a methyl group, ethyl group, propyl group, isopropyl group, or t-butyl group.

$X^1$ and $X^{11'}$ each independently represent, preferably, a hydrogen atom, a halogen atom or an alkyl group and, more preferably, a hydrogen atom.

L is, preferably, a —$CHR^{13}$— group.

$R^{13}$, preferably, represents a hydrogen atom or an alkyl group of 1 to 15 carbon atoms, and the alkyl group represents, preferably, a methyl group, ethyl group, propyl group, isopropyl group, or 2,4,4-trimethylpentyl group. Particularly preferred $R^{13}$ is a hydrogen atom, methyl group, propyl group, or isopropyl group.

In a case where $R^{13}$ is a hydrogen atom, $R^{12}$ and $R^{12'}$ each independently represent, preferably, an alkyl group of 2 to 5 carbon atoms and ethyl group or propyl group is more preferred, with ethyl group being most preferred.

In a case where $R^{13}$ represents a primary or secondary alkyl group of 1 to 8 carbon atoms, $R^{12}$ and $R^{12'}$ each independently represent, preferably, a methyl group. As a primary or secondary alkyl group of 1 to 8 carbon atoms for $R^{13}$, a methyl group, ethyl group, propyl group or isopropyl group is more preferred and a methyl group, ethyl group, or propyl group is further preferred.

In a case where each of $R^{11}$, $R^{11'}$, $R^{12}$ and $R^{12'}$ represents methyl group, $R^{13}$ is preferably a secondary alkyl group. In this case, the secondary alkyl group for $R^{13}$ is, preferably, an isopropyl group, isobutyl group, or 1-ethylpentyl group, isopropyl group being more preferred.

The reducing agent described above has different heat developability depending on the combination of $R^{11}$, $R^{11'}$, $R^{12}$, $R^{12'}$ and $R^{13}$. Since the heat developability thereof can be controlled by the combination of two or more kinds of reducing agents in various mixing ratios, it is preferred to use them in combination of two or more of them depending on the purpose.

Specific examples of the compounds represented by formula (R) in the invention are to be shown below but the invention is not restricted to them.

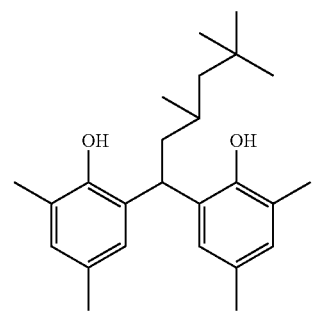
(R-1)

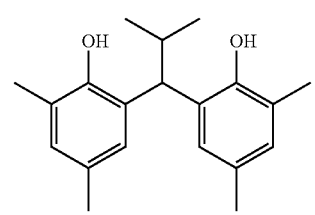
(R-2)

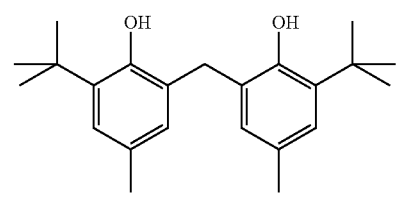
(R-3)

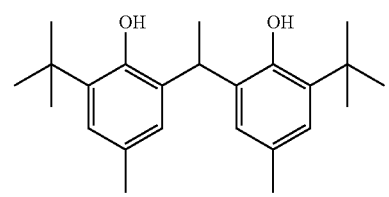
(R-4)

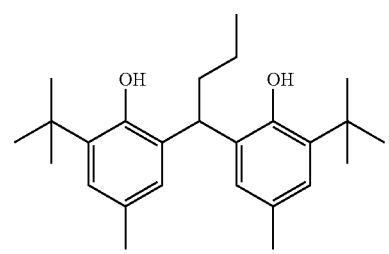
(R-5)

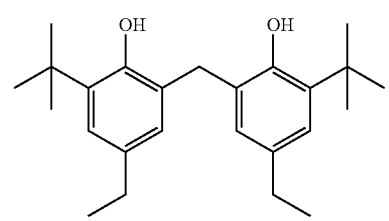
(R-6)

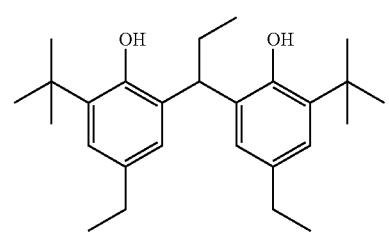
(R-7)

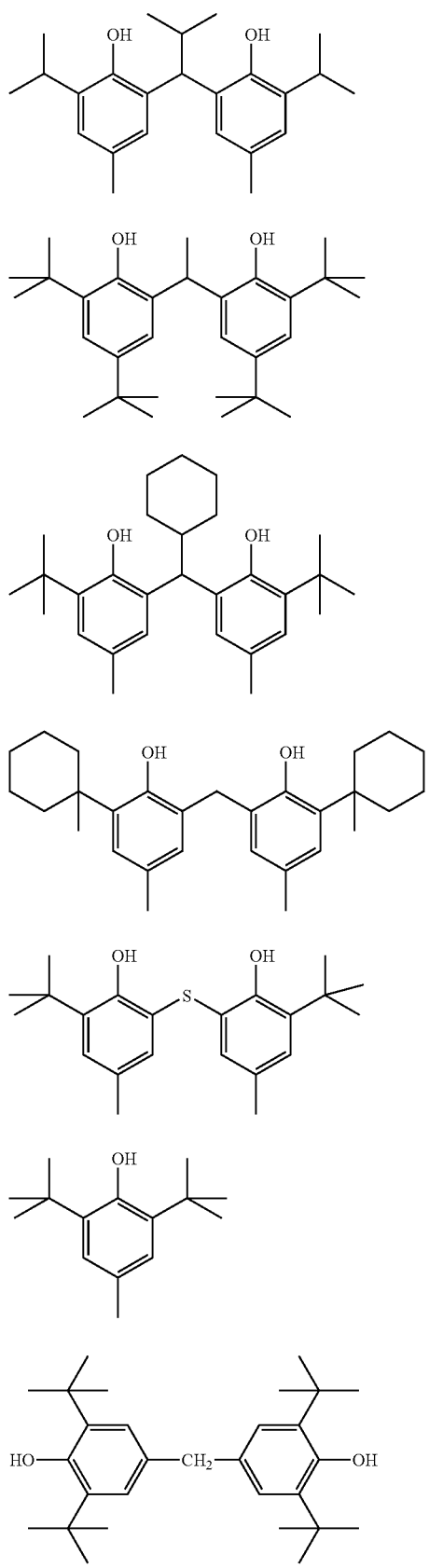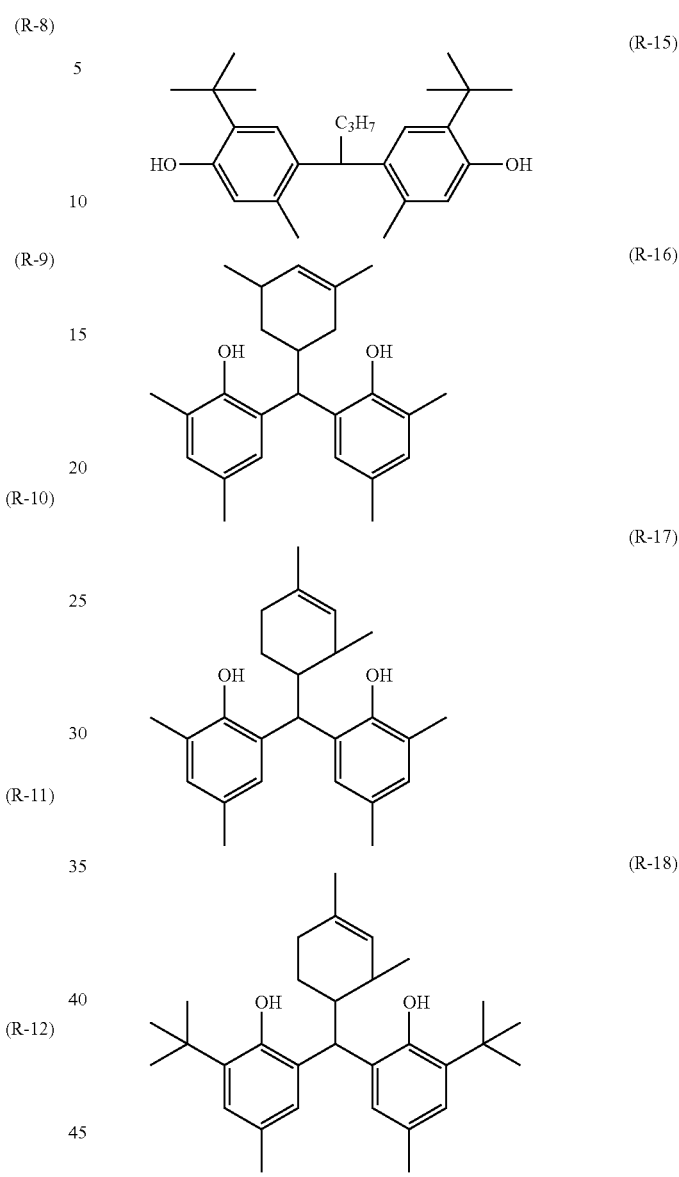

The addition amount of the reducing agent in the invention is, preferably, 0.01 g/m² or more and 5.0 g/m² or less, and, more preferably, 0.1 g/m² or more and 3.0 g/m² or less, and it is contained, preferably, by 5 mol % or more and 50 mol % or less and, more preferably, by 10 mol % or more and 40 mol % or less based on 1 mol of silver in the surface having the image-forming layer.

The reducing agent in the invention may be added to the image-forming layer containing the organic silver salt and the photosensitive silver halide, and the layer adjacent therewith but it is contained preferably in the image-forming layer.

The reducing agent may be contained in any method such as in the form of solution, emulsified dispersion and fine solid particle dispersion into a coating solution and contained in the photosensitive material.

Well-known emulsion dispersion method can include a method of dissolving by using an oil such as dibutyl phthalate, tricresyl phosphate, glyceryl triacetate or diethyl phthalate, or an auxiliary solvent such as ethyl acetate or cyclohexanone and mechanically preparing an emulsified dispersion.

Further, the fine solid particle dispersion method can include a method of dispersing the reducing agent in an appropriate solvent such as water by a ball mill, colloid mill, vibration ball mill, sand mill, jet mill, roller mill or supersonic waves thereby preparing a solid dispersion. A dispersion method using a sand mill is preferred. In this case, a protection colloid (for example, polyvinyl alcohol), surfactant (for example, anionic surfactant such as sodium triisopropyl naphthalene sulfonate (mixture of those having different substitution positions for three isopropyl groups)) may be used. A corrosion inhibitor (for example, sodium salt of benzoisothiazolinone) may be contained in the aqueous dispersion.

The solid particle dispersion method of the reducing agent is particularly preferred and it is preferably added as fine particles with an average grain size of 0.01 μm or more and 10 μm or less, preferably, 0.05 μm or more and 5 μm or less, more preferably, 0.1 μm or more and 1 μm or less. In the invention, other solid dispersion is preferably used also being dispersed to the grain size within the range described above.

Description for Development Accelerator

As the development accelerator in the photothermographic material of the invention, sulfonamide phenolic compounds represented by formula (A) described in the specification of JP-A No. 2000-267222 and the specification of JP-A No. 2000-330234, hindered phenolic compounds represented by formula (II) described in JP-A No. 2001-92075, hydrazinic compounds represented by formula (I) described in the specification of JP-A No. 10-62895 and the specification of JP-A No. 11-15116, by formula (D) described in JP-A No. 2002-156727 and by formula (I) described in the specification of JP-A No. 2002-278017, and phenolic or naphtholic compounds represented by formula (2) described in the specification of JP-A No. 2001-264929 are used preferably. Further, the phenolic compounds described in the specifications of JP-A Nos. 2003-311533 and 2002-341484 are preferred. Particularly, the naphtholic compounds described in the specification of JP-A No. 2003-66558 are preferred. The development accelerator is used within a range from 0.1 to 20 mol %, preferably, within a range from 0.5 to 10 mol % and, more preferably, within a range from 1 to 5 mol % based on the reducing agent. The method of introduction into the photosensitive material can include the method identical with that for the reducing agent and, particularly preferably, it is added as a solid dispersion or an emulsified dispersion. In a case of addition as the emulsified dispersion, it is preferably added as an emulsified dispersion dispersed by using a high boiling point solvent which is solid at a normal temperature and an auxiliary solvent of a low boiling point, or added as a so-called oilless emulsified dispersion not using the high boiling point solvent.

In the invention, among the development accelerators described above, hydrazinic compounds described in the specifications of JP-A Nos. 2002-156727 and 2002-278017, and naphtholic compounds described in the specification of JP-A No. 2003-66558 are more preferred.

Particularly preferred development accelerators in the invention are compounds represented by the following formulae (A-1) and (A-2).

$Q_1$-NHNH-$Q_2$            Formula (A-1)

(in which $Q_1$ represents an aromatic group or heterocyclic group bonded at a carbon atom to —NHNH-$Q_2$, and $Q_2$ represents a carbamoyl group, acyl group, alkoxycarbonyl group, aryloxycarbonyl group, sulfonyl group, or sulfamoyl group).

In formula (A-1), the aromatic group or heterocyclic group represented by $Q_1$ is, preferably, a 5 to 7 membered unsaturated ring. Preferred examples are benzene ring, pyridine ring, pyrazine ring, pyrimidine ring, pyridazine ring, 1,2,4-triazine ring, 1,3,5-triazine ring, pyrrole ring, imidazole ring, pyrazole ring, 1,2,3-triazole ring, 1,2,4-triazole ring, tetrazole ring, 1,3,4-thiadiazole ring, 1,2,4-thiadiazole ring, 1,2,5-thiadiazole ring, 1,3,4-oxadiazole ring, 1,2,4-oxadiazole ring, 1,2,5-oxadiazole ring, thiazole ring, oxazole ring, isothiazole ring, isooxazole ring, or thiophene ring, and a condensed ring in which the rings described above are condensed to each other is also preferred.

The rings described above may have substituents and in a case where they have two or more substituents, the substituents may be identical or different with each other. Examples of the substituent can include a halogen atom, alkyl group, aryl group, carbonamide group, alkylsulfonamide group, arylsulfonamide group, alkoxy group, aryloxy group, alkylthio group, arylthio group, carbamoyl group, sulfamoyl group, cyano group, alkylsulfonyl group, arylsulfonyl group, alkoxycarbonyl group, aryloxycarbonyl group or acyl group. In a case where the substituents are groups capable of substitution, they may have further substituents and examples of preferred substituents can include a halogen atom, alkyl group, aryl group, carbonamide group, alkylsulfonamide group, arylsulfonamide group, alkoxy group, aryloxy group, alkylthio group, arylthio group, acyl group, alkoxycarbonyl group, aryloxycarbonyl group, carbamoyl group, cyano group, sulfamoyl group, alkylsulfonyl group, arylsulfonyl group, and acyloxy group.

The carbamoyl group represented by $Q_2$ is a carbamoyl group of, preferably, 1 to 50 carbon atoms and, more preferably, 6 to 40 carbon atoms and can include, for example, not-substituted carbamoyl, methyl carbamoyl, N-ethylcarbamoyl, N-propylcarbamoyl, N-sec-butylcarbamoyl, N-octylcarbamoyl, N-cyclohexylcarbamoyl, N-tert-butylcarbamoyl, N-dodecylcarbamoyl, N-(3-dodecyloxypropyl)carbamoyl, N-octadecylcarbamoyl, N-{3-(2,4-tert-pentylphenoxy)propyl}carbamoyl, N-(2-hexyldecyl) carbamoyl, N-phenylcarbamoyl, N-(4-dodecyloxyphenyl) carbamoyl, N-(2-chloro-5-dodecyloxycarbonylphenyl) carbamoyl, N-naphthylcarbamoyl, N-3-pyridylcarbamoyl or N-benzylcarbamoyl.

The acyl group represented by $Q_2$ is an acyl group of, preferably, 1 to 50 carbon atoms and, more preferably, 6 to 40 carbon atoms and can include, for example, a formyl, acetyl, 2-methylpropanoyl, cyclohexylcarbonyl, octanoyl, 2-hexyldecanoyl, dodecanoyl, chloroacetyl, trifluoroacetyl, benzoyl, 4-dodecyloxybenzoyl, or 2-hydroxymethylbenzoyl. The alkoxycarbonyl group represented by $Q_2$ is an alkoxycarbonyl group of, preferably, 2 to 50 carbon atom and, more preferably, 6 to 40 carbon atoms and can include, for example, methoxycarbonyl, ethoxycarbonyl, isobutyloxycarbonyl, cyclehexyloxycarbonyl, dodecyloxycarbonyl or benzyloxycarbonyl.

The aryloxy carbonyl group represented by $Q_2$ is an aryloxycarbonyl group of, preferably, 7 to 50 carbon atoms and, more preferably, 7 to 40 carbon atoms and can include, for example, a phenoxycarbonyl, 4-octyloxyphenoxycarbonyl, 2-hydroxymethylphenoxycarbonyl, or 4-dodecyloxyphenoxycarbonyl. The sulfonyl group represented by $Q_2$ is a sulfonyl group of, preferably, 1 to 50 carbon atoms and, more preferably, 6 to 40 carbon atoms and can include, for example, a methylsulfonyl, butylsulfonyl, octylsulfonyl, 2-hexadecylsulfonyl, 3-dodecyloxypropylsulfonyl, 2-octyloxy-5-tert-octylphenyl sulfonyl, or 4-dodecyloxyphenyl sulfonyl.

The sulfamoyl group represented by $Q_2$ is a sulfamoyl group of, preferably, 0 to 50 carbon atoms, more preferably, 6 to 40 carbon atoms and can include, for example, a not-substituted sulfamoyl, N-ethylsulfamoyl group, N-(2-ethylhexyl)sulfamoyl, N-decylsulfamoyl, N-hexadecylsulfamoyl, N-{3-(2-ethylhexyloxy)propyl}sulfamoyl, N-(2-chloro-5-dodecyloxycarbonylphenyl)sulfamoyl, or N-(2-tetradecyloxyphenyl) sulfamoyl. The group represented by $Q_2$ may further have a group mentioned as the example of the substituent for the 5 to 7-membered unsaturated ring represented by $Q_1$ at the position capable of substitution. In a case where the group has two or more substituents, such substituents may be identical or different with each other.

Then, a preferred range for the compound represented by formula (A-1) is to be described. A 5 to 6-membered unsaturated ring is preferred for $Q_1$, and a benzene ring, pyrimidine ring, 1,2,3-triazole ring, 1,2,4-triazole ring, tetrazole ring, 1,3,4-thiadiazole ring, 1,2,4-thiadiazole ring, 1,3,4-oxadiazole ring, 1,2,4-oxadiazole ring, thioazole ring, oxazole ring, isothiazole ring, isooxazole ring, and a ring in which the rings described above are condensed each with a benzene ring or unsaturated hetero-ring is further preferred. Further, $Q_2$ preferably represents a carbamoyl group and a carbamoyl group having a hydrogen atom on the nitrogen atom is particularly preferred.

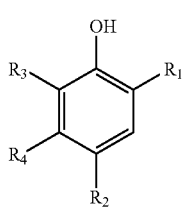

Formula (A-2)

In formula (A-2), $R_1$ represents an alkyl group, acyl group, acylamino group, sulfonamide group, alkoxycarbonyl group, or carbamoyl group. $R_2$ represents a hydrogen atom, halogen atom, alkyl group, alkoxy group, aryloxy group, alkylthio group, arylthio group, acyloxy group, or carbonate ester group. $R_3$ and $R_4$ each independently represent a group capable of substitution on the benzene ring which has been mentioned as the example of the substituent for formula (A-1). $R_3$ and $R_4$ may join to each other to form a condensed ring.

$R_1$ represents, preferably, an alkyl group of 1 to 20 carbon atoms (for example, methyl group, ethyl group, isopropyl group, butyl group, tert-octyl group, or cyclohexyl group), acylamino group (for example, acetylamino group, benzoylamino group, methylureido group, or 4-cyanophenylureido group), carbamoyl group (for example, n-butylcarbamoyl group, N,N-diethylcarbamoyl group, phenylcarbamoyl group, 2-chlorophenylcarbamoyl group, or 2,4-dichlorophenylcarbamoyl group), with acylamino group (including ureido group or urethane group) being more preferred.

$R_2$ represents, preferably, a halogen atom (more preferably, chlorine atom, or bromine atom), alkoxy group (for example, methoxy group, butoxy group, n-hexyloxy group, n-decyloxy group, cyclohexyloxy group, or benzyloxy group), and aryloxy group (phenoxy group or naphthoxy group).

$R_3$ represents, preferably, a hydrogen atom, halogen atom or an alkyl group of 1 to 20 carbon atoms, the halogen atom being most preferred. $R_4$ represents, preferably, a hydrogen atom, alkyl group or an acylamino group, with the alkyl group or the acylamino group being more preferred. Examples of the preferred substituent thereof are identical with those for $R_1$. In a case where $R_4$ is an acylamino group, $R_4$ may preferably be joined with $R_3$ to form a carbostyryl ring.

In a case where $R_3$ and $R_4$ in formula (A-2) join to each other to form a condensed ring, a naphthalene ring is particularly preferred as the condensed ring. The same substituent as the example of the substituent referred to for formula (A-1) may join to the naphthalene ring. In a case where formula (A-2) is a naphtholic compound, $R_1$ represents, preferably, a carbamoyl group. Among them, benzoyl group is particularly preferred. $R_2$ represents, preferably, an alkoxy group or aryloxy group and, particularly preferably, an alkoxy group.

Preferred specific examples for the development accelerator of the invention are to be described below. The invention is not restricted to them.

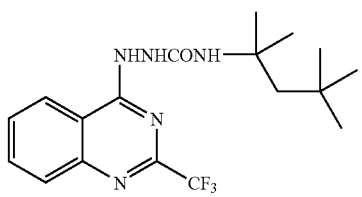
(A-1)

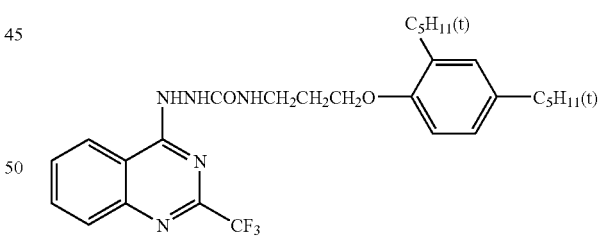
(A-2)

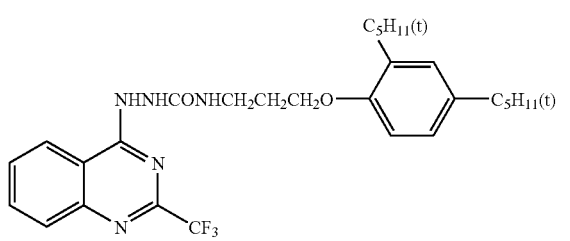
(A-3)

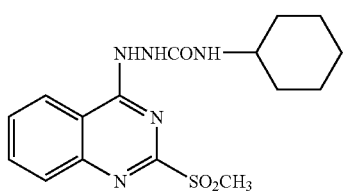
(A-4)

-continued (A-5)
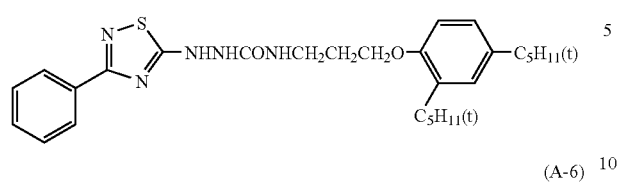

(A-6)
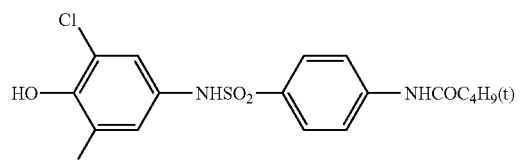

(A-7)
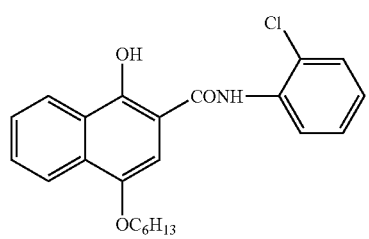

(A-8)
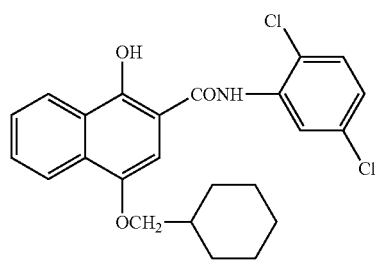

(A-9)
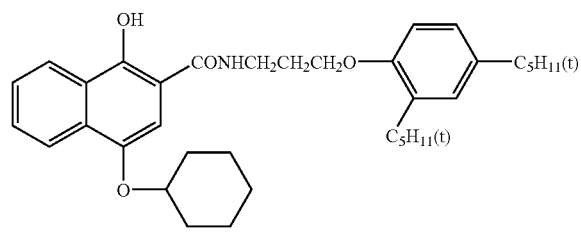

(A-10)
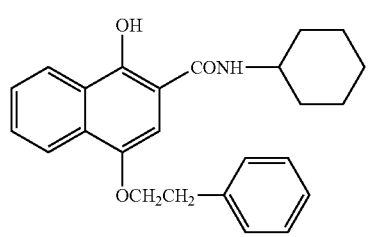

(A-11)
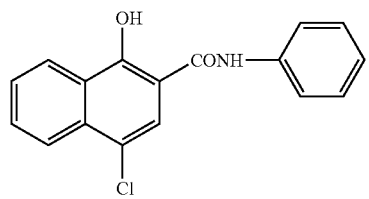

-continued (A-12)
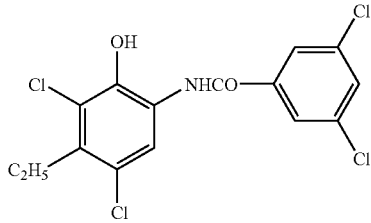

Description for Hydrogen Bonding Compound

In a case where the reducing agent has an aromatic hydroxyl group (—OH) or an amino group in the invention, it is preferred to use in combination a non-reducing compound having a group capable of forming a hydrogen bond with the amino group.

The group capable of forming the hydrogen bond can include, for example, a phosphoryl group, sulfoxide group, sulfonyl group, carbonyl group, amide group, ester group, urethane group, ureido group, tertiary amino group, or nitrogen-containing aromatic group. Among them, preferred are those compounds having a phosphoryl group, sulfoxide group, amide group (not having >N—H group and blocked as >N—Ra (Ra: substituent other than H), urethane group (not having >N—H group and blocked as >N—Ra (Ra: substituent other than H), or ureido group (not having >N—H group and blocked as >N—Ra (Ra: substituent other than H).

In the invention, a particularly preferred hydrogen bonding compound is a compound represented by the following formula (D).

Formula (D)

Formula (D)

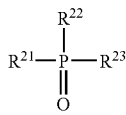

In formula (D), $R^{21}$ to $R^{23}$ each independently represent an alkyl group, aryl group, alkoxy group, aryloxy group, amino group or heterocyclic group, which may be not substituted or have a substituent.

The substituent in a case where $R^{21}$ to $R^{23}$ has a substituent can include, for example, a halogen atom, alkyl group, aryl group, alkoxy group, amino group, acyl group, acylamino group, alkylthio group, arylthio group, sulfoneamide group, acyloxy group, oxycarbonyl group, carbamoyl group, sulfamoyl group, sulfonyl group, or phosphoryl group, and preferred substituent can include an alkyl group or aryl group, for example, methyl group, ethyl group, isopropyl group, t-butyl group, t-octyl group, phenyl group, 4-alkoxyphenyl group, or 4-acyloxyphenyl group.

The alkyl group for $R^{21}$ to $R^{23}$ can include, specifically, a methyl group, ethyl group, butyl group, octyl group, dodecyl group, isopropyl group, t-butyl group, t-amyl group, t-octyl group, cyclohexyl group, 1-methylcyclohexyl group, benzyl group, phenethyl group, or 2-phenoxypropyl group.

The aryl group can include, for example, a phenyl group, cresyl group, xylyl group, naphthyl group, 4-t-butylphenyl group, 4-t-octylphenyl group, 4-anisidyl group, or 3,5-dichlorophenyl group.

The alkoxy group can include, for example, a methoxy group, ethoxy group, butoxy group, octyloxy group, 2-ethylhexyloxy group, 3,5,5-trimethylhexyloxy group, dodecyloxy group, cyclohexyloxy group, 4-methylcyclohexyloxy group, or benzyloxy group.

The aryloxy group can include, for example, a phenoxy group, cresyloxy group, isopropylphenoxy group, 4-t-butylphenoxy group, naphthoxy group, or biphenyloxy group.

The amino group can include, for example, a dimethylamino group, diethylamino group, dibutylamino group, dioctylamino group, N-methyl-N-hexylamino group, dicyclohexylamino group, diphenylamino group, or N-methyl-N-phenylamino group.

For $R^{21}$ to $R^{23}$, an alkyl group, aryl group, alkoxy group, or aryloxy group are preferred. With a view point of the effect of the invention, it is preferable that at least one of $R^{21}$ to $R^{23}$ is alkyl group or aryl group and it is more preferable that two or more of them are alkyl group or aryl group. Further, with a view point of availability at a reduced cost, it is preferable that $R^{21}$ to $R^{23}$ are identical groups.

Specific examples of the hydrogen bonding compound including the compound of formula (D) in the invention are shown below but the invention is not restricted to them.

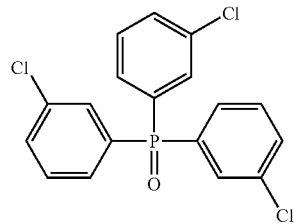
(D-1)

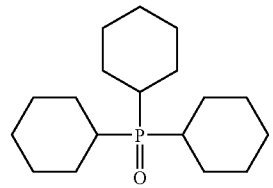
(D-2)

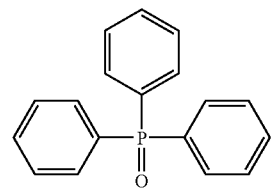
(D-3)

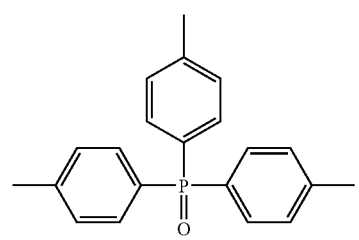
(D-4)

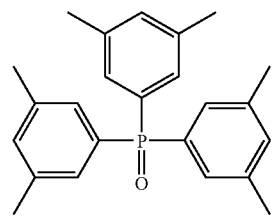
(D-5)

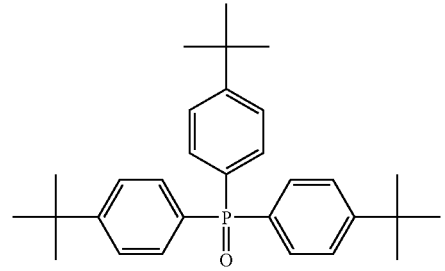

-continued

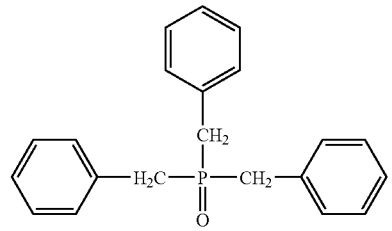
(D-6)

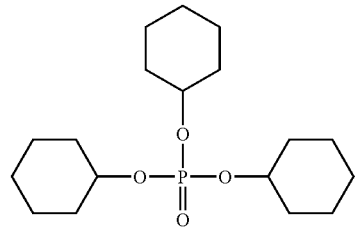
(D-7)

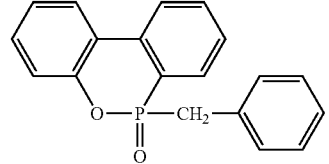
(D-8)

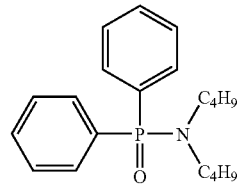
(D-9)

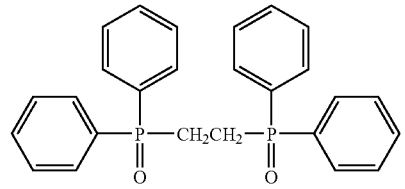
(D-10)

(D-11)

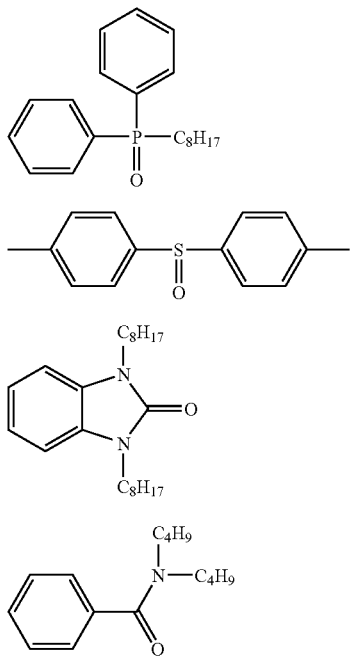

In addition to those described above, specific examples of the hydrogen bonding compound can include those described in JP-A Nos. 2001-281793 and 2002-014438.

The hydrogen bonding compound in the invention can be incorporated in the form of solution, emulsified dispersion or dispersion of fine solid particles into a coating solution and can be used in the photosensitive material in the same manner as in the reducing agent. The compound forms a hydrogen bond complex with a compound having a phenolic hydroxyl group in the state of a solution and can be isolated in the crystalline state as a complex depending on the combination of the reducing agent and the compound of formula (A) in the invention.

Use of the thus isolated crystal powder as the dispersion of fine solid particles is particularly preferred for obtaining stable performance. Further, a method of powder-mixing the reducing agent and the hydrogen bonding compound in the invention and forming a complex during dispersion, for example, by a sand grinder mill by using an appropriate dispersant can also be used preferably.

The hydrogen bonding compound in the invention is preferably used within a range from 1 to 200 mol %, more preferably, within a range from 10 to 150 mol % and, further preferably, within a range from 30 to 100 mol % based on the reducing agent.

Description for Binder

As a binder for the image-forming layer in the invention, any polymer may be used so long as the glass transition temperature is from 0° C. to 80° C. A suitable binder is transparent or semi-transparent and generally colorless and can include natural resins or polymers and copolymers or synthetic resins or polymers and copolymers, as well as other film-forming media, for example, gelatins, rubbers, poly(vinyl alcohols), hydroxyethyl celluloses, cellulose acetates, cellulose acetate butylates, poly(vinylpyrrolidones), casein, starch, poly(acrylic acids), poly(methylmethacrylic acids), poly(vinyl chlorides), poly(metyhacrylic acids), styrene-maleic acid anhydride copolymers, styrene-acrylonitrile copolymers, styrene-butadiene copolymers, poly(vinylacetals) (for example, poly(vinylformal), and poly (vinylbutyral)), poly(esters), poly(urethanes), phenoxy resins, poly(vinylidene chlorides), poly(epoxides), poly(carbonates), poly(vinyl acetates), poly(olefins), cellulose esters, or poly(amides). The binder may be formed by coating from water or an organic solvent or emulsion.

The glass transition temperature of the binder is 0° C. to 80° C., preferably, 10° C. to 70° C. and, more preferably, 15° C. to 60° C.

Tg in the present specification is calculated according to the following equation.

$$1/Tg = \Sigma(Xi/Tgi)$$

It is assumed here monomer ingredients by the number of n (i=1 to n) are copolymerized in the polymer. Xi represents the weight ratio of the $i_{th}$ monomer ($\Sigma Xi=1$) and Tgi represents a glass transition temperature (absolute temperature) of a homopolymer of the $i_{th}$ monomer. $\Sigma$ is a sum for i=1 to n. For the value of the glass transition temperature for the homopolymer of each of the monomers (Tgi), values in Polymer Handbook (3rd Edition) (written by J. Brandrup, E. H. Immergut (Wiley-Interscience, 1989)) were adopted.

Two or more kinds of binders may be used together as required. Further, a binder with a glass transition temperature of 20° C. or higher and a binder with a glass transition temperature of lower than 20° C. may be used in combination. In the case of blending two or more kinds of polymers of different Tg for use, it is preferable that weight average Tg thereof is within the range described above.

In the invention, it is preferred to form the image-forming layer by using a coating solution in which 30 mass % or more of the solvent is water and coating and drying the same to form a coating layer.

In the invention, the performance can be improved in a case where the image-forming layer is formed by using a coating solution in which 30 mass % or more of the solvent is water and coating and drying the same, and further when the binder in the image-forming layer is soluble or dispersible to an aqueous solvent (water solvent), particularly, when it comprises a polymer latex with an equilibrium water content of 2 mass % or less at 25° C. and 60% RH. A most preferred form is prepared such that the ionic conductivity is 2.5 mS/cm or lower and the preparation method therefor can include a method of conducting purification by using a separation functional film after the synthesis of the polymer.

The aqueous solvent to which the polymer is soluble or dispersible referred to herein is water or mixture of water and 70 mass % or less of a water miscible organic solvent. The water miscible organic solvent can include, for example, alcohols such as methyl alcohol, ethyl alcohol, and propyl alcohol, cellosolves such as methyl cellosolve, ethyl cellosolve, and butyl cellosolve, ethyl acetate, and dimethylformamide.

The term "aqueous solvent" is used herein also for a system in which the polymer is not dissolved thermodynamically but is present in a so-called dispersed state.

"Equilibrium water content (mass %) at 25° C., 60% RH" can be expressed as below by using weight W1 for a polymer at a moisture controlled equilibrium under a 25° C., 60% RH atmosphere and weight W0 for the polymer at 25° C. in an absolute dried state:

Equilibrium water content at 25° C., 60% RH={(W1–W0)/W0}×100 (mass %)

For the definition and the measuring method of the water content, Polymer Engineering Course 14, Polymer Material Test Method (edited by Polymer Society, published from Chijin Shokan) can be referred to for instance.

The equilibrium water content of the binder polymer in the invention at 25° C., 60% RH is, preferably, 2 mass % or less, more preferably, 0.01 mass % or more and 1.5 mass % or less and, further preferably, 0.02 mass % or more and 1 mass % or less.

In the invention, a polymer dispersible in an aqueous solvent is particularly preferred. As an example of the dispersed state, either a latex in which fine particles of water insoluble hydrophobic polymer are dispersed, or a dispersion in which polymer molecules are dispersed in the state of molecules or forming micelles may be used, with the latex-dispersed particles being more preferred. The average grain size of the dispersed particles is within a range of 1 nm or more and 50000 nm or less, preferably, within a range of 5 nm or more and 1000 nm or less, more preferably, within a range from 10 nm to 500 nm and, further preferably, within a range of 50 nm or more and 200 nm or less. There is no particular restriction on the grain size distribution of the dispersed particles which may have a wide grain size distribution or a grain size distribution of mono dispersion. Use of two or more of particles having grain size distributions of mono dispersion in admixture is also a preferred method of use for controlling the physical property of the coating solution.

As a preferred embodiment of the polymers dispersible to the aqueous solvent in the invention, hydrophobic polymers such as acrylic polymers, poly(esters), rubbers (for example SBR resin), poly(urethanes), poly(vinyl chlorides), poly (vinyl acetates), poly(vinylidene chlorides), or poly(olefins) can be used preferably. The polymer may be a linear polymer, branched polymer, or crosslinked polymer. It may be a so-called homopolymer in which single monomers are polymerized or a copolymer in which two or more kinds of monomers are polymerized. In the case of the copolymer, it may be either a random copolymer or a block copolymer. The molecular weight of the polymer, based on the number average molecular weight, is 5000 or more and 1,000,000 or less and, preferably, 10,000 or more and 200,000 or less. A polymer with excessively small molecular weight provides insufficient dynamic strength for the image-forming layer, whereas a polymer of excessively large molecular weight is not preferred since the film-deposition property is poor. Further, the crosslinking polymer latex can be used particularly preferably.

Specific Example of Polymer Latex

Specific examples of the preferred polymer latex are shown below. They are expressed by using starting monomers and, in each of parentheses, numerical value means mass % and the molecular weight is a number average molecular weight. In a case of using polyfunctional monomers, since they form crosslinking structures and the concept of the molecular weight can not be applied, it is indicated as "crosslinking" with description for the molecular weight being omitted. Tg represents a glass transition temperature.

P-1: -MMA (70)-EA(27)-MAA(3) latex (molecular weight 37000, Tg 61° C.)
P-2: -MMA (70)-2EHA(20)-St(5)-AA(5) latex (molecular weight 40000, Tg 59° C.)
P-3: -St(50)-Bu(47)-MAA(3) latex (crosslinking, Tg–17° C.)
P-4: -St(68)-Bu(29)-AA(3) latex (crosslinking, Tg 17° C.)
P-5: -St(71)-Bu(26)-AA(3) latex (crosslinking, Tg 24° C.)
P-6: -St(70)-Bu(27)-IA(3) latex (crosslinking),
P-7: -St(75)-Bu(24)-AA(1) latex (crosslinking, Tg 29° C.).
P-8: -St(60)-Bu(35)-DVB(3)-MAA(2) latex (crosslinking),
P-9: -St(70)-Bu(25)-DVB(2)-AA (3) latex (crosslinking),
P-10: -VC(50)-MMA(20)-EA(20)-AN(5)-AA(5) latex (molecular weight 80000),
P-11: -VDC(85)-MMA(5)-EA(5)-MAA(5) latex (molecular weight 67000),
P-12: -Et(90)-MAA(10) latex (molecular weight 12000),
P-13: -St(70)-2EHA(27)-AA(3) latex (molecular weight 130000, Tg 43° C.)
P-14: -MMA(63)-EA(35)-AA(2) latex (molecular weight of 33000, Tg 47° C.),
P-15: -St(70.5)-Bu(26.5)-AA(3) latex (crosslinking, Tg 23° C.),
P-16: -St(69.5)-Bu(27.5)-AA (3) latex (crosslinking, Tg 20.5° C.).

The abbreviations for the structure represent the following monomers. MMA; methyl methacrylate, EA; ethyl acrylate, MAA: methacrylic acid, 2EHA: 2-ethylhexylacrylate, St; styrene, Bu; butadiene, AA; acrylic acid, DVB; divinyl benzene, VC; vinyl chloride, AN; acrylonitrile, VDC; vinylidene chloride, Et; ethylene, IA; itaconic acid.

The polymer latexes described above are also commercially available and the following polymers can be utilized. They can include CEBIAN A-4635, 4718, 4601 (all manufactured by Dicel Chemical Industry Co. Ltd.), and Nipol Lx 811, 814, 821, 820, 857 (manufactured by Nippon Zeon Co.) as examples for the acrylic polymer; FINETEX, ES 650, 611, 675, 850 (manufactured by Dainippon Ink and Chemicals Incorporated), WD-size, and WMS (manufactured by Eastman Chemical Co.) as examples for polyesters, HYDRAN AP 10, 20, 30 and 40 (manufactured by Dainippon Ink and Chemicals Incorporated) as examples for polyurethanes, LACSTAR 7310K, 3307B, 4700H and 7132C (manufactured by Dainippon Ink and Chemicals Incorporated), and Nipol Lx 416, 410, 438C and 2507 (manufactured by Nippon Zeon Co.) as examples for rubbers, G 351, G576 (manufactured by Nippon Zeon Co.) as examples for polyvinyl chlorides, L 502, L513 (manufactured by Asahi Kasei Industry Co.) as examples for polyvinylidene chlorides, and CHEMIPAL S120, SA100 (manufactured by Mitsui Petrochemical Co.) as examples for polyolefins.

The polymer latexes described above may be used alone or two or more of them may be blended as required.

Preferred Latex

As the polymer latex used in the invention, latex of styrene-butadiene copolymer is particularly preferred. The weight ratio between the styrene monomer unit and the butadiene monomer unit in the styrene-butadiene copolymer is, preferably, 40:60 to 95:5. Further, the ratio of the styrene monomer unit and the butadiene monomer unit in the copolymer is, preferably, 60 mass % or more and 99 mass % or less. Further, the polymer latex in the invention contains acrylic acid or methacrylic acid, preferably, by 1 mass % or more and 6 mass % or less and, more preferably, 2 mass % or more and 5 mass % or less based on the sum of styrene and butadiene. The polymer latex in the invention preferably contains acrylic acid. A preferred range for the molecular weight is identical with that described previously.

The latex of the styrene-butadiene copolymer preferably used in the invention can include, for example, P-3 to P-8 and 15 described above, and LACSTAR-3307B, 7132C, Nipol Lx416 as commercial products.

A hydrophilic polymer such as gelatin, polyvinyl alcohol, methyl cellulose, hydroxypropyl cellulose or carboxymethyl cellulose may be added optionally to the image-forming layer of the photosensitive material in the invention. The addition amount of the hydrophilic polymer is, preferably, 30 mass % or less and, more preferably, 20 mass % or less based on the entire binder for the image-forming layer.

The organic silver salt containing layer (that is, image-forming layer) in the invention is preferably formed by using the polymer latex. The amount of the binder in the image-forming layer as the weight ratio of the entire binder/organic silver salt is preferably within a range from 1/10 to 10/1, more preferably, within a range from 1/3 to 5/1 and, further preferably, within a range from 1/1 to 3/1.

Further, the image-forming layer is usually also a photosensitive layer containing the photosensitive silver halide as the photosensitive silver salt (image-forming layer), in which the weight ratio for the entire binder/silver halide is, preferably, within a range from 400 to 5 and, more preferably, within a range from 200 to 10.

The entire amount of the binder in the image-forming layer of the invention is within a range, preferably, from 0.2 to 30 g/m$^2$, more preferably, 1 to 15 g/m$^2$ and, further preferably, 2 to 10 g/m$^2$. In the image-forming layer of the invention, a crosslinker for the closslinking and a surfactant for the improvement of the coatability may also be added.

Solvent for Preferred Coating Solution

A solvent for the image-forming layer coating solution of the photosensitive material in the invention (for the sake of simplicity, the solvent and the dispersant are collectively referred to as the solvent) is preferably an aqueous solvent containing 30 mass % or more of water. As the ingredient other than water, any water miscible organic solvent such as methyl alcohol, ethyl alcohol, isopropyl alcohol, methyl cellosolve, ethyl cellosolve, dimethyl formamide, and ethyl acetate may be used. The water content in the solvent for the coating solution is, preferably, 50 mass % or more and, more preferably, 70 mass % or more. Examples of the preferred solvent composition can include, in addition to water, water/methyl alcohol=90/10, water/methyl alcohol=70/30, water/methyl alcohol/dimethylformamide=80/15/5, water/methyl alcohol/ethyl cellosolve=85/10/5, and water/methyl alcohol/isopropyl alcohol=85/10/5 (numerical value based on mass %).

Description of Anti-Foggant

The anti-foggant, the stabilizer and the stabilizer precursor usable in the invention can include those described in JP-A No. 10-62899, in column No. 0070, EP-A No. 0803764A1, in page 20, line 57–page 21, line 7, compounds described in JP-A Nos. 9-281637 and 9-329864, compounds described in U.S. Pat. No. 6,083,681, and EP No. 1048975.

1) Polyhalogen Compound

Preferred organic polyhalogen compound in the invention is to be described specifically. The preferred polyhalogen compound in the invention is a compound represented by the following formula (H).

Q-(Y)$_n$—C(Z$_1$)(Z$_2$)X    Formula (H)

In formula (H), Q represents an alkyl group, aryl group or heterocyclic group, Y represents a bivalent connection group, n represents 0 to 1, Z$_1$ and Z$_2$ each independently represent a halogen atom, and X represents a hydrogen atom or an electron accepting group.

In formula [H], Q is, preferably, an alkyl group of 1 to 6 carbon atoms, an aryl group of 6 to 12 carbon atoms or heterocyclic group containing at least one nitrogen atom (for example, pyridine and quinoline).

In a case where Q is an aryl group in formula [H], Q preferably represents a phenyl group substituted with an electron accepting group in which the Hammett's substituent group constant σ p takes a positive value. For the Hammett's substituent constant, Journal of Medicinal Chemistry, 1973, vol. 16, No. 11, pages 1207–1216, etc. can be referred to. Examples of the electron accepting group described above include a halogen atom, alkyl group substituted by electron accepting group, aryl group substituted by electron accepting group, heterocyclic group, arkyl or arylsulfonyl group, acyl group, alkoxycarbonyl group, carbamoyl group, or sulfamoyl group. Particularly preferred electron accepting group is a halogen atom, carbamoyl group, or arylsulfonyl group, with the carbamoyl group being most preferred. X is preferably an electron accepting group. Preferable examples of the electron accepting group include a halogen atom; an aliphatic, aryl or heterocyclic sulfonyl group; an aliphatic, aryl or heterocyclic acyl group; an aliphatic, aryl or heterocyclic oxycarbonyl group; a carbamoyl group; and a sulfamoyl group. A halogen atom and a carbamoyl group are more preferable, and a bromine atom is particularly preferable among them.

Z$_1$ and Z$_2$ each independently preferably represent a bromine atom or an iodine atom and, more preferably, represent a bromine atom.

Y represents, preferably, —C(=O)—, —SO—, —SO$_2$—, —C(=O)N(R)—, or —SO$_2$N(R)— and, more preferably, —C(=O)—, —SO$_2$—, and —C(=O)N(R)— and, particularly preferably, —SO$_2$—, —C(=O)N(R)—, in which R represents a hydrogen atom, aryl group or alkyl group, more preferably, a hydrogen atom or an alkyl group and, particularly preferably, a hydrogen atom.

n represents 0 or 1 and, preferably, 1.

In formula (H) in a case where the Q represents an alkyl group, Y is preferably —C(=O)N(R)— and in a case where Q represents an aryl group or the heterocyclic group, Y preferably represents —SO$_2$—.

A form where the residues formed by removing the hydrogen atom from the compound in formula (H) are combined to each other (generally referred to as bis-form, tris-form and tetrakis-form) can also be used preferably. A form having a dissociating group (for example, COOH group or a salt thereof, SO$_3$H group or a salt thereof, PO$_3$H group or a salt thereof, etc.), a group containing a quaternary nitrogen cation (for example, ammonium group, pyridinium group, etc.), polyethyleneoxy group or hydroxyl group as a substituent in formula (H) is also preferred.

Specific examples of the compound of formula (H) in the invention are shown below.

(H-1)

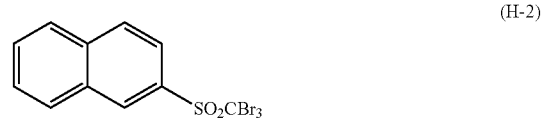

(H-2)

(H-3)

-continued (H-4) 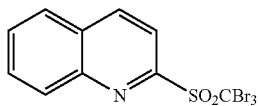

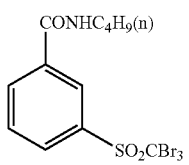
(H-5)

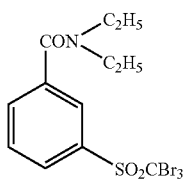
(H-6)

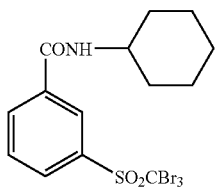
(H-7)

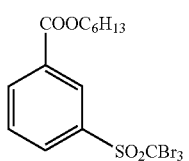
(H-8)

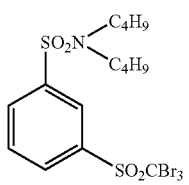
(H-9)

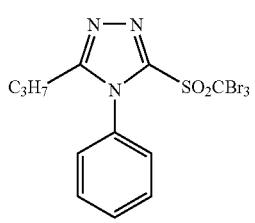
(H-10)

(H-11)

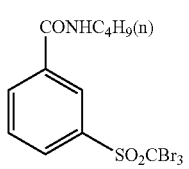
(H-12)

-continued (H-13) 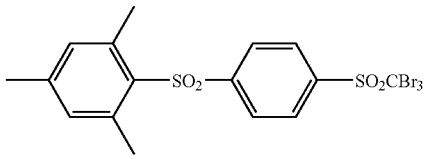

(H-14) 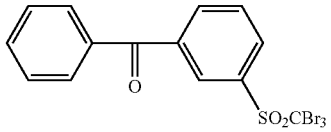

(H-15) 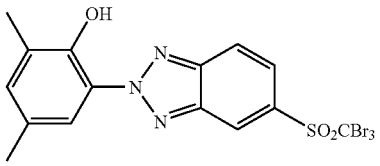

(H-16) 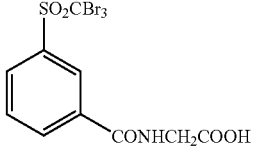

(H-17) 

(H-18) 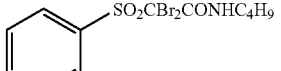

(H-19) 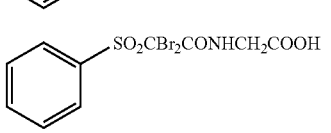

As other polyhalogen compounds than those described above usable in the invention, those compounds described in the specifications of U.S. Pat. Nos. 3,874,946, 4,756,999, 5,340,712, 5,369,000, 5,464,737, 6,506,548, JP-A Nos. 50-137126, 50-89020, 50-119624, 59-57234, 7-2781, 7-5621, 9-160164, 9-244177, 9-244178, 9-160167, 9-319022, 9-258367, 9-265150, 9-319022, 10-197988, 10-197989, 11-242304, 2000-2963, 2000-112070, 2000-284410, 2000-284412, 2001-33911, 2001-31644, 2001-312027, and 2003-50441 as the exemplified compounds for the inventions can be used preferably. Particularly those compounds exemplified specifically in JP-A Nos. 7-2781, 2001-33911, and 2001-312027 are preferred.

The compound represented by formula (H) in the invention is used, preferably, within a range of $10^{-4}$ mol or more and 1 mol or less, more preferably, within a range of $10^{-3}$ mol or more and 0.5 mol or less and, further preferably, within a range of $1 \times 10^{-2}$ mol or more and 0.2 mol or less based on one mol of the non-photosensitive silver salt in the image-forming layer.

In the invention, the method of incorporating the antifoggant in the photosensitive material can include the method described for the method of incorporating the reducing agent, and also the organic polyhalogen compound is added preferably as the fine solid particle dispersion.

2) Other Anti-Foggant

Other anti-foggants can include mercury (II) salt in JP-A No. 11-65021, in column No. 0113, benzoic acids, in column No. 0114, salicylic acid derivatives in JP-A No. 2000-206642, formalin scavenger compound represented by formula (S) in JP-A No. 2000-221634, triazine compound according to claim 9 in JP-A No. 11-352624, the compound represented by formula (III) in JP-A No. 6-11791, and 4-hydroxy-6-methyl-1,3,3a,7-tetrazaindene.

The photothermographic material in the invention may contain an azolium salt for preventive fogging. The azolium salt can include the compound represented by formula (XI) described in JP-A No. 59-193447, the compound described in JP-B No. 55-12581, and the compound represented by formula (II) described in JP-A No. 60-153039. The azolium salt may be added to any portion of the photosensitive material and it is preferably added to the layer on the surface having the image-forming layer and it is added further preferably to the image-forming layer. Referring to the addition time of the azolium salt, it may be added at any step for the preparation of coating solution and, in a case of adding to the image-forming layer, it may be added at any step from preparation of the organic silver salt to preparation of the coating solution and it is preferably added after the preparation of organic silver salt to just before the coating thereof. The azolium salt may be added by any method such as in the form of powder, solution and fine particle dispersion. Further, it may be added as a solution mixed with other additives such as a sensitizing dye, a reducing agent, or a color-tone-adjusting agent. The addition amount of the azolium salt in the invention may be any amount and it is, preferably, $1 \times 10^{-6}$ mol or more and 2 mol or less and, further preferably, $1 \times 10^{-3}$ mol or more and 0.5 mol or less based on one mol of silver.

Other Additives

1) Mercapto, Disulfide and Thions

In the invention, for controlling the development by suppressing or promoting development, for improving the spectral sensitizing efficiency and improving the storability before and after development, mercapto compounds, disulfide compounds and thion compounds can be incorporated. They are described in JP-A No. 10-62899, in column Nos. 0067 to 0069, the compound represented by formula (I) in JP-A No. 10-186572 and specific examples thereof, in column Nos. 0033 to 0052, and EP-A No. 0803764A1, page 20, lines 36 to 56. Among them, mercapto substituted heterocyclic aromatic compounds described in JP-A Nos. 9-297367, 9-304875, 2001-100358, 2002-303954 and 2002-303951 are preferred.

2) Color-Tone-Adjusting Agent

In the photothermographic material of the invention, the color-tone-adjusting agent is added preferably and the color-tone-adjusting agent is described in JP-A No. 10-62899, in column Nos. 0054 to 0055, EP-A No. 0803764A1, in page 21, lines 23–48, JP-A Nos. 2000-356317 and 2000-187298. Particularly, phthalazinones (phthalazinone, phthalazinone derivatives or metal salts; for example, 4-(1-naphthyl) phthalazinone, 6-chlorophthalazinone, 5,7-dimetoxyphthalazinone and 2,3-dihydro-1,4-phthalazione); combinations of phthalazinones and phthalic acids (for example, phthalic acid, 4-methyl phthalic acid, 4-nitro phthalic acid, diammonium phthalate, sodium phthalate, potassium phthalate, and tetrachloro phthalic acid anhydride); phthalazines (phthalazine, phthalazine derivative or metal salts; for example, 4-(1-naphthyl)phthalazine, 6-isopropyl phthalazine, 6-t-butyl phthalazine, 6-chlorophthalazine, 5,7-dimethoxyphthalazine and 2,3-dihydrophthalazine); and, a combination of phthalazines and phthalic acids is preferred. The combination of phthalazines and phthalic acids is particularly preferred. Among them, particularly preferred combination is that of 6-isopropyl phthalazine and phthalic acid or 4-methylphthalic acid.

3) Plasticizer and Lubricant

In the invention, known platicizers and lubricants can be used for improving the film property. Particularly, for improving the handlability during production and scratch resistance upon heat development, a lubricant such as liquid paraffin, long chained fatty acid, fatty acid amid, or fatty acid esters is used preferably. Particularly, liquid paraffin removed with low boiling point ingredients or fatty acid esters of a molecular weight of 1000 or more having a branched structure is preferred.

For the plasticizer and the lubricant usable in the image-forming layer and the non-photosensitive layer, those compounds described, in JP-A No. 11-65021, in column No. 0117, JP-A No. 2000-5137, Japanese Patent Application Nos. 2003-8015, 2003-8071, and 2003-132815 (these Japanese Patent Applications have not been published at the time of the present application) are preferred.

4) Dye and Pigment

For the image-forming layer of the invention, various kinds of dyes and pigments can be used with a view point of improving the color tone, preventing occurrence of interference fringe upon laser exposure and prevention of irradiation (for example, C.I. Pigment Blue 60, C.I. Pigment Blue 64, C.I. Pigment Blue 15:6). They are specifically described, for example, in WO98/36322, and JP-A Nos. 10-268465 and 11-338098.

5) Nucleating Agent

For the photothermographic material in the invention, a nucleating agent is preferably added to the image-forming layer. The nucleating agent, the addition method and the addition amount thereof are described as compounds of formula (H), formulae (1) to (3), and formulae (A) and (B) in the specifications of JP-A No. 11-65021, column No. 0118, JP-A No. 11-223898, in column Nos. 0136 to 0193, JP-A No. 2000-284399, as compounds of formula (III) to (V) described in the specification of JP-A 2000-347345, and as nucleation promoting agents in JP-A No. 11-65021, in column No. 0102, and JP-A No. 11-223898, in column Nos. 0194 to 0195.

For using formic acid or formate as a strong fogging substance, it is preferably contained by 5 mm mol or less and, further preferably, 1 mm mol or less per one mol of silver on the side having the image-forming layer containing the photosensitive silver halide.

In a case of using the nucleating agent in the photothermographic material of the invention, it is preferred to use an acid formed by hydration of diphosphorus pentaoxide or a salt thereof in combination. The acid formed by hydration of diphosphorus pentaoxide or the salt thereof can include, for example, meta-phosphoric acid (salt), pyro-phosphoric acid (salt), ortho-phosphoric acid (salt), tri-phosphoric acid (salt), tetra-phosphoric acid (salt), and hexameta-phosphoric acid (salt). The acid formed by hydration of diphosphorus pentaoxide or the salt thereof that can be used particularly preferably can include, for example, ortho-phosphoric acid (salt) and hexameta-phosphoric acid (salt). Specific salts are sodium ortho-phosphate, sodium dihydrogen ortho-phosphate, sodium hexameta-phosphate and ammonium hexameta-phosphate.

The amount of the acid formed by hydration of diphosphorus pentaoxide or the salt thereof to be used (coating amount per 1 m$^2$ of photosensitive material) may be any desired amount corresponding to the performance such as the sensitivity or fogging and it is preferably from 0.1 mg/m$^2$ or more and 500 mg/m$^2$ or less, and more preferably 0.5 mg/m$^2$ or more and 100 mg/m$^2$ or less.

The reducing agent, the hydrogen bonding compound, the development accelerator and the polyhalogen compound in the invention are preferably used as a solid dispersion, and a preferred method of preparing the solid dispersion is described in JP-A No. 2002-55405. Preparation and coating of Coating solution The temperature for the preparation of image-forming layer coating solution in the invention is, preferably, 30° C. or higher and 65° C. or lower, a more preferred temperature is 35° C. or higher and lower than 60° C., and a more preferred temperature is 35° C. or higher and 55° C. or lower. Further, the temperature for the image-forming layer coating solution just after the addition of the polymer latex is preferably kept at 30° C. or higher and 65° C. or lower.

Constituent Components Other than the Image-Forming Layer

1) Surface Protective Layer

A surface protective layer can be disposed to the photothermographic material in the invention with an aim of preventing adhesion of the image-forming layer. The surface protective layer may comprise a single layer or plural layers. The surface protective layer is described in JP-A No. 11-65021, in column Nos. 0119 to 0120 and in JP-A No. 2000-171936.

The binder for the surface protective layer in the invention is preferably gelatin and it is also preferred to use polyvinyl alcohol (PVA) alone or in combination. As gelatin, inert gelatin (for example, Nitta gelatin 750), or phthalized gelatin (for example, Nitta gelatin 801) can be used.

PVA can include those described in JP-A No. 2000-171936, in column Nos. 0009 to 0020, and can include, preferably, completely saponified product, PVA-105 and partially saponified product, PVA-205 or PVA-335, and modified polyvinyl alcohol MP-203 (trade names of products manufactured by Kuraray Co.).

The coating amount of the polyvinyl alcohol (per 1 m$^2$ of support) for the protective layer (per one layer) is, preferably, 0.3 g/m$^2$ or more and 4.0 g/m$^2$ or less and, more preferably, 0.3 g/m$^2$ or more and 2.0 g/m$^2$ or less.

The coating amount (per 1 m$^2$ of support) of the entire binder (including water soluble polymer and latex polymer) in the surface protective layer (per one layer) is, preferably, 0.3 g/m$^2$ or more and 5.0 g/m$^2$ or less and, more preferably, 0.3 g/m$^2$ or more and 2.0 g/m$^2$ or less.

2) Matting Agent

In the invention, a matting agent is preferably added to the surface protective layer and the back layer for the improvement of the transportability. The matting agent is described in JP-A No. 11-65021, column Nos. 0126 to 0127.

The coating amount of the matting agent per 1 m$^2$ of the photosensitive material is, preferably, 1 mg/m$^2$ or more and 400 mg/m$^2$ or less and, more preferably, 5 mg/m$^2$ or more and 300 mg/m$^2$ or less.

The matting degree on the surface of the image-forming layer may be at any level so long as it is free of so-called star dust failure in which small blanking is formed in the image area to cause leakage of light. It is preferable that the Beck smoothness is 30 sec or more and 2000 sec or less and, particularly preferably, 40 sec or more and 1500 sec or less. The beck smoothness can be determined easily according to Japanese Industry Standards (JIS) P8119 "Smoothness test method for paper and paper board by a Beck tester" and according to TAPPI standard method T479.

The matting degree of the back layer in the invention is such that the Beck smoothness is preferably 1200 sec or less and 10 sec or more, more preferably 800 sec or less and 20 sec or more, and further preferably 500 sec or less and 40 sec or more.

In the invention, the matting agent is contained preferably in the outermost surface layer or a layer that functions as the outermost surface layer, or a layer near the outer surface of the photosensitive material, or it is preferably contained in the layer that functions as a so-called protective layer.

3) Polymer Latex

A polymer latex can be added to the surface protective layer or the back layer in the invention.

The polymer latex is also described in "Synthetic Resin Emulsion (edited by Taira Okuda, Hiroshi Inagaki, published from Kobunshi Publishing Society (1978))", "Application of Synthetic Latex (edited by Takaaki Sugimura, Yasuo Kataoka, Soichi Suzuki and Keiji Kasahara, published from Kobunshi Publishing Society (1993))", "Chemistry of Synthetic Latex (written by Soichi Muroi, Published from Kobunshi Publishing Society (1970))", etc., and can include, specifically, a latex of methyl methacrylate (33.5 mass %)/ethyl acrylate (50 mass %)/methacrylic acid (16.5 mass %) copolymer, a latex of methyl methacrylate (47.5 mass %)/butadiene (47.5 mass %)/itaconic acid (5 mass %) copolymer, a latex of ethyl acrylate/methacrylic acid copolymer, a latex of methyl methacrylate (58.9 mass %)/2-ethylhexyl acrylate (25.4 mass %)/styrene (8.6 mass %)/2-hydroxyethyl methacrylate (5.1 mass %)/acrylic acid (2.0 mass %) copolymer, and a latex of methyl methacrylate (64.0 mass %)/styrene (9.0 mass %)/butyl acrylate (20.0 mass %)/2-hydroxyethyl methacrylate (5.0 mass %)/acrylic acid (2.0 mass %) copolymer.

The polymer latex is used in an amount, preferably, of 10 mass % or more and 90 mass % or less and, particularly preferably, 20 mass % or more and 80 mass % or less based on the entire binder (including water soluble polymer and latex polymer) in the surface protective layer or the back layer.

4) Film Surface pH

In the photothermographic material of the invention, the pH at the film surface before the heat development is, preferably, 7.0 or less and, more preferably, 6.6 or less. While there is no particular restriction for the lower limit, it is about 3. A most preferred pH range is within a range from 4 to 6.2.

For controlling the film surface pH, it is preferred to use a non-volatile acid such as an organic acid, for example, a phthalic acid derivative or sulfuric acid, and a volatile base such as ammonia, with a view point of lowering the film surface pH. Particularly, since ammonia is highly volatile and can be removed before the coating step or heat development, it is preferred for attaining the low film surface pH.

Further, it is also preferred to use a non-volatile base such as sodium hydroxide, potassium hydroxide or lithium hydroxide in combination with ammonia. The measuring method for the film surface pH is described in the specification of JP-A No. 2000-284399, in column No. 0123.

5) Film Hardener

A film hardener may be used in each of the layers such as the image-forming layer, the protective layer and the back layer.

Examples of the film hardener can include various methods described in "THE THEORY OF THE PHOTOGRAPHIC PROCESS FOURTH EDITION", written by T. H. James (Published from Macmillan Publishing Co., Inc. in 1977), in pages 77 to 87, and they can include chrome alum, sodium salt of 2,4-dichloro-6-hydroxy-s-triazine, N,N-ethylenebis (vinylsulfone acetoamide), N,N-propylenebis(vinylsulfone acetoamide), as well as polyvalent metal ions described in page 78 of the literature, polyisocyanates described, for example, in U.S. Pat. No. 4,281,060 and JP-A No. 6-208193, epoxy compounds described, for example, in U.S. Pat. No. 4,791,042, and vinylsulfonic compounds described, for example, in JP-A No. 62-89048.

The film hardener is added as a solution and the addition timing of the solution into the protective layer coating solution is from 180 min before to just before the coating and, preferably, from 60 min to 10 sec before the coating. The coating method and the coating condition have no particular restrictions so long as the effect of the invention can be attained sufficiently.

The specific mixing method can include a method of mixing in a tank adapted such that the average staying time calculated based on the addition flow rate and the liquid delivery amount to the coater is controlled to a desired time, or a method of using a static mixer as described in "Liquid Mixing Technology", written by N. Harnby, M. F. Edwards, A. W. Nienow, and translated by Koji Takahashi (published from Nikkan Kogyo Shinbun-sha in 1989), in Chapter 8.

6) Surfactant

The surfactant applicable in the invention is described in JP-A No. 11-65021, in column No. 0132.

In the invention, a fluoro surfactant is used preferably. Specific examples of the fluoro surfactant can include compounds described in JP-A Nos. 10-197985, 2000-19680 and 2000-214554. Further, a polymeric fluoro surfactant described in JP-A No. 9-281636 is also used preferably. In the invention, it is preferred to use the fluoro surfactant described in JP-A No. 2002-82411 (and US 2002/042034, the disclosure of which is incorporated by reference herein).

7) Anti-Static Agent

In the invention, it is preferred to provide an anti-static layer containing various known metal oxides or conductive polymers. The anti-static layer may be disposed also as the undercoat layer and the back layer surface protective layer, or it may be disposed separately. For the anti-static layer, techniques described in JP-A No. 11-65021, in column Nos. 0135, JP-A Nos. 56-143430, 56-143431, 58-62646, 56-120519 and 11-84573, in column Nos. 0040 to 0051, U.S. Pat. No. 5,575,957, and JP-A No. 11-223898, in column Nos. 0078 to 0084 can be applied.

8) Support

For the transparent support, polyester, particularly, polyethylene terephthalate applied with a heat treatment in a temperature range from 130 to 185° C. is used preferably for moderating internal strains remaining in the film upon biaxial stretching and eliminating heat shrinkage strains caused during heat development.

As the support for the photothermographic material used in combination with the UV-light-emitting screen, PEN can be used preferably, with no particular restriction thereto. As PEN, polyethylene-2,6-naphthalate is preferred. Polyethylene-2,6-naphthalate referred to in the invention—may have any constitution so long as the repetitive structural units thereof substantially comprise ethylene-2,6-naphthalene dicarboxylate units, and can include not copolymerized polyethylene-2,6-naphthalene dicarboxylate, as well as copolymers in which 10% or less, preferably, 5% or less for the number of the repetitive structural units are modified with other ingredients, and mixtures or compositions thereof with other polymers.

Polyethylene-2,6-naphthalate is synthesized by bonding naphthalene-2,6-dicarboxylic acid or a functional derivative thereof and ethylene glycol or a functional derivative thereof in the presence of a catalyst under appropriate reaction conditions. The polyethylene-2,6-naphthalate referred to in the invention may be a copolymer or a mixed polyester formed by adding one or more appropriate third ingredient (modirying agent) before completion of the polymerization of the polyethylene-2,6-naphthalate. The appropriate third ingredient can include compounds having bivalent ester forming functional group, for example, dicarboxylic acid such as oxalic acid, adipic acid, phthalic acid, isophthalic acid, terephthalic acid, nathalene-2,7-dicarboxylic acid, succinic acid, or diphenyl ether dicarboxylic acid, or lower alkyl ester thereof, oxy carboxylic acid such as p-oxybenzoic acid or p-oxyethoxy benzoic acid, or a lower alkyl ester thereof, or dihydric alcohols such as propylene glycol or trimethylene glycol. The polyethylene-2,6-naphthalate or the modified polymer thereof may be blocked at the terminal hydroxyl group and/or carboxyl group by a mono-functional compound such as benzoic acid, benzoyl benzoic acid, benzyloxy benzoic acid, or methoxy polyalkylene glycol, or may be modified with a tri-functional or tetra-functional ester forming compound such as glycerine or pentaerythritol in an extremely small amount within a range capable of obtaining a substantially linear copolymer.

In the case of a photothermographic material for medical use, the transparent support may be colored by a blue dye (for example, dye-1 described in the example of JP-A No. 8-240877) or it may be not be colored.

Examples of the specific support are described in JP-A No. 11-65021, column No. 0134.

The undercoating techniques with water soluble polyester described in JP-A No. 11-84574, styrene-butadiene copolymer described in JP-A No. 10-186565, and vinylidene chloride copolymer described in JP-A Nos. 2000-39684 and 2001-083679, column Nos. 0063 to 0080 (and U.S. Pat. No. 6,342,689, the disclosure of which is incorporated by reference herein) are applied preferably for the support.

9) Other Additives

For the photothermographic material, antioxidant, stabilizer, plasticizer, UV-ray absorbent or coating aid may further be added. Solvents described in JP-A No. 11-65021, in column No. 0133 may also be added. Each of the additives is added either to the image-forming layer or to the non-photosensitive layer. Reference can be made to WO98/36322, EP-A 803764A1, JP-A Nos. 10-186567 and 10-18568, etc.

10) Coating Method

The photothermographic material in the invention may be coated by any method. Specifically, various coating operations including extrusion coating, slide coating, curtain coating, dip coating, knife coating, flow coating or extrusion coating using a hopper of the type as described in U.S. Pat. No. 2,681,294 are used. Extrusion coating or slide coating described in "LIQUID FILM COATING" written by Stephen F. Kistler, Petert M. Schweizer (published from Chapman and Hall Co. in 1997), pages 399 to 536 is used preferably and the slide coating is used particularly preferably.

An example for the shape of the slide coater used for slide coating is shown in FIG. 11b.1 on page 427 of the literature. Further, two or more layers can be coated simultaneously by the method described in pages 399 to 536 of the literature and the method described in U.S. Pat. No. 2,761,791 and GB No. 837,095.

The image-forming layer coating solution in the invention is preferably a so-called thixotropic fluid. For the technique, JP-A No. 11-52509 can be referred to.

The viscosity of the image-forming layer coating solution in the invention is, preferably, 400 mPa·s or more and 100,000 mPa·s or less, more preferably, 500 mPa·s or more and 20,000 mPa·s or less at a shearing speed of $0.1\ S^{-1}$.

It is, preferably, 1 mPa·s or more and 200 mPa·s or less and, more preferably, 5 mPa·s or more and 80 mPa·s or less at a shearing speed of $1000\ S^{-1}$.

13) Packaging Material

The photothermographic material of the invention is preferably seal-packaged by a packaging material with a low oxygen permeation rate and/or low moisture permeation rate in order to prevent fluctuation of photographic performance during unprocessed storage, or in order to prevent curling or crimping nature in the state of rolled products. The oxygen permeation rate at 25° C. is, preferably, 50 ml/atm·m²·day or less and, more preferably, 10 ml/atm·m²·day or less and, further preferably, 1.0 ml/atm·m²·day or less. The moisture permeability is, preferably, 10 g/atm·m²·day or less, more preferably, 5 g/atm·m²·day or less and, further preferably, 1 g/atm·m²·day or less. As specific examples of the packaging material with low oxygen permeability and/or moisture permeability, those materials described, for example, in the JP-A Nos. 8-254793 and 2000-206653 can be utilized.

Other Utilizable Technique

The techniques that can be used for the photothermographic material of the invention can include those described in, EP Nos. 803764A1 and 883022A1, WO98/36322, JP-A Nos. 56-62648, 58-62644, 09-43766, 09-281637, 09-297367, 09-304869, 09-311405, 09-329865, 10-10669, 10-62899, 10-69023, 10-186568, 10-90823, 10-171063, 10-186565, 10-186567, 10-186569 to 10-186572, 10-197974, 10-197982, 10-197983, 10-197985 to 10-197987, 10-207001, 10-207004, 10-221807, 10-282601, 10-288823, 10-288824, 10-307365, 10-312038, 10-339934, 11-7100, 11-15105, 11-24200, 11-24201, 11-30832, 11-84574, 11-65021, 11-109547, 11-125880, 11-129629, 11-133536 to 11-133539, 11-133542, 11-133543, 11-223898, 11-352627, 11-305377, 11-305378, 11-305384, 11-305380, 11-316435, 11-327076, 11-338096, 11-338098, 11-338099, 11-343420, 2000-187298, 2000-10229, 2000-47345, 2000-206642, 2000-98530, 2000-98531, 2000-112059, 2000-112060, 2000-112104, 2000-112064, and 2000-171936.

3. Image Forming Method

The photothermographic material of the invention can be used preferably to an image forming method of recording X-ray images by using an X-ray intensifying screen.

The photothermographic material of the invention may be a "single-sided" type having an image-forming layer only on one surface of a support, or a both-sided type having image-forming layers on both surfaces.

(Both-Sided Photothermographic Material)

In the present invention, it is preferable to form an image by combining the double-sided photothermographic material having a photosensitive layer on both sides of a support with two intensifying screens. Such a combination particularly makes it possible to form a preferable image having excellent sensitivity and sharpness.

It is preferable for the both-sided photothermographic material of the invention to have a crossover cut layer. It is possible to obtain a crossover cut layer by using techniques described in JP-A No. 8-76307. As preferable dyes that are usable for the crossover cut layer of the invention, reference can be made to compounds described in JP-A No. 2003-215751, page 3, right column, line 10 to page 21, right column, line 26. In addition, the dyes described in JP-A No. 2001-144030 can be preferably used.

The steps of forming images by using the photothermographic material comprise the following steps:

(a) a step of obtaining an image-forming assembly by disposing the photothermographic material between a pair of X-ray intensifying screens, (b) a step of disposing an object to be inspected between the assembly and the X-ray source, (c) a step of irradiating X-rays at an energy level in a range from 25 kVp to 125 kVp to the object to be inspected, (d) a step of taking out the photothermographic material from the assembly, (e) a step of heating the taken out photothermographic material at a temperature within a range from 90° C. to 180° C.

The photothermographic material used for the assembly in the invention is preferably prepared such that images obtained by stepwise exposure by X-rays and heat development have a characteristic curve on an orthogonal coordinate having equal unit length of the coordinate axis for the optical density (D) and the exposure amount (log E), in which an average gamma ($\gamma$) formed at the point for minimum density (Dmin)+density 0.1 and at the point for the minimum density (Dmin)+density 0.5 is from 0.5 to 0.9, and an average gamma ($\gamma$) formed at the point for the minimum density (Dmin)+density 1.2 and at the point for the minimum density (Dmin)+density 1.6 is 3.2 to 4.0. In a case of using a photothermographic material having the characteristic curve described above in the X-ray photographic system of the invention, X-ray images of excellent photographic characteristics in which the skirt portions extend extremely and gamma is high in a medium concentration area. Such photographic characteristics can provide advantageous effects of enhancing the drawability for the low density area with less X-ray transmission amount such as mediastinal region or cardiac shadow region, providing a density easy to see also for pulmonary region with high X-ray transmission amount, and improving the contrast.

The photothermographic material having the preferred characteristic curve described above can be prepared easily by a method, for example, of constituting image-forming layers on both surfaces, respectively, from two or more silver halide emulsion layers having sensitivity different from each other. Particularly, it is preferred to form the image-forming layers by using an emulsion at high sensitivity for the upper layer and an emulsion having a hard photographic characteristic at low sensitivity for the lower layer. In a case of using the image-forming layers comprising two layers described above, the difference of the sensitivity of the silver halide emulsions between each of the layers is 1.5 times or more or 20 times or less and, preferably, twice or more and 15 times or less. Further, the ratio for the amount of the emulsions used for the formation of the respective layers differs depending on the difference of the sensitivity and the covering power of the emulsions to be used. Generally, the ratio of the emulsion on the side of the higher sensitivity is decreased as the difference of the sensitivity is larger. For example, a preferred ratio of using each of the emulsions, in a case where the difference of the sensitivity is twice, is controlled to a value within a range of 1:20 or more and 1:50 or less as the high sensitivity emulsion to low sensitivity emulsion being converted as the amount of silver when the covering power is substantially equal.

For the technique of the crossover cut (both-sided photosensitive material) and the anti-halation (single-sided photosensitive material), dye or dye and mordant described in JP-A No. 2-68539, page 13, lower left column, line 1 to page 14, lower left column, line 9 can be used.

(Single-Sided Photothermographic Material)

The single sided photothermographic material used in the invention is particularly preferable for use in mammographic X-ray photosensitive material.

For the single-sided photothermographic material used for this purpose, it is important to design such that the contrast of the obtained images is in an appropriate range.

It is preferable to provide an anti-halation layer for the single-sided photothermographic material used in the present invention. With respect to the anti-halation layer, reference can be made to JP-A No. 2003-215751, page 3, right column, line 10 to page 21, right column, line 26.

For the preferable constituents for the mammographic X-ray photosensitive materials, reference can be made to the descriptions in JP-A Nos. 5-45807, 10-62881, 10-54900, and 11-109564.

(Heat Development)

The photothermographic material of the invention may be developed by any method and, usually, a photothermographic material exposed imagewise is developed by temperature elevation. A preferred developing temperature is from 80° C. to 250° C. and, more preferably, 100° C. to 140° C. The developing time is, preferably, from 1 to 60 sec, more preferably, 5 to 30 sec, and, particularly preferably, 5 to 20 sec.

As the thermal developing system, a plate type heater method is preferred. The heat development system by the plate heater method is preferably a method described in JP-A No. 11-133572 which uses a heat development apparatus for obtaining visible images by bringing a photothermographic material formed with latent images into contact with a heating device in a heat development station. The heating device comprises a plate heater, a plurality of retainer rollers are opposed along one surface of the plate heater and the photothermographic material is passed between the retainer rollers and the plate heater to conduct heat development. It is preferable that the plate heater is divided into 2 to 6 stages and the temperature is lowered by about 1 to 10° C. for the top end.

Such a method is described also in JP-A No. 54-30032 and a moisture or organic solvent contained in the photothermographic material can be eliminated out of the system. Further, deformation of the shape of the support for the photothermographic material by rapid heating of the photothermographic material can also be suppressed.

(System)

A laser imager for medical use having an exposure station and a heat development station can include Fuji Medical Dry Imager FM-DPL. The system is described in Fuji Medical Review No. 8, page 39–55 and the techniques thereof can be utilized. Further, it is also applicable as the photothermographic material for the laser imager in "AD network" proposed by Fuji Film Medical Co. Ltd. as a network system adaptable to DICOM Standards.

3. Application Use of the Invention

The photothermographic material of the invention forms black and white images by silver images and is used preferably as photothermographic materials for use in medical diagnosis, photothermographic materials for use in industrial photography, photothermographic materials for use in printing, and photothermographic materials for use in COM.

EXAMPLES

The present invention will be specifically described by way of the following examples. However, the examples should not be construed to limit the scope of the invention.

Example 1

1. Preparation of Photothermographic Material

1—1. Preparation of PET Support and Undercoat (1) Film Preparation

Using terephthalic acid and ethylene glycol, PET having an intrinsic viscosity: IV=0.66 dl/g (measured in phenol/tetrachloroethane=6/4 (weight ratio) at 25° C.) was obtained in accordance with an ordinary method. After pelleting the same, it was dried at 130° C. for 4 hours. It was colored blue by a blue dye (1,4-bis(2,6-diethylanilinoanthraquinone), extruded from a T-die and quenched to prepare a not-stretched film.

It was stretched longitudinal by 3.3 times using rolls of different circumferential speeds and then stretched laterally by 4.5 times using a tenter. The temperature in this process was 110° C. and 130° C., respectively. Then, after heat setting at 240° C. for 20 sec, it was relaxed by 4% in the lateral direction. Then, after slitting the chuck portion of the tenter, both ends were applied with knurling, and taken up at 4 kg/cm$^2$ to obtain a roll of 175 μm thickness.

(2) Corona Discharging Treatment

Both surfaces of the support were treated by using a solid state corona discharge treating machine model 6 KVA manufactured by PILLAR Co., at 20 m/min under a room temperature. Based on the read values for current and voltage, it was found that treatment at 0.375 kV·A·min/m$^2$ was applied to the support. In this process, the treating frequency was 9.6 kHz and a gap clearance between the electrode and the dielectric roll was 1.6 mm.

(3) Undercoat

| Preparation of undercoat layer coating solution | |
|---|---|
| PESRESIN A-520 (30 mass % solution) manufactured by Takamatsu Yushi. Co. | 46.8 g |
| BAIRONAL MD-1200 manufactured by Toyo Boseki | 10.4 g |
| Polyethylene glycol monononylphenyl ether (average ethylene oxide number = 8.5) 1 mass % solution | 11.0 g |
| MP-1000 (fine PMMA polymer particles, average particle size 0.4 μm) manufactured by Soken Chemical Co. | 0.91 g |
| Distilled water | 931 ml |

Undercoat

After applying the corona discharging treatment described above to both surfaces of the biaxially stretched polyethylene terephthalate support of 175 μm thickness, the undercoating solution described above was coated by a wire bar in a wet coating amount of 6.6 ml/m² (per one surface), and then dried at 180° C. for 5 min. The coating was applied to both surfaces to prepare an undercoated support.

1-2. Preparation of Coating Material (1) Silver Halide Emulsion

Preparation of Silver Halide Emulsion A

A solution A was prepared by forming a solution by adding 4.3 ml of 1 mass % potassium iodide solution to 1421 ml of distilled water and further adding 3.5 ml of sulfuric acid at 0.5 mol/L concentration, 36.5 g of gelatin phthalide and 160 ml of a 5 mass % methanol solution of 2,2-(ethylenedithio) diethanol, keeping the liquid temperature at 75° C. in a stainless steel reaction pot while stirring and adding distilled water to 22.22 g of silver nitrate to dilute to 218 ml and a solution B was formed by diluting 36.6 g of potassium iodide with distilled water to 366 ml volume. The solution A was added entirely at a constant flow rate for 16 min, and the solution B was added by a controlled double jet method while keeping pAg to 10.2. Then, 10 ml of an aqueous 3.5 mass % solution of hydrogen peroxide was added and, further, 10.8 ml of an aqueous 10 mass % solution of benzoimidazole was added. Further, a solution C formed by adding distilled water to 51.86 g of silver nitrate to dilute to 508.2 ml and a solution D formed by adding distilled water to 63.9 g of potassium iodide to dilute to 639 ml were added such that the solution C was added an entire amount at a constant flow rate for 80 min while the solution D was added by a controlled double jet method while keeping pAg at 10.2. Potassium hexachloro iridate (III) was added by the entire amount so as to be $1 \times 10^{-4}$ mol per one mol of silver 10 min after the start of addition of the solution C and the solution D. Further, an aqueous solution of potassium hexacyano ferrate (II) was added by $3 \times 10^{-4}$ mol per one mol of silver by the entire amount 5 sec after the completion of addition of the solution C. pH was adjusted to 3.8 using sulfuric acid at 0.5 mol/L concentration, stirring was stopped and settling/desalting/water washing step was conducted. pH was adjusted to 5.9 using sodium hydroxide at 1 mol/L concentration to prepare a silver halide dispersion at pAg of 11.0.

The silver halide emulsion A is a pure silver iodide emulsion, comprising 80% or more for the entire projection area of plate-like particles with an average projection area diameter of 0.93 μm, the fluctuation coefficient of the average projection area diameter of 17.7%, the average thickness of 0.057 μm and the average aspect ratio of 16.3. The sphere equivalent diameter was 0.42 μm. As a result of analysis by the X-ray powder diffraction analysis, 90% or more of silver iodide was present as the γ-phase.

Preparation of Silver Halide Emulsion B

One mol of AgI emulsion of the plate-like particles prepared in the silver halide emulsion A was put in a reaction vessel. pAg was 10.2 as measured at 38° C. Then, 0.5 mol/L of a KBr solution and 0.5 mol/L of an AgNO₃ solution were added at 10 ml/min for 10 min by a double jet addition and substantially 5 mol % of silver bromide was precipitated epitaxially on the AgI host emulsion. pAg was kept at 10.2 during operation.

Further, pH was adjusted to 3.8 using sulfuric acid at 0.5 mol/L concentration, stirring was stopped and precipitation/desalting/washing step was conducted. pH was adjusted to 5.9 using sodium hydroxide at 1 mol/L concentration and silver halide dispersion at pAg of 11.0 was prepared.

The silver halide dispersion was kept at 38° C. while stirring, 5 ml of a 0.34 mass % methanol solution of 1,2-benzoisothiazoline-3-one was added and, 40 min after, temperature was elevated to 60° C. 20 min after the temperature elevation, sodium benzenethiosulfonate in a methanol solution was added by $7.6 \times 10^{-5}$ mol per one mol of silver and, further 5 min after, a methanol solution of a tellurium sensitizer C was added by $2.0 \times 10^{-5}$ mol per one mol of silver and aged for 91 min. Then, 1.3 ml of 0.8 mass % methanol solution of N,N'-dihydroxy-N'',N'''-diethylmelamine was added. Further 4 min after, 5-methyl-2-mercaptobenzoimidazole as a methanol solution was added by $4.8 \times 10^{-3}$ mol per one mol of silver and 1-phenyl-2-heptyl-5-mercapto-1,3,4-triazole as a methanol solution was added by $5.4 \times 10^{-3}$ mol per one mol of silver and 1-(3-methylureido phenyl)-5-mercapto-tetrazole as an aqueous solution was added by $8.5 \times 10^{-3}$ mol per one mol of silver to prepare silver halide emulsion B.

Preparation of Silver Halide Emulsion C

In the same manner as in the silver halide emulsion A, a silver halide emulsion C was prepared while properly changing the addition amount of a 5 mass % methanol solution of 2,2'-(ethylenedithio)diethanol, the temperature upon formation of the particles and the addition time of the solution A. The silver halide emulsion C was pure silver iodide emulsion comprising 80% or more for the entire projection area of the plate-like particles having the average projection area diameter of 1.369 μm, the fluctuation coefficient of the average projection area diameter of 19.7%, the average thickness of 0.130 μm and the average aspect ratio of 11.1. The sphere equivalent diameter was 0.71 μm. As a result of X-ray powder diffraction analysis, 90% or more of silver iodide was present as a γ-phase.

Preparation of Silver Halide Emulsion D

A silver halide emulsion D containing 5 mol % of epitaxially formed silver bromide was prepared quite in the same manner as in the silver halide emulsion B except for using the silver halide emulsion C. Preparation of mixed emulsion for coating solution The silver halide emulsion B and the silver halide emulsion D were dissolved in an amount of 3:2 as the silver molar ratio, and benzothiazolium iodide as 1 mass % aqueous solution was added by $7 \times 10^{-3}$ mol per one mol of silver. Further, Compound 1, Compound 2 and Compound 3 in which one-electron oxidant formed by one-electron oxidation can release one or more electrons were added each by $2 \times 10^{-3}$ mol per one mol of silver of the silver halide.

Further, the Compound 1 having an absorptive group and a reducing group and Compound 2 having an adsorptive group and a reducing group were added each by $8 \times 10^{-3}$ mol per one mol of silver halide.

Further, water was added such that the content of the silver halide per 1 liter of the mixed emulsion for coating solution was 15.6 g as silver.

(2) Preparation of the Silver Fatty Acid Salt Dispersion

Preparation of Recrystallized Behenic Acid 100 kg of behenic acid manufactured by Henkel Co. (trade name of product; Edenor C 22-85R) was mixed in 1200 kg of isopropyl alcohol, dissolved at 50° C., filtered through a 10 µm filter, and then cooled to 30° C. to conduct recrystallization. The cooling rate upon recrystallization was controlled to 3° C./hr. The resultant crystals were centrifugally filtered, scrubbed with 100 kg of isopropyl alcohol and then dried. When the obtained crystals were esterified and measured by GC-FID, behenic content was 96%, and, in addition, 2% of lignoceric acid, 2% of archidic acid and 0.001% of erucic acid were contained.

Preparation of Silver Fatty Acid Salt Dispersion 88 kg of recrystallized behenic acid, 422 L of distilled water, 49.2 L of an aqueous NaOH solution at 5 mol/L concentration, and 120 L of t-butyl alcohol were mixed and reacted under stirring at 75° C. for one hour to obtain a sodium behenate solution B. Separately, 206.2 L of an aqueous solution of 40.4 kg of silver nitrate (pH 4.0) was provided and kept at a temperature of 10° C. A reaction vessel containing 635 L of distilled water and 30 L of t-butyl alcohol was kept at a temperature of 30° C., and the entire amount of the sodium behenate solution and the entire amount of the aqueous solution of silver nitrate were added under sufficient stirring each at a constant flow rate for 93 min and 15 sec and 90 min, respectively.

In this case, only the aqueous solution of silver nitrate was added for 11 min after starting the addition of the aqueous solution of silver nitrate, addition of sodium behenate solution was started subsequently, and only the sodium behenate solution was added for 14 min and 15 sec after the end of the addition of the aqueous solution of silver nitrate. In this case, the temperature inside the reaction vessel was kept at 30° C. and the external temperature was controlled such that the liquid temperature was constant. Further, pipelines for the addition system of the sodium behenate solution were kept warm by circulating warm water to the outside of a double walled pipe and controlled such that the liquid temperature at the exit of the addition nozzle top was 75° C. Further, the temperature of the pipelines for the addition system of the aqueous solution of silver nitrate was kept warm by circulating cold water to the outside of the double-walled pipe. The addition position for the sodium behenate solution and the addition position for the aqueous solution of silver nitrate were arranged symmetrically with respect to the stirring axis as a center and adjusted to such a height as not in contact with the reaction solution.

After the completion for the addition of the sodium behenate solution, it was stirred and left for 20 min at the temperature as it was and then the temperature was elevated to 35° C. for 30 min and then aging was conducted for 210 min. Just after the completion of the aging, solid contents were separated by centrifugal filtration and the solids were water-washed such that the conductivity of the filtered water was 30 µS/cm. Thus, the silver fatty acid salt was obtained. The obtained solids were stored as wet cakes without drying.

When the form of the obtained silver behenate particles was evaluated by electron microscopic photography, they were crystals with a=0.21 µm, b=0.4 µm, c=0.4 µm in an average value, an average aspect ratio of 2.1, and a fluctuation coefficient of an average sphere equivalent diameter of 11% (a, b, c as defined in the specification).

19.3 kg of polyvinyl alcohol (trade name of products: PVA-217) and water were added to wet cakes corresponding to 260 kg of dry solids to make up the entire amount to 1,000 kg, which were then slurrified by dissolver blades and, further, preliminarily dispersed by a pipeline mixer (Model PM-10 manufactured by Mizuho Industry Co.).

Then, the stock solution after the preliminary dispersion was treated for three times while controlling the pressure of a dispersing machine (trade name; Micro Fluidizer M-610, manufactured by MicroFluidex International Corp., using Z-type interaction chamber) to 1150 kg/cm$^2$, to obtain a silver behenate dispersion. For the cooling operation, bellows type heat exchangers were mounted before and after the interaction chamber, respectively, and the dispersion temperature was set at 18° C. by controlling the temperature of coolants.

(3) Preparation of Reducing Agent Dispersion

Preparation of Reducing Agent-1 Dispersion 10 kg of water was added to 10 kg of a reducing agent-1 (2,2'-methylenebis-(4-ethyl-6-tert-butylphenol) and 16 kg of an aqueous 10 mass % solution of a modified polyvinyl alcohol (Poval MP203, manufactured by Kuraray Co.) and mixed thoroughly to prepare a slurry. The slurry was fed by a diaphragm pump and, after dispersion by a horizontal type sand mill filled with zirconia beads with an average diameter of 0.5 mm (UVM-2: manufactured by IMEX Co.) for 3 hours, 0.2 g of a sodium salt of benzoisothiazolinone and water were added to prepare such that the concentration of the reducing agent was 25 mass %. The liquid dispersion was heat-treated at 60° C. for 5 hours, to obtain a reducing agent-1 dispersion. The thus obtained reducing agent particles contained in the reducing agent dispersion had a median diameter of 0.40 µm and a maximum particle diameter of 1.4 µm or less. The obtained reducing agent dispersion was filtered through a polypropylene filter having a pore size of 3.0 µm to remove obstacles such as dusts and stored.

Preparation of Reducing Agent-2 Dispersion 10 kg of water was added to 10 kg of a reducing agent-2 (6,6'-di-t-butyl-4,4'-dimethyl-2,2'-butylidene diphenol) and 16 kg of an aqueous 10 mass % solution of modified polyvinyl alcohol (Poval MP203, manufactured by Kuraray Co.) and mixed thoroughly to form a slurry. The slurry was fed by a diaphragm pump, dispersed for 3 hrs and 30 min by a horizontal sand mil (UVM-2; manufactured by Imex Co.) filled with zirconia beads of an average diameter of 0.5 mm, then 0.2 g of a sodium salt of benzoisothiazolinone and water were added to control such that the concentration of the reducing agent was 25 mass %. The liquid dispersion was heated at 40° C. for one hour and successively heat-treated at 80° C. for one hour to obtain a reducing agent-2 dispersion. The reducing agent particles contained in the thus obtained reducing agent dispersion had a median diameter of 0.50 µm and a maximum grain size of 1.6 µm or less. The thus obtained reducing agent dispersion was filtered through a polypropylene filter of 3.0 µm pore size to remove obstacles such as dusts and then stored.

(4) Preparation of Hydrogen Bonding Compound Dispersion

Preparation of Hydrogen Bonding Compound-1 Dispersion 10 kg of water was added to 10 kg of a hydrogen bonding compound-1 (tri(4-t-butylphenyl)phosphine oxide) and 16 kg of an aqueous 10 mass % solution of a modified polyvinyl alcohol (Poval MP203, manufactured by Kuraray Co.) and mixed thoroughly to prepare a slurry. The slurry was fed by a diaphragm pump and, after dispersion by a horizontal type sand mill filled with zirconia beads with an average diameter of 0.5 mm (UVM-2: manufactured by IMEX Co.) for 4 hours, 0.2 g of a sodium salt of benzoisothiazolinone and water were added to prepare such that the concentration of the hydrogen bonding compound was 25 mass %. The liquid dispersion was heated at 40° C. for one hour and then successively heated at 80° C. for one hour, to obtain a hydrogen bonding compound-1 dispersion. The hydrogen bonding compound particles contained in the thus obtained hydrogen bonding compound dispersion had a median diameter of 0.45 μm and a maximum particle diameter of 1.3 μm or less. The obtained hydrogen bonding compound dispersion was filtered through a polypropylene filter having a pore size of 3.0 μm to remove obstacles such as dusts and stored.

(5) Preparation of Development Accelerator Dispersion and Color-Tone-Adjusting Agent Dispersant Preparation of Development Accelerator-1 Dispersion 10 kg of water was added to 10 kg of a development accelerator-1 and 20 kg of an aqueous 10 mass % solution of a modified polyvinyl alcohol (Poval MP203, manufactured by Kuraray Co.) and mixed thoroughly to prepare a slurry. The slurry was fed by a diaphragm pump and, after dispersion by a horizontal type sand mill filled with zirconia beads with an average diameter of 0.5 mm (UVM-2: manufactured by IMEX Co.) for 3 hours and 30 min, 0.2 g of a sodium salt of benzoisothiazolinone and water were added to prepare such that the concentration of the development accelerator was 20 mass %, to obtain a development accelerator-1 dispersion. The development accelerator particles contained in the thus obtained development accelerator dispersion had a median size of 0.48 μm and a maximum particle size of 1.4 μm or less. The obtained development accelerator dispersion was filtered through a polypropylene filter having a pore size of 3.0 μm to remove obstacles such as dusts and stored. Solid dispersion of development accelerator-2 and color-tone-adjusting agent-1.

Solid dispersions of the development accelerator-2 and the color-tone-adjusting agent-1 were also dispersed by the same method as in the development accelerator-1, to obtain 20 mass % and 15 mass % liquid dispersions, respectively.

(6) Preparation of Polyhalogen Compound Dispersion

Preparation of Organic Polyhalogen Compound-1 Dispersion 10 kg of an organic polyhalogen compound-1 (tribromo methanesulfonyl benzene), 10 kg of an aqueous 20 mass % solution of modified polyvinyl alcohol (Poval MP203, manufactured by Kuraray Co.), 0.4 kg of an aqueous 20 mass % solution of sodium triisopropyl naphthalene sulfonate and 14 kg of water were added and mixed thoroughly to form a slurry. The slurry was fed by a diaphragm pump and dispersed in a horizontal type sand mill filled with zirconia beads of an average diameter of 0.5 mm (UVM-2: manufactured by IMEX Co.) for 5 hours and then 0.2 g of a sodium salt of benzoisothiazolinone and water were added to prepare such that the concentration of the organic polyhalogen compound was 30 mass %, to obtain an organic polyhalogen compound-1 dispersion. The organic polyhalogen compound particles contained in the thus obtained organic polyhalogen compound dispersion had a median diameter of 0.41 μm and a maximum particle size of 2.0 μm or less. The obtained organic polyhalogen compound dispersion was filtered through a polypropylene filter having a pore size of 10.0 μm to remove obstacles such as dusts and stored.

Preparation of Organic Polyhalogen Compound-2 Dispersion 10 kg of an organic polyhalogen compound-2 (N-butyl-3-tribromo methane sulfonyl benzoamide), 20 kg of an aqueous 10 mass % solution of modified polyvinyl alcohol (Poval MP203, manufactured by Kuraray Co.) and 0.4 kg of an aqueous 20 mass % solution of a sodium triisopropyl naphthalene sulfonate were added and mixed thoroughly to form a slurry. The slurry was fed by a diaphragm pump and dispersed in a horizontal type sand mill filled with zirconia beads of an average diameter of 0.5 mm (UVM-2: manufactured by IMEX Co.) for 5 hours and then 0.2 g of sodium salt of benzoisothiazolinone and water were added to prepare such that the concentration of the organic polyhalogen compound was 30 mass %. The liquid dispersion was heated at 40° C. for 5 hours to obtain an organic polyhalogen compound-2 dispersion. The organic polyhalogen compound particles contained in the thus obtained polyhalogen compound dispersion had a median diameter of 0.40 μm and a maximum particle size of 1.3 μm or less. The obtained organic polyhalogen compound dispersion was filtered through a polypropylene filter having a pore size of 3.0 μm to remove obstacles such as dusts and stored.

(7) Preparation of Silver Iodide Complex Forming Agent 8 kg of modified polyvinyl alcohol MP 203 was dissolved in 174.57 kg of water and then 3.15 kg of an aqueous 20 mass % solution of sodium triisopropyl naphthalene sulfonate and 14.28 kg of an aqueous 70 mass % solution of 6-isopropyl phthalazine were added to prepare a 5 mass % solution of a silver iodide complex forming agent compound.

(8) Preparation of Mercapto Compound

Aqueous Mercapto Compound-1 Solution 7 g of a mercapto compound-1 (1-(3-sulfophenyl)-5-mercaptotetrazole sodium salt) was dissolved in 993 g of water to form an aqueous 0.7 mass % solution.

Aqueous Mercapto Compound-2 Solution 20 g of a mercapto compound-2 (1-(3-methylureidophenyl)-5-mercaptotetrazole) was dissolved in 980 g of water to form an aqueous 2.0 mass % solution.

(9) Preparation of SBR Latex Liquid

SBR latex was prepared as described below.

287 g of distilled water, 7.73 g of a surfactant (Pionin A-43-S (manufactured by Takemoto Yushi Co.): solid content, 48.5 mass %), 14.06 ml of 1 mol/L NaOH, 0.15 g of tetrasodium ethylenediamine tetraacetate, 255 g of styrene, 11.25 g of acrylic acid and 3.0 g of tert-dodecylmercaptane were charged in a polymerization vessel of a gas monomer reaction device (model TAS-2J, manufactured by Taiatsu Glass Industry Co.), the reaction vessel was tightly closed and stirred at a stirring speed of 200 rpm. After evacuating by a vacuum pump and repeating nitrogen gas substitution for several times, 108.75 g of 1,3-butadiene was charged under pressure and the temperature was elevated to an internal temperature of 60° C. A solution containing 1.875 g of ammonium persulfate dissolved in 50 ml of water was added and stirred for 5 hours as it was. Further, stirring was conducted for three hours under temperature elevation to 90° C., and after lowering the internal temperature to a room temperature after the completion of the reaction, NaOH and $NH_4OH$ at 1 mol/L concentration were used and added such that $Na^+$ ion $NH_4^+$ ion=1:5.3 (molar ratio) to adjust pH to 8.4. Then, the filtration was conducted by a polypropylene filter with a pore size of 1.0 μm to remove obstacles such as dusts and stored to obtain 774.7 g of an SBR latex. When halogen ions were measured by ion chromatography, chloride concentration was 3 ppm. As a result of measuring the concentration of the chelating agent by high speed liquid chromatography, it was 145 ppm.

The latex had an average particle size of 90 nm, Tg=17° C., a solid concentration of 44 mass %, an equilibrium water content of 0.6 mass % at 25° C. and 60% RH, an ionic conductivity of 4.80 mS/cm (ionic conductivity was measured by using a conductivity meter CM-30S manufactured by To a Denpa Industry Co. for the stock latex solution (44 mass %) at 25° C.) and pH of 8.4.

1-3. Preparation of Coating Solution (1) Preparation of Image-Forming Layer Coating Solution-1

To 1,000 g of the fatty acid silver salt dispersion obtained as described above and 276 ml of water, were added organic polyhalogen compound-1 dispersion, organic polyhalogen compound-2 dispersion, SBR latex (Tg: 17° C.) solution, reducing agent-1 dispersion, reducing agent-2 dispersion, hydrogen bonding compound-1 dispersion, development accelerator-1 dispersion, development accelerator-2 dispersion, color-tone-adjusting agent-1 dispersion, aqueous mercapto compound-1 solution, and aqueous mercapto compound-2 solution, successively, and, after adding the silver iodide complex forming agent, the silver halide emulsion mixture for coating solution was added just before coating by 0.22 mol as the amount of silver per 1 mol of a silver salt of a fatty acid, thoroughly mixed and fed as it was to a coating die and coated.

The viscosity of the image-forming layer coating solution was 25 [mPa·s] at 40° C. when measured by a B-type viscometer of Tokyo Keiki (No. 1 rotor, 60 rpm).

The viscosity of the coating solution at 25° C. by using an RFS Field Spectrometer manufactured by Rheometeric Far East Co. was 242, 65, 48, 26, and 20 (mPa·s) at the shearing rate of 0.1, 1, 10, 100, and 1000 (1/sec), respectively.

The amount of zirconium in the coating solution was 0.52 mg per 1 g of silver.

(2) Preparation of Intermediate Layer Coating Solution 27 ml of an aqueous 5 mass % solution of aerosol OT (manufactured by American Cyanamid Co.) and 135 ml of an aqueous 20 mass % solution of diammonium phthalate were added to 1000 g of polyvinyl alcohol PVA-205 (manufactured by Kuraray Co.), and 4200 ml of a 19 mass % solution of methylmethacrylate/styrene/butyl acrylate/hydroxyethyl methacrylate/acrylic acid copolymer (copolymerization weight ratio 64/9/20/5/2) latex, and water was added to makeup the total amount to 10000 g, which was controlled to pH 7.5 with NaOH to form an intermediate layer coating solution, and fed to a coating die so as to be 9.1 ml/m².

The viscosity of the coating solution was 58 [mPa·s] when measured at 40° C. by a B-type viscometer (No. 1 rotor, 60 rpm).

(3) Preparation of a First Surface Protective Layer Coating Solution-1

To 64 g of inert gelatin dissolved in water, were added 112 g of a 19.0 mass % latex liquid of a methyl methacrylate/styrene/butyl acrylate/hydroxyethyl methacrylate/acrylic acid copolymer (copolymerization weight ratio 64/9/20/5/2), 30 ml of a 15 mass % methanol solution of phthalic acid, 23 ml of an aqueous 10 mass % solution of 4-methyl phthalic acid, 28 ml of sulfuric acid at 0.5 mol/L concentration, 5 ml of an aqueous 5 mass % solution of aerosol OT (manufactured by American Cyanamid Co.), 0.5 g of phenoxy ethanol, and 0.1 g of benzoisothiazolinone, and water was added to make the total amount to 750 g to form a coating solution, and 26 ml of 4 mass % chromium alum was mixed immediately before coating by a static mixer, and they were fed to a coating die so as to be 18.6 ml/m².

The viscosity of the coating solution was 20 [mPa·s] when measured by a B-type viscometer at 40° C. (No. 1 rotor, 60 rpm).

(4) Preparation of a Second Surface Protective Layer Coating Solution-1

80 g of inert gelatin dissolved in water, were added 102 g of a 27.5 mass % latex liquid of methyl methacrylate/styrene/butyl acrylate/hydroxyethyl methacrylate/acrylic acid copolymer (copolymerization weight ratio 64/9/20/5/2), 5.4 ml of a 2 mass % solution of a fluoro surfactant (F-1), 5.4 ml of an aqueous 2 mass % solution of a fluoro surfactant (F-2) and 23 ml of an aqueous 5 mass % solution of aerosol OT (manufactured by American Cyanamid Co.), 5 g of fine polymethyl methacrylate particles (average grain size of 0.7 μm, volume weighted mean distribution of 30%), 25 g of fine polymethyl methacrylate particles (average grain size of 8.0 μm, volume weighted mean distribution of 60%), 1.6 g of 4-methylphthalic acid, 4.8 g of phthalic acid, 44 ml of sulfuric acid at 0.5 mol/L concentration, and 10 mg of benzoisothiazolinone, and made up with water to the entire amount of 650 g, to which 445 ml of an aqueous solution containing 4 mass % of chromium alum and 0.67 mass % of phthalic acid was mixed just before coating by a static mixer, to form a surface protective layer coating solution, and fed to a coating die so as to be 8.3 ml/m².

The viscosity of the coating solution was 19 [mPa·s] when measured by a B-type viscometer at 40° C. (No. 1 rotor, 60 rpm).

1-4. Preparation of Photothermographic Material-1

An image-forming layer, an intermediate layer, a first surface protective layer, and a second surface protective layer were coated in this order from the undercoat surface by simultaneous stack coating by a slide bead coating method to prepare a specimen for a photothermographic material. The temperature was controlled to 31° C. for the image-forming layer and the intermediate layer, to 36° C. for the first surface protective layer and to 37° C. for the second surface protective layer. The coating amount of silver for the silver fatty acid salt and the silver halide in total in the image-forming layer was 0.821 g/m² per one surface. It was coated on both surfaces of the support.

The coating amount (g/m$^2$) for each of the compounds in the image-forming layer per one surface is as described below.

| | |
|---|---|
| Silver fatty acid salt | 2.80 |
| Polyhalogen compound-1 | 0.028 |
| Polyhalogen compound-2 | 0.094 |
| Silver iodide complex forming agent | 0.46 |
| SBR latex | 5.20 |
| Reducing agent-1 | 0.33 |
| Reducing agent-2 | 0.13 |
| Hydrogen bonding compound-1 | 0.15 |
| Development accelerator-1 | 0.005 |
| Development accelerator-2 | 0.035 |
| Color-tone-adjusting agent-1 | 0.002 |
| Mercapto compound-1 | 0.001 |
| Mercapto compound-2 | 0.003 |
| Silver halide (as Ag) | 0.146 |

Coating and drying conditions are as shown below.

The support was charge-eliminated by an ionic blow before coating. Coating was conducted at a speed of 160 m/min. The coating and drying conditions were controlled to each of the specimens within the range described below and set to the conditions capable of obtaining a most stabilized surface state.

The gap between the coating die top end and the support was set to 0.10 to 0.30 mm.

The pressure in a reduced pressure chamber was set lower by 196 to 882 Pa than the atmospheric pressure.

In a succeeding chilling zone, the coating solution was cooled by a blow at a dry bulb temperature of 10 to 20° C.

Specimens were conveyed in a non-contact manner, and dried in a helical non-contact type drying apparatus by a drying blow at a dry bulb temperature of 23–45° C. and at a wet bulb temperature of 15 to 21° C.

After drying, humidity was controlled to 40 to 60% RH at 25° C.

Successively, the film surface was heated to 70 to 90° C. and, after heating, the film surface was cooled to 25° C.

1–5. Characteristics of Specimen (1) Spectral Absorption Characteristics

Separately from photothermographic material-1, a specimen was prepared by removing only the photosensitive silver halide therefrom, the spectral absorption spectrum thereof was measured, a difference spectrum between them was determined and shown in FIG. 1.

A sharp maximum absorption was observed near 420 nm, and this is the direct transition absorption derived from the crystal structure of high silver iodide.

(2) Physical Characteristics

The matting degree of photothermographic material-1 was 120 sec according to Beck smoothness. Further, when the pH at the film surface on the side of the image-forming layer was measured, it was 6.0.

Chemical structures of the compounds used in the examples of the invention are shown below.

Tellurium Sensitizer C

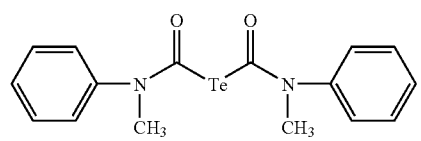

Compound 1 in which one-electron oxidant formed by one-electron oxidation can release one or more electrons

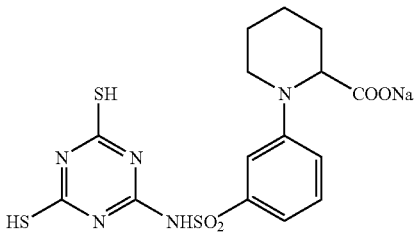

Compound 2 in which one-electron oxidant formed by one-electron oxidation can release one or more electrons

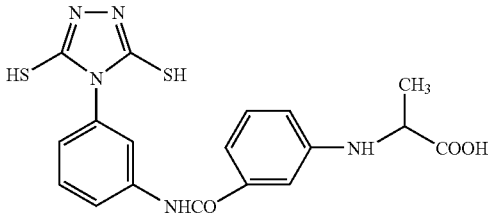

Compound 3 in which one-electron oxidant formed by one-electron oxidation can release one or more electrons

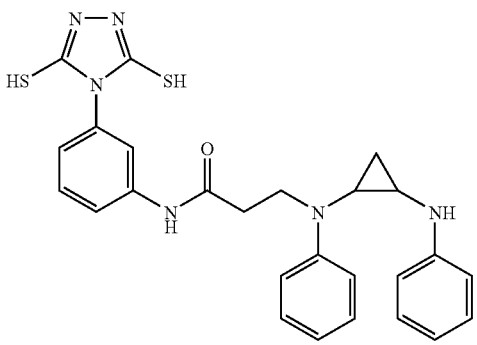

Compound 1 having absorptive group and reducing group

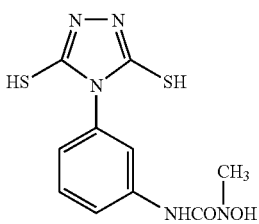

Compound 2 having absorptive group and reducing group

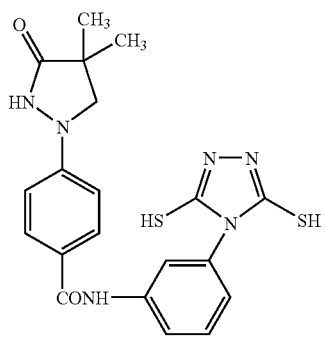
(Reducing agent-1)
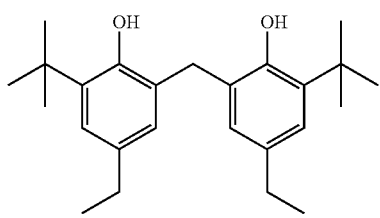
(Reducing agent-2)
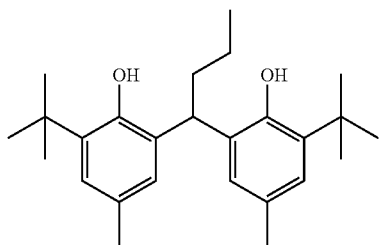
(Hydrogen bonding compound-1)
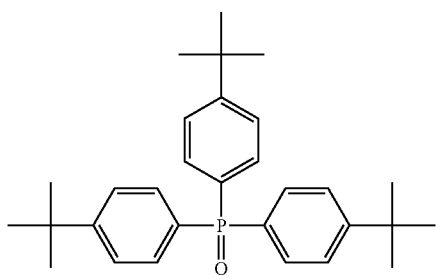
(Polyhalogen compound-1)
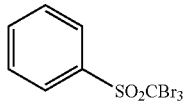
(Polyhalogen compound-2)
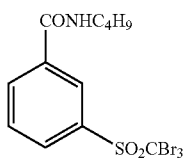
-continued
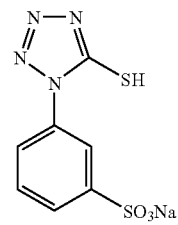
(Mercapto compound-1)
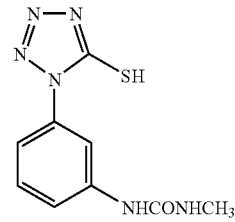
(Mercapto compound-2)
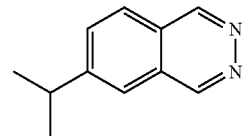
(Silver iodide complex forming agent)
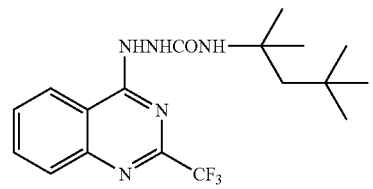
(Development accelerator-1)
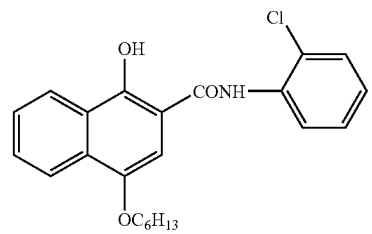
(Development accelerator-2)
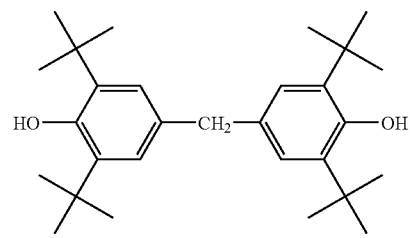
(Color-tone-adjusting agent-1)
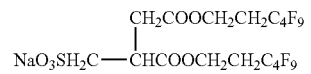
(F-1)
Mixture of 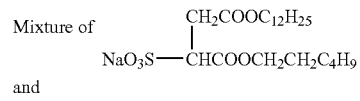 (F-2)
and -continued

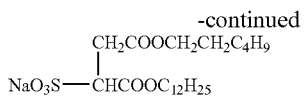

1-5. Fabrication of Specimen

The obtained specimen was cut into a one-half size, packed by the following packaging material under a circumstance at 25° C., 50% RH and evaluated after storage for 2 weeks at a normal temperature.

Packaging Material

A laminated film of PET 10 μm/PE 12 μm/aluminum foil 9 μm/Ny 15 μm/polyethylene containing 3 mass % carbon 50 μm:

Oxygen permeability: 0.02 ml/atm·m²·25° C.·day,
Moisture permeability: 0.10 g/atm·m²·25° C.·day.

2. Preparation of Fluorescence Intensifying Screen (1) Preparation of Undercoat Layer 90 g of soft acrylic resin and 50 g of nitrocellulose were added to methyl ethyl ketone, and mixed and dispersed to prepare a liquid dispersion at a viscosity of 3 to 6 PS (25° C.) as an undercoat layer forming coating solution. A polyethylene terephthalate of 250 μm thickness kneaded with titanium dioxide (support) was placed horizontally on a glass plate and, after coating the undercoat layer forming coating solution uniformly on the support by using a doctor blade, temperature was gradually elevated from 25° C. to 100° C. to dry the coated film and form an undercoat layer in the support (coating film thickness: 15 μm). The fluorescent material sheet prepared previously was placed on the support and press-compression operation was applied under a pressure of 400 kgw/cm² and at a temperature of 80° C. by using a calendar roll.

(2) Preparation of Fluorescent Material Sheet 250 g of a BaFBr:Eu fluorescent material (average grain size; 3.5 μm), 8 g of polyurethane binder resin (trade name of product: PANDEX T5265M, manufactured by Dainippon Ink and Chemicals Incorporated), 2 g of an epoxy binder resin (trade name of products: EPICOAT 1001, manufactured by Yuka Shell Epoxy KK) and 0.5 g of isocyanate compound (trade name of products: COLONATE HX, manufactured by Nippon Polyurethane Industry Co., Ltd.) were added to methyl ethyl ketone and dispersed by a propeller mixer, to prepare a fluorescent layer forming coating solution at a viscosity of 25 PS (25° C.). The coating solution was coated on the surface of a provisional support (polyethylene terephthalate sheet previously coated with silicone releasing agent) and dried to form a fluorescent material layer. The fluorescent material layer was peeled off the provisional support to obtain a fluorescent material sheet.

(3) Provision of Fluorescent Material Sheet on Light Reflection Layer

The fluorescent material sheet described above was stacked on the surface of a light reflection layer of the support appended with the light reflection layer manufactured in the previous step (1) and pressed by a calendar roll under the condition under pressure of 400 kgw/cm² and at a temperature of 80° C. to provide the fluorescent material layer on the light reflection layer. The thickness of the fluorescent material layer obtained was 125 μm and the volumetric packing rate of the fluorescent material particles in the fluorescent material layer was 68%.

(4) Formation of Surface Protective Layer

A polyester type adhesive was coated on one surface of 6 μm thick polyethylene terephthalate (PET) and a surface protective layer was formed on the fluorescent material layer by a lamination method. A fluorescence intensifying screen A comprising the support, the light reflection layer, the fluorescent material layer and the surface protective layer was obtained as described above.

(5) Emission Characteristics

FIG. 2 shows an emission spectrum of the intensifying screen A measured by X-rays at 40 kVp. The fluorescence intensifying screen A showed emission of a narrow half-value width having a peak at 390 nm.

As a comparative example, a fluorescence intensifying screen B was prepared in the same manner as that for the intensifying screen A except for changing the fluorescent material to YTaO₄. The fluorescence intensifying screen B showed a broad emission having a peak at 340 nm. FIG. 3 shows an emission spectrum.

As a comparative example, an X-ray regular screen HI-SCREEN B2 intensifying screen manufactured by Fuji Photo Film Co., Ltd. was used as a commercially available fluorescence intensifying screen using CaWO₄. The screen showed a broad emission having a peak at 425 nm. FIG. 4 shows an emission spectrum.

3. Evaluation for Photographic Performance

The photographic performance by combination of the photothermographic material and the fluorescence intensifying screen provided as described above was evaluated as follows.

(1) Combination with Fluorescence Intensifying Screen A

Two sheets of fluorescence intensifying screen A were used and photothermographic material-1 was put therebetween to prepare an image-forming assembly. The assembly was put to X-ray exposure for 0.05 sec and X-ray sensitometry was conducted. The X-ray apparatus used was DRX-3724HD (trade name of products manufactured by Toshiba Co.), in which a tungsten target was used. X-rays obtained by applying a voltage of 80 kVp by a three-phase pulse generator and passing through a 7 cm water filter having absorption substantially equivalent to a human body were used as a light source. The X-ray exposure amount was changed by a distance method and stepwise exposure was conducted at a notch of log E=0.15. After exposure, heat development was conducted under the following heat development conditions. The density of the obtained images was measured to prepare characteristic curves.

Heat Development Condition

A thermal developing machine capable of both-side heating was manufactured by modifying the heat development station of Fuji medical dry laser imager FM-DPL. Further, thermal developing station was modified such that film sheets can be conveyed by changing the conveyor rollers thereof to heat drums. Four panel heaters were set to 112° C.–118° C.–120° C.—120° C., and the temperature of the heat drum was set to 120° C. The heat development time was set to 15 sec by increasing the film conveying speed.

(2) Combination of Fluorescence Intensifying Screen B and HI-SCREEN B2

The intensifying screen B and HI-SCREEN B2 were used respectively instead of the intensifying screen A and identical evaluation was conducted. Based on the obtained characteristic curve, a reciprocal to the amount of X-rays giving a density of fogging density in a non-exposed area+ 1.0 was calculated as the sensitivity and expressed by a relative value based on the sensitivity for the combination of intensifying screen B/photothermographic material-1 being assumed as 100. Table 1 shows the result.

(3) Comparison with Wet Development Processing System

On the other hand, a regular photosensitive material RX-U for a wet development system manufactured by Fuji Photo Film Co., Ltd. was exposed under the same conditions and processed by using a processing solution CE-D 1 for 45 sec by an automatic developing machine CEPROS-M2 manufactured by Fuji Photo Film Co., Ltd.

RX-U photosensitive material is a silver bromoiodide photosensitive material with the silver iodide content of 2 mol % and this was a photosensitive material not showing the direct transition absorption derived from the crystal structure of high silver iodide.

Based on the obtained characteristic curve, a reciprocal to the amount of X-rays giving a density of fogging density in a non-exposed area+1.0 was calculated as the sensitivity and expressed by a relative value based on the sensitivity obtained by the combination of the intensifying screen B/RX-U being assumed as 100. Table 2 shows the obtained result.

(4) Combination with Photothermographic Material-2

Comparative example was prepared in the same manner as in photothermographic material-1 except for preparing the silver halide photosensitive material with silver bromide. Silver bromide was plate-like particles having an average projection area diameter of 0.8 μm and an average aspect ratio of 15. Photothermographic material-2 did not show necessary absorption derived from the crystal structure of silver iodide. It was exposed by the fluorescence intensifying screen in the same manner and applied with identical heat development with that for photothermographic material-1.

Based on the obtained characteristic curve, a reciprocal to the amount of X-rays giving the density of fogging density in a non-exposed area+1.0 was calculated as the sensitivity and expressed by a relative value based on the sensitivity obtained by the combination of the intensifying screen B/photothermographic material-2 being assumed as 100. Table 3 shows the obtained result.

TABLE 1

| | | | | | Emission peak | Emission ratio | | | | |
|---|---|---|---|---|---|---|---|---|---|---|
| Experiment No. | Photosensitive material | Halogen composition | Intensifying screen | Fluorescent material | wavelength (nm) | 350 nm to 420 nm | 360 nm to 420 nm | 370 nm to 420 nm | Relative sensitivity | Remarks |
| 1 | Photothermographic material-1 | $AgI_{0.95}Br_{0.05}$ | A | BaFBr:Eu | 390 | 96% | 96% | 85% | 495 | Present invention |
| 2 | Photothermographic material-1 | $AgI_{0.95}Br_{0.05}$ | B | $YTaO_4$ | 340 | 41% | 31% | 17% | 100 | Comparative Example |
| 3 | Photothermographic material-1 | $AgI_{0.95}Br_{0.05}$ | HI-SCREEN B2 | $CaWO_4$ | 425 | 37% | 35% | 29% | 56 | Comparative Example |

TABLE 2

| Experiment No. | Photosensitive material | Halogen composition | Intensifying screen | Fluorescent material | Emission peak wavelength (nm) | Emission ratio of 350 nm to 420 nm | Relative sensitivity | Remarks |
|---|---|---|---|---|---|---|---|---|
| 4 | RX-U | $AgBr_{0.98}I_{0.02}$ | A | BaFBr:Eu | 390 mm | 96% | 250 | Comparative Example |
| 5 | RX-U | $AgBr_{0.98}I_{0.02}$ | B | $YTaO_4$ | 340 nm | 41% | 100 | Comparative Example |
| 6 | RX-U | $AgBr_{0.98}I_{0.02}$ | HI-SCREEN B2 | $CaWO_4$ | 425 nm | 37% | 36 | Comparative Example |

TABLE 3

| Experiment No. | Photosensitive material | Halogen composition | Intensifying screen | Fluorescent material | Emission peak wavelength (nm) | Emission ratio of 350 nm to 420 nm | Relative sensitivity | Remarks |
|---|---|---|---|---|---|---|---|---|
| 7 | Photothermographic material-2 | AgBr | A | BaFBr:Eu | 390 nm | 96% | 320 | Present invention |
| 8 | Photothermographic material-2 | AgBr | B | $YTaO_4$ | 340 nm | 41% | 100 | Comparative Example |
| 9 | Photothermographic material-2 | AgBr | HI-SCREEN B2 | $CaWO_4$ | 425 nm | 37% | 45 | Comparative Example |

As shown in Tables 1, 2 and 3, it can be seen that favorable sensitivity can be obtained in the combination of the intensifying screen A and the photothermographic material of the invention. It can be seen that photothermographic material-1 having the direct transition absorption derived Further, haze was measured before and after the heat development. Table 4 shows the obtained result.

Table 4 shows the result of measurement also for photothermographic material-1 and photothermographic material-2.

TABLE 4

| Photosensitive material | Halogen composition | One side coating amount of silver iodide complex forming agent | Film haze before heat development | Film haze after heat development | Intensifying screen | Fluorescent material | Emission peak wavelength | Emission ratio of 350 nm to 420 nm | Relative sensitivity | Remark |
|---|---|---|---|---|---|---|---|---|---|---|
| Photothermographic material-1 | $AgI_{0.95}Br_{0.05}$ | 0.46 | 43 | 22 | A | BaFBr:Eu | 390 nm | 96% | 495 | Present Invention |
| Photothermographic material-1 | $AgI_{0.95}Br_{0.05}$ | 0.46 | 43 | 22 | B | $YTaO_4$ | 340 nm | 41% | 100 | Comparative Example |
| Photothermographic material-2 | AgBr | 0.46 | 38 | 35 | A | BaFBr:Eu | 390 nm | 96% | 320 | Present Invention |
| Photothermographic material-2 | AgBr | 0.46 | 38 | 35 | B | $YTaO_4$ | 340 nm | 41% | 100 | Comparative Example |
| Photothermographic material-3 | $AgI_{0.95}Br_{0.05}$ | 0.23 | 43 | 25 | A | BaFBr:Eu | 390 nm | 96% | 480 | Present Invention |
| Photothermographic material-3 | $AgI_{0.95}Br_{0.05}$ | 0.23 | 43 | 25 | B | $YTaO_4$ | 340 nm | 41% | 100 | Comparative Example |
| Photothermographic material-4 | $AgI_{0.95}Br_{0.05}$ | 0.1 | 43 | 28 | A | BaFBr:Eu | 390 nm | 96% | 470 | Present Invention |
| Photothermographic material-4 | $AgI_{0.95}Br_{0.05}$ | 0.1 | 43 | 28 | B | $YTaO_4$ | 340 nm | 41% | 100 | Comparative Example | from silver iodide is particularly preferred for the matching of the absorption characteristics thereof with the absorption characteristics of the fluorescence intensifying screen A to obtain high sensitivity.

Further, compared with the case of applying the intensifying screen A to the existing wet process photosensitive material, a relative sensitivity was apparently increased greatly in a case of applying the intensifying screen A to the photothermographic material of the invention, which was an unexpected effect.

Example 2

In the photothermographic material of the invention, it can be designed such that haze after the heat development is lowered by using the high silver iodide. The use of the silver iodide complex forming agent is preferred for eliminating the absorption of silver iodide in the heat development. Moreover, the intensifying screen of the invention is particularly preferable in a case of using a great amount of the complex forming agent as shown below.

1. Preparation of Specimen

Photothermographic material-3 and photothermographic material-4 were prepared in the same manner as in the preparation of photothermographic material-1 except in that the coating amount of the silver iodide complex forming agent is changed as recited in Table 4.

2. Performance Evaluation

Exposure and development were conducted in the same manner as in Example 1 by using a fluorescence intensifying screen, and the sensitivity was measured.

The sensitivity was shown as a relative value based on the sensitivity obtained by combination with the intensifying screen B for each of the photosensitive materials being assumed as 100.

As shown in Table 4, photothermographic material-1 particularly preferred in the invention shows less haze (clouding of film) after heat development and is preferred compared with photothermographic material-2 prepared from silver bromide. This is because the silver halide particles were eliminated after heat development, by the use of the photosensitive silver halide at high silver iodide content and the silver iodide complex forming agent.

For preferably decreasing the haze of photothermographic material-1 in the heat development, it is preferable that the silver iodide complex forming agent is added by a required amount. It has been found unexpectedly that the fluorescence intensifying screen A in the invention showed an extremely high sensitivity compared with the comparative fluorescence intensifying screen B in a region where the addition amount is large. As described above, it can be seen that the intensifying screen of the invention provides preferred sensitivity in the combination of the particularly preferred high silver iodide photothermographic material and the photothermographic material containing high silver iodide and the silver iodide complex forming agent of the invention.

Example 3

1. Preparation of Fluorescence Intensifying Screen

Fluorescence intensifying screens C, D, and E were prepared in the same manner as in the fluorescence intensifying screen A except in that the coating amount of the fluorescent material coating solution is changed. Table 5 shows the thickness of the fluorescent material layer and the volumetric packing ratio of the fluorescent material of the obtained fluorescence intensifying screens.

TABLE 5

| Fluorescence intensifying screen | Fluorescent material | Fluorescent material layer thickness | Fluorescent material volumetric packing ratio |
|---|---|---|---|
| A | BaFBr:Eu | 125 μm | 68% |
| C | BaFBr:Eu | 70 μm | 70% |
| D | BaFBr:Eu | 160 μm | 66% |
| E | BaFBr:Eu | 250 μm | 64% |

2. Performance Evaluation

Image-forming assemblies were prepared by using the fluorescence intensifying screens described above instead of the fluorescence intensifying screen A and arranging each in the order of the front screen, photothermographic material-1 and the back screen from the X-ray source as shown in Table 6 and exposure was conducted. Development and density measurements were conducted in the same manner as in Example 1 and the sensitivity was measured. Table 6 shows the sensitivity based on the sensitivity obtained by the combination of HI-SCREEN B2/photothermographic material-1 being assumed as 100.

TABLE 6

| Experiment No. | Photosensitive material | Halogen composition | Front screen | Back screen | Fluorescent material | Emission peak wavelength | Emission ratio for 350 nm to 420 nm | Relative sensitivity | Remark |
|---|---|---|---|---|---|---|---|---|---|
| 3 | Photothermographic material-1 | $AgI_{0.95}Br_{0.05}$ | HI-SCREEN B2 | HI-SCREEN B2 | $CaWO_4$ | 425 nm | 37% | 100 | Comparative Example |
| 1 | Photothermographic material-1 | $AgI_{0.95}Br_{0.05}$ | A | A | BaFBr:Eu | 390 nm | 96% | 890 | Present Invention |
| 7 | Photothermographic material-1 | $AgI_{0.95}Br_{0.05}$ | C | C | BaFBr:Eu | 390 nm | 96% | 700 | Present Invention |
| 8 | Photothermographic material-1 | $AgI_{0.95}Br_{0.05}$ | C | A | BaFBr:Eu | 390 nm | 96% | 770 | Present Invention |
| 9 | Photothermographic material-1 | $AgI_{0.95}Br_{0.05}$ | C | D | BaFBr:Eu | 390 nm | 96% | 900 | Present Invention |
| 10 | Photothermographic material-1 | $AgI_{0.95}Br_{0.05}$ | C | E | BaFBr:Eu | 390 nm | 96% | 970 | Present Invention |
| 11 | Photothermographic material-1 | $AgI_{0.95}Br_{0.05}$ | A | E | BaFBr:Eu | 390 nm | 96% | 1040 | Present Invention |

High sensitivity was obtained by using the fluorescence intensifying screen according to the invention in the wide range of the coating thickness of the fluorescent material.

The present invention provides an image forming method having high sensitivity and excellent image storability by the combination of a photothermographic material having a specific sensitivity in a wavelength range of 350 nm or more and 420 nm or less and a fluorescence intensifying screen having high light emission property in the wavelength region described above.

As described above, exposure at various sensitivity levels can be conducted at a high sensitivity level by changing the coating amount of the fluorescent material of the intensifying screen in the invention. Preferred X-ray images can be obtained by the combination with the photosensitive material of the invention.

Example 4

1. Fluorescence Intensifying Screen (1) Preparation of Fluorescence Intensifying Screen AA An intensifying screen AA was prepared in the same manner as in the intensifying screen A of Example 1, except that the preparation of an undercoat layer was changed as follows:

<Preparation of Undercoat Layer (Light Reflecting Layer)>

100 g of powder of aluminum oxide (particle diameters of 90 wt % particles of total particles: 0.1 μm to 1 μm, average particle size of the total particles: 0.6 μm), 5 g of a binder (a soft acrylic resin) and 2 g of phthalate were dispersed in methyl ethyl ketone with a propeller mixer to prepare a dispersion solution for the light reflecting layer. The thus prepared solution was then uniformly applied onto a transparent polyethylene terephthalate film (thickness: 250 μm) with a doctor blade, and the thus formed coating film was dried. In this manner, a light reflecting layer having a thickness of 50 μm was formed on the support.

(2) Preparation of Fluorescence Intensifying Screens CC, DD and EE

Intensifying screens CC, DD and EE were prepared in the same manner as in the preparation of intensifying screens C, D and E of Example 3 except for using the preparation method of the undercoat layer the same as for intensifying screen AA.

2. Performance Evaluation

The evaluation of the properties was performed in the same manner as in Example 3. The results were excellent and had a higher sensitivity.

Example 5

Hereinafter, an example of an image forming method in which a photothermographic material having an image forming layer on a single side of a support will be detailed.

1. Preparation of Photothermographic Material-5

The photothermographic material-5 was prepared as described below by using the same various materials and solutions prepared in Example 1.

On one side of the support provided with the undercoat layer, an image-forming layer, an intermediate layer, a first surface protective layer, and a second surface protective layer were subjected to a simultaneous superposition coating in this order by a slide bead coating method so as to prepare a sample of a photothermographic material. In this case, the temperature of the image-forming layer and the intermediate layer was adjusted to 36° C., the temperature of the first surface protective layer to 36° C., and the temperature of the second surface protective layer to 36° C. The coated silver content of the image-forming layer was 1.6 g/m$^2$ in a sum of fatty acid silver and a silver halide.

On the side opposite to the support were formed a back layer and a back surface protective layer that are the same as in the photosensitive material of Example 1 of JP-A No. 2003-215751.

2. Performance Evaluation

The photographic properties obtained by combining the photothermographic material-5 prepared in the above-described manner and the fluorescence intensifying screen A produced in Example 1 were evaluated in the following manner.

(1) Combination with Fluorescence Intensifying Screen A

The fluorescence-coated side of one sheet of the fluorescence intensifying screen A was closely contacted with the image-forming layer-coated side of the photothermographic material-5 to produce imaging assemblies for forming an image. The imaging assemblies were arranged in the order of an X-ray radiator/photothermographic material-5/intensifying screen A, and were exposed to the X-ray radiation for 5 seconds to conduct X-ray sensitometry. The used X-ray device was trade name DRX-3724HD produced by Toshiba Corporation, and a tungsten target was used. X-ray was used as a light source, in which 80 kVp of voltage was applied to a three-phase circuit using a pulse generator and the X-ray was passed through a filter of 7 cm containing water, having the absorption of which is almost equivalent to the human body. The light exposure of the X-ray was changed by a distance method, and a stepped exposure was performed with a width of log E=0.15. After exposure, a heat development treatment was performed under the following heat development treatment conditions. The concentration of the obtained image was measured to produce a characteristic curve.

<Conditions for Heat Development Treatment>

Fuji Medical Dry Laser Imager FM-DPL was modified by replacing the conveyance roller at the heat development section with a heating drum so that the film sheet can be conveyed. 4 Panel heaters were set at 112° C.–118° C.–120° C.—120° C., and the temperature of the heat drum was set at 120° C. Furthermore, the velocity of the conveyance was calculated and the sum thereof was set to 15 seconds.

(2) Combination of Fluorescence Intensifying Screen B and HI-SCREEN B2

The evaluation was performed in the same manner as the above except for using intensifying screen B and HI-SCREEN B2 in place of intensifying screen A. Sensitivity was calculated as the reciprocal number of X-ray exposure amount that can obtain a density of +1.0. The sensitivity obtained with the combination of intensifying screen B and photothermographic material-5 was defined as 100 and relative values were calculated for other combinations. The results are shown in Table 7.

TABLE 7

| Experiment No. | Photosensitive material | Halogen composition | Intensifying screen | Fluorescent material | Emission peak wavelength (nm) | Emission ratio 350 nm to 420 nm | Emission ratio 360 nm to 420 nm | Emission ratio 370 nm to 420 nm | Relative sensitivity | Remarks |
|---|---|---|---|---|---|---|---|---|---|---|
| 21 | Photothermographic material-5 | AgI$_{0.95}$Br$_{0.05}$ | A | BaFBr:Eu | 390 | 96% | 96% | 85% | 470 | Present invention |
| 22 | Photothermographic material-5 | AgI$_{0.95}$Br$_{0.05}$ | B | YTaO$_4$ | 340 | 41% | 31% | 17% | 100 | Comparative Example |
| 23 | Photothermographic material-5 | AgI$_{0.95}$Br$_{0.05}$ | HI-SCREEN B2 | CaWO$_4$ | 425 | 37% | 35% | 29% | 52 | Comparative Example |

As shown in Table 7, excellent results are obtainable with imaging assemblies comprising a photothermographic material and an intensifying screen according to the invention even in an image forming method using a pohotothermographic material having an image-forming layer on a single side of a support.

What is claimed is:

1. An image forming method applying X-ray exposure to a photothermographic material having, on at least one surface of a support, an image forming layer comprising at least a photosensitive silver halide, a non-photosensitive organic silver salt, a reducing agent for silver ions, and a binder, wherein the photothermographic material is brought into close contact with a fluorescence-intensifying screen comprising a fluorescent material that emits light, 50% or more of which has a wavelength in a range of 350 nm or more and 420 nm or less.

2. The image forming method of claim 1, wherein the fluorescent material is a bivalent Eu activated fluorescent material.

3. The image forming method of claim 2, wherein the bivalent Eu activated fluorescent material is a bivalent Eu activated barium halide fluorescent material.

4. The image forming method of claim 1, wherein the photosensitive silver halide has a direct transition absorption derived from a crystal structure of a high silver iodide.

5. The image forming method of claim 2, wherein the photosensitive silver halide has a direct transition absorption derived from a crystal structure of a high silver iodide.

6. The image forming method of claim 3, wherein the photosensitive silver halide has a direct transition absorption derived from a crystal structure of a high silver iodide.

7. The image forming method of claim 4, wherein the photosensitive silver halide has a silver iodide content of 40 mol % or more.

8. The image forming method of claim 5, wherein the photosensitive silver halide has a silver iodide content of 40 mol % or more.

9. The image forming method of claim 6, wherein the photosensitive silver halide has a silver iodide content of 40 mol % or more.

10. The image forming method of claim 4, wherein the photosensitive silver halide has a silver iodide content of 80 mol % or more.

11. The image forming method of claim 4, wherein the photosensitive silver halide has a silver iodide content of 90 mol % or more.

12. The image forming method of claim 4, wherein the photothermographic material comprises a compound capable of substantially lowering the direct transition absorption derived from the crystal structure of the high silver iodide by thermally developing the photothermographic material at a temperature of 80° C. or higher and 180° C. or lower.

13. The image forming method of claim 5, wherein the photothermographic material comprises a compound capable of substantially lowering the direct transition absorption derived from the crystal structure of the high silver iodide by thermally developing the photothermographic material at a temperature of 80° C. or higher and 180° C. or lower.

14. The image forming method of claim 6, wherein the photothermographic material comprises a compound capable of substantially lowering the direct transition absorption derived from the crystal structure of the high silver iodide by thermally developing the photothermographic material at a temperature of 80° C. or higher and 180° C. or lower.

15. The image forming method of claim 12, wherein the compound capable of substantially lowering the direct transition absorption derived from the crystal structure of the high silver iodide comprises a silver iodide complex forming agent.

16. The image forming method of claim 13, wherein the compound capable of substantially lowering the direct transition absorption derived from the crystal structure of the high silver iodide comprises a silver iodide complex forming agent.

17. The image forming method of claim 14, wherein the compound capable of substantially lowering the direct transition absorption derived from the crystal structure of the high silver iodide comprises a silver iodide complex forming agent.

18. The image forming method of claim 1, wherein the photosensitive silver halide comprises plate-like particles having an aspect ratio of 2 or more.

19. The image forming method of claim 2, wherein the photosensitive silver halide comprises plate-like particles having an aspect ratio of 2 or more.

20. The image forming method of claim 1, wherein the photosensitive silver halide has an average sphere-equivalent diameter of 0.3 μm or more and 5.0 μm or less.

21. The image forming method of claim 1, wherein the photothermographic material has the image forming layer on both sides of the support.

* * * * *